(12) United States Patent
Enomura et al.

(10) Patent No.: US 12,522,577 B2
(45) Date of Patent: Jan. 13, 2026

(54) METHOD FOR PRODUCING ORGANIC COMPOUND

(71) Applicant: M. Technique Co., Ltd., Izumi (JP)

(72) Inventors: Masakazu Enomura, Izumi (JP); Takeshi Endo, Izumi (JP); Kazutaka Takeda, Izumi (JP)

(73) Assignee: M. TECHNIQUE CO., LTD., Izumi (JP)

( * ) Notice: Subject to any disclaimer, the term of this patent is extended or adjusted under 35 U.S.C. 154(b) by 1226 days.

(21) Appl. No.: 17/418,724

(22) PCT Filed: Dec. 26, 2019

(86) PCT No.: PCT/JP2019/051345
§ 371 (c)(1),
(2) Date: Jun. 25, 2021

(87) PCT Pub. No.: WO2020/138387
PCT Pub. Date: Jul. 2, 2020

(65) Prior Publication Data
US 2022/0056004 A1 Feb. 24, 2022

(30) Foreign Application Priority Data

Dec. 26, 2018 (WO) .................. PCT/JP2018/047984
Dec. 26, 2018 (WO) .................. PCT/JP2018/047985
Feb. 27, 2019 (WO) .................. PCT/JP2019/007646

(51) Int. Cl.
*C07D 317/00* (2006.01)
*B01J 19/00* (2006.01)
(Continued)

(52) U.S. Cl.
CPC ........ *C07D 317/12* (2013.01); *B01J 19/0013* (2013.01); *B01J 19/0066* (2013.01);
(Continued)

(58) Field of Classification Search
CPC ..... C07D 317/12; B01J 19/18; B01J 19/0013; B01J 19/0066
See application file for complete search history.

(56) References Cited

U.S. PATENT DOCUMENTS

| 2010/0155310 A1 | 6/2010 | Enomura |
| 2010/0249449 A1 | 9/2010 | Sartorelli et al. |

(Continued)

FOREIGN PATENT DOCUMENTS

| JP | 5-200260 A | 8/1993 |
| JP | 8-109208 A | 4/1996 |

(Continued)

OTHER PUBLICATIONS

International Search Report for PCT/JP2019/051345 (PCT/ISA/210) mailed on Mar. 17, 2020.

(Continued)

*Primary Examiner* — Anshu Bhatia
(74) *Attorney, Agent, or Firm* — Birch, Stewart, Kolasch & Birch, LLP

(57) ABSTRACT

Provided is a method for producing an organic compound, the method making it possible to ensure an adequate reaction time and obtain a targeted substance at a high yield even in an organic reaction that requires a relatively long time to complete the reaction. A method for producing an organic compound, wherein the method is characterized in that: a fluid processing apparatus F used in the production method is equipped with an upstream processing unit that processes a fluid to be processed between at least two processing surfaces 1 and 2 that relatively rotate, and a downstream processing unit disposed downstream of the upstream processing unit, the downstream processing unit being provided with a plurality of labyrinth seals that function to retain and stir the fluid to be processed that has been processed by the upstream processing unit; due to the fluid to be processed, (Continued)

which contains at least one type of organic compound, being passed through the upstream processing unit, the fluid to be processed is subjected to upstream processing; due to the fluid to be processed that has been subjected to upstream processing being passed through the downstream processing unit, the fluid to be processed that has been subjected to upstream processing is subjected to downstream processing; and the upstream processing and the downstream processing are performed continuously.

19 Claims, 20 Drawing Sheets

(51) Int. Cl.
    *B01J 19/18*     (2006.01)
    *C07C 51/377*     (2006.01)
    *C07C 67/08*     (2006.01)
    *C07C 67/343*     (2006.01)
    *C07D 317/12*     (2006.01)
    *C08F 120/14*     (2006.01)

(52) U.S. Cl.
    CPC .............. *B01J 19/18* (2013.01); *C07C 51/377* (2013.01); *C07C 67/08* (2013.01); *C07C 67/343* (2013.01); *C08F 120/14* (2013.01)

(56) References Cited

U.S. PATENT DOCUMENTS

| | | | |
|---|---|---|---|
| 2018/0118112 A1 | 5/2018 | Umino et al. | |
| 2018/0282440 A1* | 10/2018 | Babar | ....................... C08F 2/22 |
| 2021/0170358 A1 | 6/2021 | Enomura | |

FOREIGN PATENT DOCUMENTS

| | | |
|---|---|---|
| JP | 2005-60281 A | 3/2005 |
| JP | 2005-279619 A | 10/2005 |
| JP | 2006-239638 A | 9/2006 |
| JP | 2007-50340 A | 3/2007 |
| JP | 2011-500618 A | 1/2011 |
| JP | 2011-189348 A | 9/2011 |
| JP | 2014-23997 A | 2/2014 |
| JP | 5561732 B2 | 7/2014 |
| JP | 2016-87485 A | 5/2016 |
| JP | 2018-69997 A | 5/2018 |
| KR | 10-0295984 B1 | 10/2001 |
| KR | 10-2012-0010313 A | 2/2012 |
| KR | 10-1171333 B1 | 8/2012 |
| WO | WO 94/09892 A1 | 5/1994 |
| WO | WO 2018/069997 A1 | 4/2018 |
| WO | WO 2018/220719 A1 | 12/2018 |

OTHER PUBLICATIONS

Korean Office Action for Korean Application No. 10-2021-7018686, dated May 15, 2025.

* cited by examiner (A)

(B)

(A)

(B)

METHOD FOR PRODUCING ORGANIC COMPOUND

TECHNICAL FIELD

The present invention relates to modification of the method for producing an organic compound using a fluid processing apparatus that employs a processing space defined by at least two processing surfaces at least one of which rotates relative to the other. Also, the present invention relates to a method for producing an organic compound using a continuous stirring apparatus. More specifically, the present invention relates to a method for producing an organic compound using a continuous reaction apparatus which is effective and useful in the fields such as chemistry, biochemistry, agriculture, foods, pharmaceutical drugs, cosmetics, particularly for chemical reaction and chemical synthesis using an organic compound.

BACKGROUND ART

In general, a reaction process for obtaining a new substance by a chemical reaction of two or more kinds of substances or one kind of the same substance itself is roughly classified into a batch type and a continuous type. In the batch type reaction process, a solvent, a substrate, a reacting agent, and the like are placed in a container such as a flask used in a laboratory, and then, the reaction is carried out by stirring with a stirrer or the like. Both the batch type and the continuous type have been industrially put into practical use, however, as a matter of course, their reaction fields have a volume. The volume of reaction container affects nonuniformity of reaction condition in its reaction field. For example, in a case where a reacting agent is added to a uniform substrate solution to perform a chemical reaction, a certain period is required to make the concentration of the reacting agent uniform. The same thing can be said for temperature under the reaction condition. That is, in a case where a reaction container is externally or internally heated or cooled, a certain period is required for the entire reaction container to reach a certain temperature, and further, it is considered very difficult to make the entire reaction field in the reaction container at a completely constant temperature. Further, in the case of a batch type reaction container, when a reacting agent is added to a solvent and a substrate in the reaction container, reaction conditions are already different at the start and end of adding the reacting agent. As a result, nonuniformity of reaction conditions in the reaction field caused by the above-described factors affects a reaction product. That is, due to the occurrence of the various reaction conditions in one container, an intended reaction cannot be performed ideally. For example, a main reaction and a side reaction cannot be perfectly selected, resulting in generation of a by-product, and in the case of polymerization reaction, it is difficult for molecular weight distribution of the reaction product to be obtained to be uniform. When including an adhesion of the reaction product onto wall surface of the reaction container, the yield of the product from the reactant is naturally low. In order to solve these problems in the reaction field, the reaction container is usually equipped with stirring device such as a stirrer and a turbine. The mixing speed of the mixed reaction fluid in the reaction container is increased by means of the stirring device to ensure uniformity in the reaction field and to increase the reaction speed. However, when the viscosity of the targeted mixed reaction fluid increases every time, the problem of nonuniformity in the reaction field is emerges again. Nevertheless, by trying for instantaneous mixing, the power required for stirring naturally increases. Further, there is also a problem that when heating in the short period due to the large temperature gradient, excessive heat energy is required.

In addition, despite that the reaction process such as described above is frequently used in a chemical industry, there is always a concern about safety issues and risks. In many cases, a relatively large amounts of a highly toxic chemical substance are used, indicating considerable dangers to humans and environment, and since the fact that solvents are substance to cause pollution to an environment in many aspects, particular problems occur. For example, in the case of Friedel-Craft acylation, there is a risk of strong exothermic reaction, and in the case of nitration, there is a risk of not only exothermic reaction but also large explosion. Furthermore, those dangers become more real when upscaling for actual production.

In order to solve the above problems, as shown in Patent Document 1 and Patent Document 2, microreactor, micromixer and microreactor which are a micro flow-path reactor have been proposed, and advantages such as capable of synthesizing in a very small amount, higher efficiency of temperature control, higher efficiency of interface reaction, and efficient mixing are advocated. However, when using a general microreactor, even though there are many advantages in microdevice and systems, in reality, there are many problems such that as diameter of the micro-flow path is getting smaller, pressure loss thereof is inversely proportional to the fourth power of the flow path, that is, an extremely high feeding pressure is required that is difficult to obtain a pump that actually feeds a fluid, and in the case of reaction involving the separation, the reaction is expected by a phenomenon that the product is clogged in the flow path, clogging of the microflow path by bubbles generated due to a reaction, and further basically diffusion speed of molecular, therefore, microflow path is not effective and adaptable to all reactions, and it is necessary to carry out reactions by trial and error method repeatedly and select the ones which are successful. Therefore, as shown in Patent document 1, the problem of sediments generated in the microreactor is avoided by ultrasonic treatment, however, the irregular turbulence flow and cavitation generated in the flow path due to the ultrasonic wave are unlikely to always act favorably for the desired reaction. Upscaling has further been solved by the way of increasing the number of microreactor, namely by numbering-up, but the number of microreactors which can be stacked is limited to several dozen, thus it is natural to focus on products with high product value, and further, increasing of the number of the devices means to lead increasing of the absolute number of malfunction causes, therefore, when the problem such as clogging occurs, it may be very difficult to detect a problem site such as the malfunction site.

In order to solve these problems, the method for producing an organic compound as described in Patent Document 3 was proposed by the applicant of the present invention. Patent Document 3 describes the method for producing an organic compound which comprises, for example, a fluid containing at least one kind of organic compound and a fluid containing at least one kind of reacting agent are merged in a thin film fluid formed between processing surfaces which are disposed in a position facing each other so as to be able to approach to and separate from each other, at least one of which rotates relative to the other, and the various organic reactions are conducted in the thin film fluid. Since the organic reactions are conducted in the thin film fluid, uniformity of the reaction can be ensured, and up-scaling is made possible.

However, even when the method for producing an organic compound described in Patent Document 3 is used, similar problems as mentioned above can be seen such as attempting the trial-and-error method for the reaction and selecting a successful one.

The first problem to be solved is to ensure the reaction time. Since each fluid is merged in the thin film fluid formed between the processing surfaces, the diffusion efficiency is unprecedentedly high, and as a result, complete mixing can be achieved, however, especially in the case of an organic reaction, there were cases which are desired to prolong the absolute reaction time. In order to shorten the reaction time, the trial and error such as raising the reaction temperature extremely high and increasing the amount of catalyst was repeated, however, adverse effect such as increase in byproducts and dangers are also conspicuous. Further, when the processing surfaces are made extremely large, the reaction time may be ensured, but this is not practical because there are problems of a high cost, a large installation area, and so forth.

Patent Document 4 filed by the applicant of the present invention discloses that each fluid is merged in a thin film fluid formed between processing surfaces which are disposed in a position facing each other so as to be able to approach to and separate from each other, at least one of which rotates to the other, a vessel is provided to separate the fine particles in the thin film fluid and to catch a discharged solution that is discharged from between the processing surfaces, and a tubular container is connected to the lower end of the vessel so that the nuclei and crystallites of the fine particles contained in the discharged solution are grown in the tubular container. However, although this proposal is useful for growing the crystal nucleus and the crystallite, for example in the case of the organic synthesis, a considerably large tubular container is required to satisfy a retention time of the discharged solution in the tubular container, and in addition, only mere flowing of the discharged solution through the tubular container cannot satisfy the condition for obtaining desired reactant as well as the problem of clogging in the tubular container also occur. Further, in many cases, an additional stirrer as well as a solution-sending system may be required.

Patent Document 5 filed by the applicant of the present invention discloses a fluid processing apparatus that is configured such that, in a microreactor employing a circular flow path that is defined between processing surfaces that rotate relative to the other, a cylindrical stirring space is provided inside of the circular flow path in a diameter direction, stirring blades and a screen are arranged in the stirring space, a stirring energy is applied by the stirring blades to the fluid to be processed just immediately before being introduced the circular flow path and a shear force is applied between the stirring blades and the screen. Patent Document 5 realizes a homogeneity of the fluid to be processed that is introduced into the circular flow path thereby realizing a uniform reaction in the circular flow path, however, there is no specific description as to further processing of the fluid that is discharged from the circular flow path.

Patent Document 6 discloses a mixing apparatus to mix one or a plurality of fluids, in which a volumetric body is arranged in the downstream side of a static microreactor. The volumetric body forms a labyrinth wall inside thereof to form a labyrinth-type flow path, and the labyrinth-type flow path is formed to facilitate mixing by generating a turbulent flow in the fluid that is passing therethrough.

Patent Document 7 discloses a Taylor reaction device in which a plurality of the Taylor vortexes is generated in a clearance space formed between an outer cylinder and an inner cylinder that rotates inside of the outer cylinder, and in this clearance space, a labyrinth path which suppress the flows among the Tylor vortexes is provided. The reaction device of Patent Document 7 premises generation of the Tylor vortexes (for example, paragraph 0017 of Patent Document 7), the structure of this device must be designed with the condition that can generate the Taylor vortexes. According to Patent Document 8, the Taylor vortex can be stably obtained when the Taylor number calculated from the following formula (1) is 2000 or less, and according to the formula (1), there are limitations on installation interval of the labyrinth seal, the rotation number of the rotating part (inner cylinder), and the dynamic viscosity of the fluid that can be handled.

$$Ta = \omega \cdot R \cdot b / \nu \cdot (b/R)^{1/2} \qquad \text{Formula (1)}$$

Here, Ta is the Taylor number (dimensionless number), $\omega$ is the angular velocity of the rotating part (1/second), R is radius of the rotation part (cm), b is the distance between the outer circumferential surface of the inner cylinder and the inner circumferential surface of the outer cylinder (cm), and $\nu$ is the dynamic viscosity of the fluid ($cm^2$/second).

Since organic solvents often have lower dynamic viscosities than water, there are many limitations in setting of the condition in order to keep the Taylor number of 2000 or less, thus, this device is not suitable for actual use in organic reactions.

Taking these points into consideration, the applicant of the present invention proposes a method for producing an organic compound by using a fluid processing apparatus and a continuous stirring apparatus which can secure the sufficient reaction time and obtain the desired reaction product with high efficiently.

PRIOR ART DOCUMENTS

Patent Documents

Patent Document 1: Japanese Patent Laid-Open Publication No. 2005-060281
Patent Document 2: Japanese Patent Laid-Open Publication No. 2007-050340
Patent Document 3: Japanese Patent No. 5561732
Patent Document 4: Japanese Patent Laid-Open Publication No. 2014-023997
Patent Document 5: International Patent Laid-Open Publication No. 2018-069997
Patent Document 6: Japanese Patent Laid-Open Publication No. 2006-239638
Patent Document 7: Japanese Patent Laid-Open Publication No. 2016-087485
Patent Document 8: Japanese Patent Laid-Open Publication No. H08-109208

DISCLOSURE OF INVENTION

Problems to be Solved by the Invention

In view of the description mentioned above, the object of the present invention is to provide a method for producing an organic compound which can secure the sufficient reaction time even in the organic reaction that requires a comparatively long time for completion of the reaction to obtain an intended substance with a high yield.

As for one example, an intended product X is obtained by reacting a raw material A and a raw material B by chemical reaction process. In this case, a first process of the fluid is mixing of the raw material A and the raw material B, and it is desired that the raw material A and the raw material B are mixed more uniformly and faster. Then, in a second process of the fluid, the reaction between the raw material A and the raw material B is allowed to proceed. In order to proceed the reaction, the reaction condition for efficiently obtaining the product X is adjusted. Illustrative examples of the reaction condition refer to concentrations of the raw material A and the raw material B, the temperature condition in the reaction field, the pressure condition and stirring condition, the presence/absence of the catalyst and its optimization, and the reaction time. Therefore, the highly efficient, continuous, low cost, and simple processing apparatus must be able to process each of the process efficiently (the first process and the second process of the fluid).

Means for Solving the Problems

The present invention relates to a method for producing an organic compound, in which a fluid processing apparatus used in the production method comprises an upstream-side processing part in which a fluid to be processed is processed between at least two processing surfaces that rotate relative to each other, and a downstream-side processing part which is arranged in the downstream side of the upstream-side processing part and is provided with a plurality of labyrinth seals having functions to retain and stir the fluid to be processed being processed in the upstream-side processing part. This production method is characterized in that by the fluid to be processed containing at least one kind of organic compound being passed through the upstream-side processing part, the fluid to be processed is subjected to an upstream-side processing, by the fluid to be processed which is subjected to the upstream-side processing being passed through the downstream-side processing part, the fluid to be processed which is subjected to the upstream-side processing is subjected to a downstream-side processing, and the upstream-side processing and the downstream-side processing are carried out continuously.

In the present invention, the upstream-side processing and the downstream-side processing mean processing of an organic reaction.

In the fluid processing apparatus used in the production method, it may be carried out in a such way that the downstream-side processing part comprises a narrow seal space and a retention space that is arranged in the upstream side of the seal space and is wider than the seal space, and an upstream-side outflow port of the fluid to be processed from the upstream-side processing part is open to the retention space, in the downstream-side processing part, a plurality of the pairs of the seal space and the retention space are continuously arranged from an upstream to a downstream in the flow of the fluid to be processed.

In the fluid processing apparatus used in the production method, it may be carried out in such a way that the downstream-side processing part comprises a cylindrical receiving part and a column part that is received in the cylindrical receiving part, and by rotating at least any one of the cylindrical receiving part and the column part, the cylindrical receiving part and the column part relatively rotate.

The present invention may be carried out in such a way that by rotation of at least any one of the at least two processing surfaces and/or rotation of at least any one of the cylindrical receiving part and the column part, a shear force is applied to the fluid to be processed passing through the upstream-side processing part and/or the downstream-side processing part.

The present invention may be carried out in such a way that a temperature adjusting mechanism to control a temperature of the fluid to be processed that passes through the downstream-side processing part is installed, and by the temperature adjusting mechanism, the fluid to be processed that passes through the downstream-side processing part is heated or cooled.

The present invention may be carried out in such a way that in the downstream-side processing part, an introducing port to introduce a fluid other than the fluid to be processed from the upstream-side processing part is arranged, and from this introducing port, the fluid other than the fluid to be processed from the upstream-side processing part is introduced into the fluid to be processed from the upstream-side processing part.

The present invention may be carried out in such a way that in the upstream-side processing part, reactants included in the fluid to be processed are instantly mixed in a molecular level, and a process in which the fluid to be processed is maintained for a long time while maintaining necessary reaction condition in the downstream-side processing part is carried out in one fluid processing apparatus.

By so doing, this may be applied, for example, to the processes described in Patent Document 4.

The present invention may be carried out to obtain a polymer in such a way that the fluid to be processed comprises at least two fluids containing a fluid which contains at least one kind of the organic compound, and the fluid to be processed comprises: a fluid which contains at least one polymerizable monomer, and a fluid which contains at least any one of an emulsifier to emulsify the monomer in a medium that is immiscible with the monomer or a dispersant to disperse the monomer in the medium, and an emulsifying process or a dispersing process is carried out in the upstream-side processing part as the upstream-side process, and a polymerization process is carried out in the downstream-side processing part as the downstream-side process.

The present invention may be carried out in such a way that the fluid to be processed comprises at least two fluids containing the fluid which contains at least one kind of organic compound, an organic reaction is carried out by the upstream-side processing and the downstream-side processing, wherein a combination of the at least two fluids and the organic reaction is at least one combination selected from the group consisting of the following first to fourth combinations.

a first combination:
a combination of the at least two fluids which are a fluid containing at least one ester and a fluid containing at least any one of an acidic substance or a basic substance to promote a hydrolysis of the ester and
a reaction which is the organic reaction to obtain an alcohol by the hydrolysis,
a second combination:
a combination of the at least two fluids which are a fluid containing at least any one of alcohol or amine and a fluid containing at least any one of carboxylic acid, carboxylic acid anhydride, or carboxylic acid halide and a reaction which is the organic reaction is to obtain an ester or an amide by condensation, a third combination:

a combination of the at least two fluids which are a fluid containing at least any one of aldehyde or ketone, and one active methylene compound and a fluid containing a substance to promote a reaction between the aldehyde and the methylene compound or a reaction between the ketone and the methylene compound and a reaction in which the organic reaction is to obtain an alkene by dehydration condensation, and a fourth combination:

a combination of the at least two fluids which are a fluid containing at least any one of aldehyde or ketone, and at least one alcohols, and a fluid containing a proton acid catalyst to promote a reaction between the aldehyde and the alcohols or a reaction between the ketone and the alcohols and the organic reaction is an acetalization reaction.

The present invention is a method for producing an organic compound, in which a stirring apparatus which comprises an outer wall and an inner wall that is arranged inside the outer wall concentrically, at least any one of the outer wall and the inner wall rotating relative to the other, and a substance to be processed is passed through a processing space formed between the outer wall and the inner wall and stirred, wherein by using the stirring apparatus having a plurality of labyrinth seals laid on the processing space, a substance to be processed containing at least one kind of organic compound is introduced from an upstream side of the labyrinth seal, and retention of the substance to be processed in the upstream side of the labyrinth seal and passing of the substance to be processed the subsequent to the retention through the labyrinth seal are repeated whereby the substance to be processed is stirred.

In the stirring apparatus is used in the production method, it may be carried out in a way such that the processing space is arranged on a narrow seal space and the upstream side of the seal space and is continuously provided with a plurality of the seal space and the retention space from the upstream side to the downstream side of the flow of the substance to be processed as a set of the retention space wider than the seal space, wherein the outer wall and the inner wall are circular truncated cone shape, and a clearance adjustment mechanism for transferring the at least any one of the outer wall and the inner wall concentrically is installed in order to adjust the size of the seal space.

In the fluid processing apparatus used in the method for producing an organic compound according to the present invention, the fluid processing apparatus is configured such that an upstream-side processing part defined by at least two processing surfaces which relatively rotate and a downstream-side processing part arranged in a downstream side of the upstream-side processing part are provided, the upstream-side processing part is configured to carry out an upstream-side processing to a fluid to be processed by passing the fluid to be processed through an upstream-side processing space defined by the at least two processing surfaces, and the downstream-side processing part is provided with a downstream-side processing space which functions to retain and stir the fluid to be processed by a plurality of labyrinth seals; and an upstream-side outflow port of the fluid to be processed from the upstream-side processing part is open to the downstream-side processing space, and the downstream-side processing space is configured to perform a function of controlling retention time by using the labyrinth seals.

This apparatus may be carried out in a way such that the downstream-side processing space is provided with a narrow seal space and a retention space that is arranged in the upstream side of the seal space and is wider than the seal space. This apparatus may be carried out in such a way that the seal space can be adjusted.

This apparatus may be carried out in such a way that the upstream-side outflow port is open to the retention space.

Further, this apparatus may be carried out in such a way that a plurality of the pairs of the seal space and the retention space are continuously arranged from an upstream to a downstream of the flow of the fluid to be processed.

This apparatus may be carried out in such a way that the downstream-side processing part comprises a cylindrical receiving part which defines the downstream side processing space and a column part which is received by the cylindrical receiving part, these parts defining the downstream-side processing space, by rotating at least any one of the cylindrical receiving part and the column part, the cylindrical receiving part and the column part relatively rotate. The rotation of at least any one of the cylindrical receiving part and the column part may be carried out independently of the rotation of the processing surface of the upstream-side processing part, or the rotation of at least any one of the cylindrical receiving part and the column part may be performed integrally with the rotation of the processing surface of the upstream-side processing part.

This apparatus may be carried out in such a way that the at least two processing surfaces are disk-like processing surfaces arranged so as to be apart from each other in an axial direction of rotation of the processing surfaces, the upstream-side processing part is configured such that a fluid to be processed is passed through the upstream-side processing space with a center side of the rotation of the processing surfaces as an upstream and an outer circumferential side of the rotation as a downstream, thereby discharging the fluid from the upstream-side outflow port in the outer circumferential end of the upstream-side processing space; the downstream-side processing part is provided with an annular receiving space in the outer circumferential side of the upstream-side outflow port, and the receiving space is the most upstream space in the downstream-side processing space and is the space wider than the seal space.

This apparatus may be carried out in such a way that a temperature adjusting mechanism may be installed for a purpose of controlling a temperature of the fluid to be processed in the downstream-side processing space, and a plurality of the temperature adjusting mechanisms may be installed and each of them may be adjusted to different temperatures.

In this apparatus, a distance between the at least two processing surfaces is mechanically set. The apparatus is installed with a clearance measurement sensor to measure the clearance and a clearance adjustment mechanism that automatically moves one processing surface of the at least two processing surfaces based on the measurement result of the clearance measurement sensor, the position of the one processing surface is variable.

This apparatus may be installed with a microwave irradiating mechanism to the fluid to be processed in the downstream-side processing space. Further, this apparatus may be installed with a pressure adjusting mechanism for the purpose of controlling a pressure of the fluid to be processed in the downstream-side processing space.

This apparatus may be provided with an introduction part in the downstream-side processing space to introduce a fluid to be processed other than the fluid to be processed from the upstream-side processing part. In addition, this apparatus may be provided with a discharge port in the downstream-side processing space to discharge a gas that is generated due to the upstream-side processing and/or the downstream-side processing performed in the downstream-side processing part. Further in addition, this apparatus may be provided with a plurality of discharge ports in the downstream-side processing part for the purpose of enabling discharge of the fluid to be processed in the downstream-side processing space for each retention time.

This apparatus may be carried out in such a way that the apparatus is configured such that the upstream-side processing in the upstream-side processing part is conducted to the fluid to be processed under a laminar flow condition, and the downstream-side processing in the downstream-side processing part is conducted to the fluid to be processed under non-laminar flow condition.

Further, the fluid processing apparatus used in the method for producing an organic compound according to the present invention may be carried out as the embodiments described below.

The fluid processing apparatus used in the method for producing an organic compound according to the present invention relates to the fluid processing apparatus which comprises an upstream-side processing part defined by at least two processing surfaces that is positioned in facing to each other so as to be able to approach to and separate from each other and relatively rotate and a downstream-side processing part that is arranged in a downstream side of the upstream-side processing part, the upstream-side processing part is carried out an upstream-side processing to a fluid to be processed by passing the fluid to be processed through an upstream-side processing space defined by the at least two processing surface. In this apparatus, the downstream-side processing part is provided with a downstream-side processing space connecting to the upstream-side processing space, and a part of a rotating member that rotates integrally with rotating processing surface of the upstream-side processing part constitutes a part of a wall surface that defines the downstream-side processing space. The downstream-side processing part is configured such that the downstream-side processing to the fluid to be processed is continuously carried out with the upstream-side processing by utilizing the rotation of the rotating member.

This apparatus may be carried out in such a way that the apparatus is configured to control the processing characteristics of the fluid to be processed with the downstream-side processing, outer circumferential side of the rotating member as an upstream and a center side of the rotation of the rotating member as a downstream. Further, this apparatus may be carried out in such a way that the apparatus is configured such that the downstream-side processing part comprises a cylindrical flow path extending in an axial direction of the rotation of the rotating member as at least a part of the downstream-side processing space, and in the cylindrical flow path, the processing characteristics of the fluid to be processed are controlled.

this apparatus may be carried out in such a way that the downstream-side processing part is configured to control a retention by means of a centrifugal force.

This apparatus may be carried out in such a way that the rotating member that rotates integrally with the rotating processing surface is a column part having a columnar shape as a whole, the rotating processing surface is arranged on one upstream-side end surface of the column part, the column part is arranged inside a cylindrical receiving part having a cylindrical shape as a whole, the downstream-side processing space is the space that is defined by at least any one of inner surfaces of the downstream-side end surface and an outer circumferential surface of the column part and at least any one of outer surfaces of a downstream-side end surface and an inner circumferential surface in the cylindrical receiving part, at least any one of the inner surface and the outer surface that define the downstream-side processing space is provided with concave and convex for fluid processing, and the downstream-side processing is conducted by the interaction between the concave and convex for fluid processing and the wall surface that is in a position facing to the concave and convex.

This apparatus may be installed with a position adjusting mechanism in which a position of a part of the wall surface that defines the downstream-side processing space is variable in order to control the retention time of the fluid to be processed in the downstream-side processing space.

This apparatus may be carried out in such a way that the apparatus is configured such that the upstream-side processing part is provided with at least two processing members arranged to be opposite to each other so as to be able to approach to and separate from each other, at least one of which rotates relative to the other and a plurality of the processing surfaces that are arranged in the position opposite to each other in each of the at least two processing members, one of the at least two processing members constitutes a part of the rotating member, the at least two processing surfaces is capable of approaching to and separating from in the axial direction of the rotation of the processing surface, the at least two processing surfaces define the upstream-side processing space that is an annular flow path through which the fluid to be processed is passed, the upstream-side processing to the fluid to be processed is conducted between the at least two processing surfaces by passing the fluid to be processed as a thin film fluid from the inside to the outside in a radial direction of the annular flow path, an upstream-side outflow port is arranged on the outer circumferential end of the annular flow path, and a distance between the processing surfaces is controlled by a balance between a force given to the at least two processing surfaces in an approaching direction thereof to the axial direction and a force given to the at least two processing surfaces in a separating direction to the axial direction, the fluid to be processed that is discharged from the upstream-side outflow port is released from a forced the force due to the processing surfaces, thereby discharging to the downstream-side processing space, and the fluid to be processed passes through the downstream-side processing space while being affected by the rotation of the rotating member.

This apparatus may be carried out in such a way that the upstream-side processing part comprises a first processing member and a second processing member, the first processing part constitutes a part of the rotation member, as the at least two processing surfaces, the first processing member is provided with the first processing surface and the second processing member is provided with the second processing surface, a casing to accommodate the first processing member is arranged outside the first processing member, the space between the outer circumferential surface of the first processing member and the inner circumferential surface of the casing and the space between the outer circumferential surface of the first processing member and the inner surface of the bottom part of the casing constitute at least a part of the downstream-side processing space, the downstream-side processing space is a flow path space in which the fluid to be processed discharged from the upstream-side processing space is retained.

In addition, the continuous stirring apparatus used in the method for producing an organic compound according to the present invention may be carried out as the embodiment described below. In this embodiment, the downstream-side processing is carried out only in the downstream-side processing part by removing the upstream-side processing part of the fluid processing apparatus used in the method for producing an organic compound. The downstream-side processing is a processing of organic reaction processing.

The continuous stirring apparatus used in the method for producing an organic compound according to the present invention relates to the stirring apparatus which comprises an outer wall and an inner wall that is arranged inside the outer wall concentrically, at least any one of the outer wall and the inner wall rotating relative to the other, and a substance to be processed is passed through a processing space formed between the outer wall and the inner wall and stirred. This apparatus is configured such that a plurality of labyrinth seals is laid on the processing space, and retention of the substance to be processed in the upstream side of the labyrinth seal and passing of the substance to be processed the subsequent to the retention through the labyrinth seal are repeatedly carried out whereby the substance to be processed is stirred.

Further, this apparatus is configured such that a plurality of labyrinth seals is laid on the processing space, and retention of the substance to be processed in the upstream side of the labyrinth seal and passing of the substance to be processed the subsequent to the retention through the labyrinth seal are repeatedly carried out whereby the retention time of the substance to be processed is controlled and stirred.

In the present invention, the substance to be processed is a fluid that is going to be processed in the processing space.

This apparatus may be carried out in such a way that the processing space is arranged on a narrow seal space and the upstream side of the seal space and is continuously provided with a plurality of the seal space and the retention space from the upstream side to the downstream side of the flow of the substance to be processed as a set of the retention space wider than the seal space.

This apparatus may be carried out in such a way that the outer wall is a cylindrical wall and the inner wall is a cylindrical wall.

This apparatus may be carried out in such a way that a temperature adjusting mechanism is installed for a purpose of controlling a temperature of the substance to be processed in the processing space, and a plurality of the temperature adjusting mechanisms is installed to adjust the substance to be processed in the processing space at different temperatures by means of these temperature adjusting mechanisms.

This apparatus may be carried out in such a way that a supplying port to supply the substance to be processed into the processing space is provided, one end of the supplying port is connected to outside of the continuous stirring apparatus, and the other end of the supplying port is communicated with the processing space.

This apparatus may be carried out in such a way that an introduction port to introduce the substance to be processed into the processing space is arranged as a path different from the substance to be processed that is supplied from the supplying port.

This apparatus may be carried out in such a way that a plurality of discharge ports to discharge the substance to be processed from the processing port at different processing times is arranged.

This apparatus may be carried out in such a way that a microwave irradiating mechanism to the substance to be processed in the processing space is installed.

This apparatus may be carried out in such a way that a clearance adjustment mechanism to adjust the size of the seal space is installed.

This apparatus may be carried out in such a way that the outer wall and the inner wall are circular truncated cone shape, a clearance adjustment mechanism for transferring the at least any one of the outer wall and the inner wall concentrically is installed for the purpose of adjusting the size of the seal space.

This apparatus may be carried out in such a way that a processing part having an outer wall and an inner wall that is arranged inside the outer wall is provided, the outer wall and the inner wall are concentric, the processing part comprises a processing space; the processing space is a space between the outer wall and the inner wall, a member constituting a labyrinth seal mechanism including a plurality of labyrinth seals is provided at the at least any one of the outer wall and the inner wall, and at least any one of the outer wall and the inner wall rotates to the other, retention of a substance to be processed in the upstream side of the labyrinth seal and passing of the substance to be processed through the labyrinth seal subsequent to the retention are repeatedly conducted, and the processing space is the space where the substance to be processed is stirred.

Advantages of the Invention

The present invention could provide a method for producing an organic compound in which an intended product can be obtained with a high yield as a result that a series of chemical reaction processing is conducted under the various reaction condition such as raw material concentration, temperature condition in the reaction field, pressure condition and stirring condition, presence/absence of catalyst and its optimization, and reaction time, especially the reaction time being adjusted, by passing fluid to be processed through an upstream-side processing part in which the fluid to be processed is processed in between at least two processing surfaces which rotate relative to each other thereby carrying out fluid processing to the fluid to be processed (upstream-side processing), and by passing the fluid to be processed that is subjected to the upstream-side processing through a downstream-side processing part arranged in the downstream side of the upstream-side processing part thereby carrying out further fluid processing of the fluid to be processed (downstream-side processing).

In particular, the preset invention could provide a method for completing emulsion polymerization in a single apparatus in which a plurality of labyrinth seals having the functions to retain and stir the fluid to be processed which is processed in the upstream-side processing part is provided at the downstream-side processing part, by continuously performing the upstream-side processing and the downstream-side processing, for example, in the emulsion polymerization, the emulsification by the upstream-side processing and the polymerization reaction by the retention in the downstream-side processing could be carried out without interruption. In addition, by adjusting the temperature by means of the temperature adjusting mechanism installed in the downstream-side processing part as described in claim 5, the fluid to be processed which was processed in the upstream-side processing could be caused to slowly pass under the well stirred condition through the processing space in the downstream-side processing part at a prescribed temperature. With this, the reaction could progress with keeping the temperature of the fluid to be processed at a prescribed value.

The present invention could provide a method for producing an organic compound in which even when the upstream-side processing part of the fluid processing apparatus is removed and the continuous stirring apparatus in which the downstream-side processing is carried out only by the downstream-side processing part, upon carrying out a chemical reaction or a series of fluid processing such as emulsification, dispersion, mixing in the stirring apparatus by performing the fluid processing to the substance to be processed in the processing space formed between the outer wall and the inner wall at least one of which rotates relative to the other, and as a result that various reaction conditions such as concentration of raw materials, temperature condition in the reaction field, pressure and stirring conditions, presence/absence of the catalyst and its optimization, and the reaction time can be adjusted, especially the reaction time can be adjusted, an intended product with high efficiency could be obtained.

In particular, a plurality of labyrinth seals is laid on the processing space, and the retention of the substance to be processed in the upstream side of the labyrinth seal and passing of the substance to be processed through the labyrinth seal subsequent to the retention are repeatedly carried out, the substance to be processed is stirred or the stirring is carried out by controlling the retention time of the substance to be processed, whereby the retention time of the substance to be processed in the processing space could be controlled, especially since the continuation of reaction and reaction time for completing the reaction in an organic reaction could be sufficiently ensured, the fluid processing to the substance to be processed could be effectively performed.

BEST MODES FOR CARRYING OUT THE INVENTION

Figure 1:
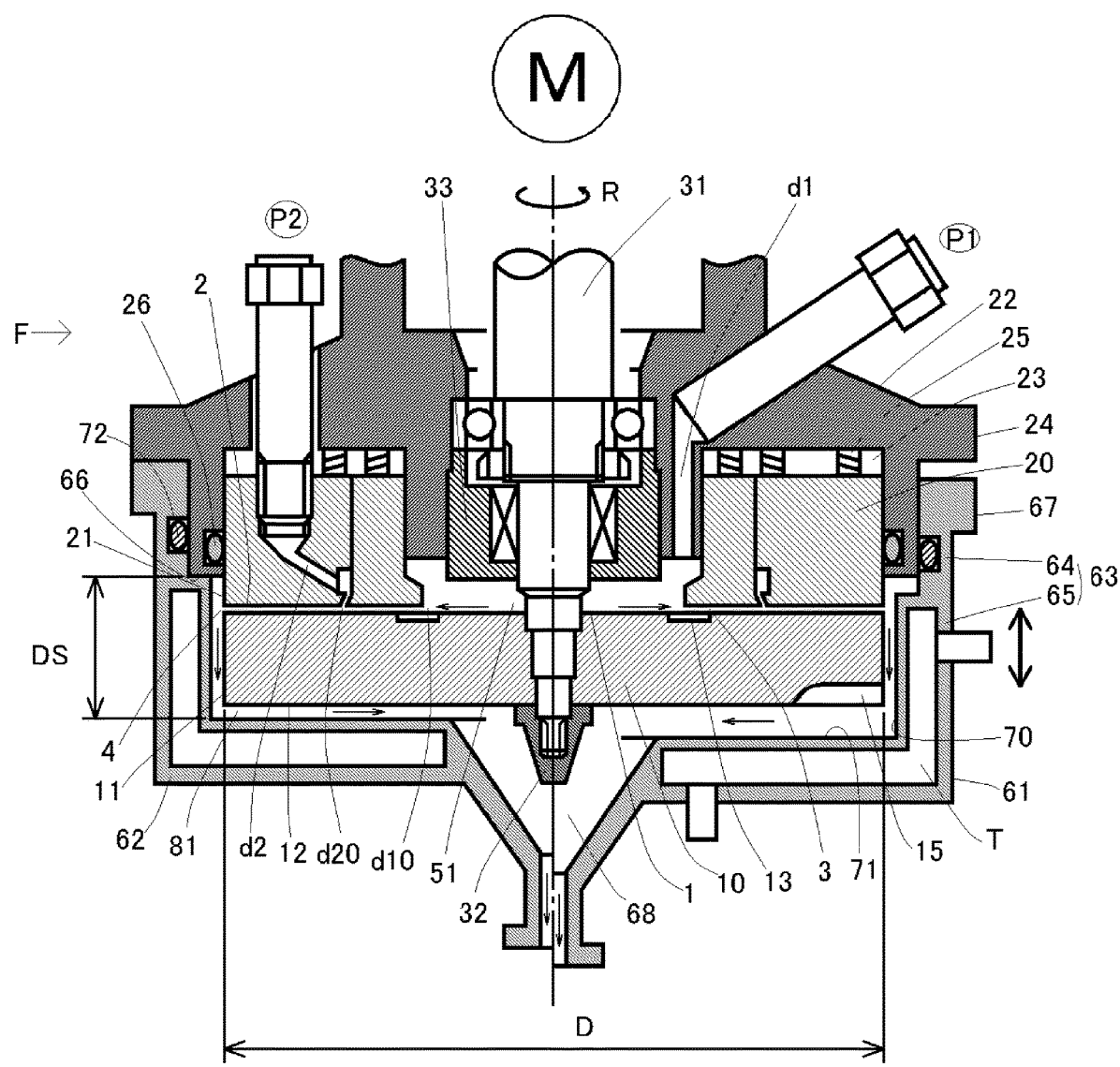
FIG. 1 This is a rough cross-section view of the fluid processing apparatus used for carrying out the present invention.

Hereinafter, embodiments according to the present invention will be described with referring to the drawings.

The present invention relates to a method for producing an organic compound to obtain the organic compound in which an organic reaction such as an oxidation reaction, a reducing reaction, a substitution reaction, an addition reaction, an elimination reaction, a rearrangement reaction, a condensation reaction, a pericyclic reaction, a polymerization reaction, a solvolysis reaction, a dehydration reaction, and a halogenation reaction is conducted by using organic compounds as starting raw materials.

Fluid Processing Apparatus F

The fluid processing apparatus F that is suitable for the method of producing an organic compound according to the present invention will be described below with referring to FIG. 1 to FIG. 15.

The fluid processing apparatus F is configured such that an upstream-side processing part defined by at least two processing surfaces that rotate relative to each other and a downstream-side processing part arranged in a downstream side of the upstream-side processing part are provided, the upstream-side processing part passes a fluid to be processed through into an upstream-side processing space defined by the at least two processing surface, so that a upstream-side processing to the fluid to be processed is performed.

The part in which the fluid is processed in the upstream-side processing space in the fluid processing apparatus F is the same as the apparatus described in Patent Documents 3 to 5. Specifically, the fluid to be processed is processed in the upstream-side processing space defined by the at least two processing surfaces that rotate relative to each other. This apparatus is the apparatus in which of the fluids to be processed, a first fluid that is the first fluid to be processed is introduced into the upstream-side processing space, and of the fluids to be processed, a second fluid that is the second fluid to be processed is introduced into the upstream-side processing space from a different flow path that is independent of the flow path into which the first fluid is introduced and has an opening leading to the upstream-side processing space, whereby the first fluid and the second fluid are mixed in the upstream-side processing space to continuously perform the fluid processing. In other words, this apparatus is the apparatus that these fluids are merged to make a thin film fluid in the upstream-side processing space defined by disk-like processing surface that is arranged in a position opposite in an axial direction of rotation, and the fluids to be processed are processed in the thin film fluid thereby discharging the processed fluid from the upstream-side processing space. This apparatus is the most suitable for processing a plurality of the fluids to be processed, but this can also be used to carry out fluid-processing of a single fluid to be processed in the upstream-side processing space.

In FIG. 1, the upside and downside of the figure correspond to the upside and downside of the apparatus, but in the fluid processing apparatus used in the present invention, the up and down, right and left, and front and back merely indicate relative relationship of the positions, thus these do not identify the absolute positions. In FIG. 1, FIG. 2(A), and FIG. 3(B), "R" indicates the rotation direction. In FIG. 3(B), "C" indicates the centrifugal direction (radius direction). In the fluid processing apparatus used in the embodiments of the present invention, as a whole, the term "column" should not be interpreted as a mathematical column, this includes not only the column but also a hollow cylinder (hereinafter, cylinder) and a cylinder having a top.

The fluid processing apparatus F used in the embodiments of the present invention is different from the apparatus described in Patent Documents 3 to 5 in the point that the fluid is processed in the upstream-side processing space, and the downstream-side processing space is provided in the fluid processing apparatus F to further perform the fluid processing to the fluid which is subjected the fluid processing in the upstream-side processing space and is discharged from the upstream-side processing space. However, since it is important to explain the structure and action of the upstream-side processing space that is common with the apparatus described in the prior technological references in order to deepen the understanding of the present invention as the fluid processing apparatus, the part of the upstream-side processing space will be first explained. In the present invention, at least one organic compound is included in the fluid to be processed.

Processing Surfaces

The fluid processing apparatus F comprises two processing members of a first processing member 10 and a second processing member 2 which are arrange in the position facing each other, at least one of which rotates to the other. The faces facing to each other in the processing members 10 and 20 constitute the respective processing surfaces. The first processing member 10 comprises the first processing surface 1 and the second processing member 20 comprises the second processing surface 2.

Both the processing surfaces 1 and 2 define the upstream-side processing part and the upstream-side processing space 3, and in the upstream-side processing space 3, the fluid processing of the fluid to be processed such as mixing is carried out. The upstream-side processing space 3 is a ring-like space which will be described later. The fluid processing performed in the upstream-side processing space 3 is called the upstream-side processing.

The distance between the processing surfaces 1 and 2 can be arbitrary changed, but in this embodiment, the distance is adjusted to a minute space of 1 mm or less, for example, in the range of about 0.1 μm to 50 μm. By so doing, the fluid to be processed passing through between the processing surfaces 1 and 2 becomes a forced thin film fluid forced by the fluid processing surfaces 1 and 2.

In the case that a plurality of fluids to be processed including the first fluid and the second fluid is processed by using the fluid processing apparatus F, the fluid processing apparatus F is connected to the flow path of the first fluid, and the first fluid is introduced from the upstream end of the upstream-side processing space 3 defined by the processing surfaces 1 and 2 (in this example, the inner side of the ring). At the same time, the upstream-side processing space 3 constitutes a part of the flow path of the second fluid that is different from the first fluid. Then, in the upstream-side processing space 3 between the processing surfaces 1 and 2, the fluids to be processed of the first fluid and the second fluid are mixed, and the fluid processing such as reacting is performed.

Specifically, the fluid processing apparatus F comprises a second holder 22 for holding the second processing member 20, a surface-approaching pressure imparting mechanism, a rotation drive mechanism, a first introduction part d1, a second introduction part d2, and a fluid pressure imparting mechanisms P1 and P2.

In this embodiment, the second processing member 20 is arranged above the first processing member 10, the lower surface of the second processing member 20 is the second processing surface 2, and the upper surface of the first processing member 10 is the first processing surface 1.

As shown in FIG. 1, in this embodiment, the first processing member 10 is a disk body not having an opening in the center thereof. The second processing member 20 is a circular body, more specifically a ring-like disk. In this embodiment, since the first processing surface 1 is disk-like shape and the second processing surface 2 is ring-like shape, the upstream-side processing space 3 defined by the processing surfaces 1 and 2 constitutes a ring-like space, namely, an annular flow path. The second processing member 20 may be a disk-like shape not having an opening in the center thereof, provided that the fluids to be processed including the first and second fluids can be introduced thereinto.

The first and second processing members 10 and 20 may be formed of a single member or a combination of plurality of members, and material of the processing members 10 and 20 is not only metal but also ceramics such as silicon carbide (SiC), sintered metal, abrasion-resistant steel, sapphire, other metal subjected to hardening treatment, and rigid material subjected to lining, coating, or plating. In this embodiment, at least part of the first and second processing surfaces 1 and 2 is mirror-polished.

Rotation of Processing Parts

Of the first processing member 10 and the second processing member 20, at least any one of the processing members rotates relative to the other by the rotation drive mechanism M such as an electric motor. The driving axis of the rotation drive mechanism M is connected to a rotation axis 31, in this example, the first processing member 10 attached to the rotation axis 31 rotates relative to the second processing member 20. In this embedment, the rotation axis 31 is fixed to the center of the first processing member 10 by a fixing tool 32 such as a screw, the rear end thereof is connected to the rotation axis of the rotation drive mechanism M, and driving force of the rotation drive mechanism M is transmitted to the first processing member 10 thereby rotating the first processing member 10, supporting part 33 for axially supporting the rotation axis 31 is provided at the center of the circular second holder 22. Needless to say, the second processing member 20 supported by the second holder 22 may be rotated, or both the processing members may be rotated.

Approach to and Separation from of Processing Surfaces

In this embodiment, at least any one of the first processing member 10 and the second processing member 20 can approach to and separate from each other in the axial direction of the rotation axis 31, so that the processing surfaces 1 and 2 may approach to and separate from each other.

In this embedment, the first processing member 10 is fixed in the axial direction and is configured to rotate in the circumferential direction. The second processing member 20 approaches to and separates from the first processing member 10 in the axial direction, and the second processing member 20 is retractably accommodated in an accommodating part 23 that is provided in the second holder 22 by using a sealing mechanism such as an O-ring 26. The accommodating part 23 is a depression for accommodating the portion of the second processing member 20 that is mainly opposite to the second processing surface side in the axial direction, in plane-view, it forms a circle, that is, it is a groove formed in ring-like shape.

The second processing member 20 may be arranged in the accommodating part 23 of the second holder 22 so as to be movable only to parallel in the axial direction or may be accommodated in a state where the clearance is set to large or may be by a floating mechanism which holds the second processing member 20 in a three-dimensionally changeable manner.

Fluid Pressure Imparting Mechanism

The fluids to be processed (in this example, the first fluid and the second fluid) are supplied to the fluid processing apparatus F by the fluid pressure imparting mechanisms P1 and P2. Various types of pumps may be used for the pressure imparting mechanisms P1 and P2, and the fluids to be processed may be supplied to the fluid processing apparatus F at predetermined pressures. Further, in order to suppress the occurrence of pulsing during pumping, a pressure imparting apparatus equipped with a pressure container may also be used as the pressure imparting mechanisms P1 and P2. A gas for applying pressure is introduced into the pressure container that stores the fluids to be processed, and the fluid to be processed is pushed out by the pressure, whereby the fluids to be processed can be pumped.

Movement of Fluids to be Processed

The fluids to be processed are applied the pressure by the fluid pressure imparting mechanisms P1 and P2. Under the pressurized state, the fluids to be processed including the first fluid and the second fluid are introduced into between the processing surfaces 1 and 2 through the first introduction part d1 and the second introduction part d2.

In this embodiment, the first introduction part d1 is the flow path arranged in the circular second holder 22, and one end thereof is connected to the cylindrical introduction space 51. The introduction space 51 is the cylindrical space that is defined by among the lower surface of the supporting part 33, the lower surface of the inner circumferential side of the second holder 22, the inner circumferential surface of the second processing member 20, and the first processing surface 1.

The second introduction part d2 is the flow path arranged inside the second processing member 20, and the one end thereof is open to the second processing surface 2, and the opening serves as a direct introduction opening port (second introduction port d20) to the upstream-side processing space 3.

The first fluid is introduced from the first introduction part d1 into the upstream-side processing space 3 by way of the introduction space 51 from the upstream end of the upstream-side processing space 3, the end being a clearance between the processing parts 10 and 20 in the inner surface sides thereof. This clearance serves as the first introduction port d10. The first fluid introduced from the first introduction port d10 into the upstream-side processing space 3 becomes a thin film fluid between the first processing surface 1 and the second processing surface 2, and then passes through outside of both the processing members 10 and 20. In these between the processing surfaces 1 and 2, the second fluid pressurized to the predetermined pressure is supplied from the second introduction port d20 and is merged with the first fluid which serves as the thin film fluid, and as the upstream-side processing, a reaction processing is performed mainly while or after mixing by molecular dispersion. As the upstream-side processing, only mixing mainly by molecular dispersion may be conducted. With this molecular dispersion, the reactants contained in the fluids to be processed can be instantly mixed at a molecular level. This reaction process may be accompanied by crystallization, precipitation, separation, or the like, or may be not.

After the upstream-side processing is subjected, the thin film fluid formed by the first fluid and the second fluid is discharged from the processing surfaces 1 and 2 (in this example, between the outer circumferential end and the outer circumferential end of the processing surfaces 1 and 2, namely, the downstream end of the upstream-side processing space 3) to the outside of the processing members 10 and 20. since the downstream end of the upstream-side processing space 3 is an outlet of the upstream-side processing space 3, hereinafter this downstream end of the upstream-side processing space 3 is also called a upstream-side outflow port 4. The fluid discharged from the processing surfaces 1 and 2 to outside of the processing members 10 and 20 is received by an outer casing 61 that is arranged outside the first processing member 10, and the fluid processing is efficiently subjected to the fluid which is performed the upstream-side processing, and then the fluid is discharged to outside of the system (outside of the apparatus). The fluid discharged from the processing surfaces 1 and 2 to outside of the processing members 10 and 20 is released from the force given by the processing surfaces 1 and 2 and is discharged to a wider flow space (the downstream-side processing space 81).

since the first processing member 10 rotates, the fluid to be processed in the upstream-side processing space 3 does not move linearly from the inside to the outside, but this moves almost spirally from the inside to the outside due to a synthetic vector of the moving vector in the radial direction of the ring and the moving vector in the circumferential direction acting on the fluid to be processed.

In the motion of fluid, a dimensionless number representing the ratio of an inertial force and a viscous force is called Reynolds number and is expressed by the following formula (2).

$$\text{Reynolds number } Re = \text{inertial force/viscous force} = \rho V L/\mu = V L/\nu \quad \text{Formula (2)}$$

Here, $\nu = \mu/\rho$ is dynamic viscosity, V is a representative velocity, L is a representative length, $\rho$ is a representative viscosity, and $\mu$ is a representative viscosity. Here, taking the critical Reynolds number as the boundary, the flow of a fluid is a laminar flow below the critical Reynolds number, and is a turbulent flow when equal to or above the critical Reynolds number.

The distance between the processing surfaces 1 and 2 of the fluid processing apparatus F is usually adjusted to a minute clearance of 1 mm or less, for example in the range of about 0.1 to about 50 μm, thus, the amount of the fluid held between the processing surfaces 1 and 2 is extremely low. Therefore, the representative length L becomes very short, the centrifugal force of the thin film fluid passing through between the processing surfaces 1 and 2 is smell, and the effect of the viscous force becomes large in the thin film fluid. Accordingly, the Reynolds number decreases, and the thin film fluid becomes a laminar flow.

Here, by increasing the rotation number of the first processing member 10 to raise the Reynolds number, a shear force may be applied to the thin film fluid.

The centrifugal force is one kind of the inertial forces in the rotary motion, which is the force from the center to outer direction. The centrifugal force is expressed by the following formula (3).

$$\text{Centrifugal force } F = ma = mv^2/R \quad \text{Formula (3)}$$

Here, "a" represents acceleration, "m" represents mass, "v" represents velocity, and "R" represents radius.

As mentioned above, since the amount of the fluid held between the processing surfaces 1 and 2 is low, the ratio of the velocity to the mass of the fluid becomes very large and its mass becomes negligible. Accordingly, in the thin film fluid formed between the processing surfaces 1 and 2, the effect of gravity can be ignored.

Balance of the Forces

Next, the surface-approaching pressure imparting mechanism for imparting the force to the processing member exerting in the direction of approaching the first processing surface and the second processing surface 2 each other will be explained. In this embodiment, the surface-approaching pressure imparting mechanism is arranged in the second holder 22 and biases the second processing member 20 toward the first processing member 10. The surface-approaching pressure imparting mechanism is a mechanism to generate force (hereinafter, surface-approaching pressure) to press the first processing surface 1 of the first processing member 10 and the second processing surface 2 of the second processing member 20 in the direction to make them approach to each other. By the balance between the surface-approaching pressure and the force to separate the processing surfaces 1 and 2 from each other due to the fluid pressure imparting mechanisms P1 and P2, i.e., the force such as the fluid pressure, the mechanism generates a thin film fluid having minute thickness of 1 mm or less in the level of nm or μm. In other words, the distance between the processing surfaces 1 and 2 is kept in a predetermined minute distance by the balance between these forces.

In the embodiment shown in FIG. 1, the surface-approaching pressure imparting mechanism is arranged between the accepting part 23 and the second processing member 20. Specifically, the surface-approaching pressure imparting mechanism is composed of a spring 25 to bias the second processing member 20 toward the first processing member 10 and a biasing-fluid introduction part (not shown in Figure) to introduce a biasing fluid such as air and oil, wherein the surface-approaching pressure is provided by the spring 25 and the fluid pressure of the biasing fluid. The surface-approaching pressure may be provided by any one of this spring 25 and the fluid pressure of this biasing fluid; and other forces such as magnetic force and gravitation may also be used.

The second processing member 20 recedes from the first processing member 10 thereby making a minute space between the processing surfaces by separating force, caused by viscosity and the pressure of the fluid to be processed applied by the fluid pressure imparting mechanisms P1 and P2, against the bias of this surface-approaching pressure imparting mechanism. By this balance between the surface-approaching pressure and the separating force as mentioned above, the first processing surface 1 and the second processing surface 2 can be set with the precision of a micrometer level; and thus, the minute space between the processing surfaces 1 and 2 may be set. The separating force mentioned above includes fluid pressure and viscosity of the fluid to be processed, centrifugal force by rotation of the processing members, negative pressure when negative pressure is applied to the biasing-fluid introduction part, and spring force when the spring 25 works as a pulling spring. This surface-approaching pressure imparting mechanism may be arranged in the first processing member 10 not in the second processing member 20, or may be arranged in both.

At least any one of the first and second processing members 10 and 20 may be installed a temperature adjusting mechanism to adjust the temperature thereof by cooling or heating. Alternatively, the fluids to be processed introduced from the first introduction part d1 and the second introduction part d2 into the fluid processing apparatus F may be cooled or heated to adjust the temperatures thereof. The temperature energy possessed of the fluid to be processed may also be used for separation of fine particles in the case of a reaction accompanied with separation.

Depression and Micro-Pump Effect

Figure 2:
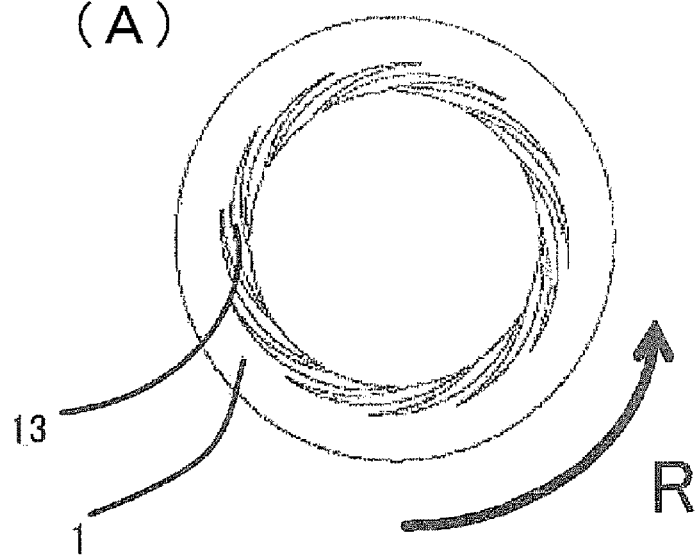
FIG. 2(A) is a rough plane view of the first processing surface of the fluid processing apparatus shown in FIG. 1.
FIG. 2(B) is an enlarged view of the essential part of the processing surface of the apparatus.
Figure 2:
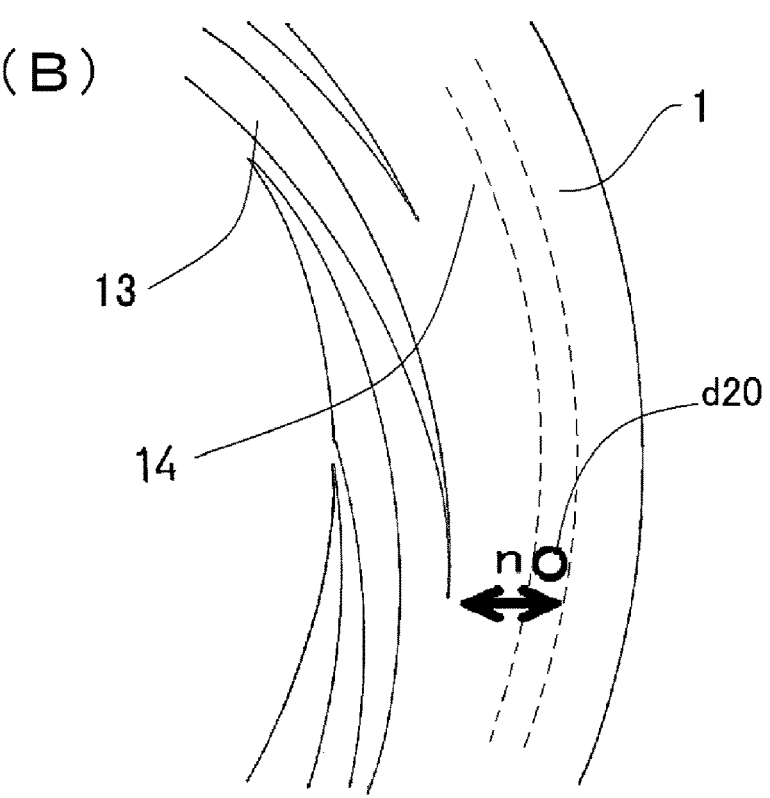
Figure 3:
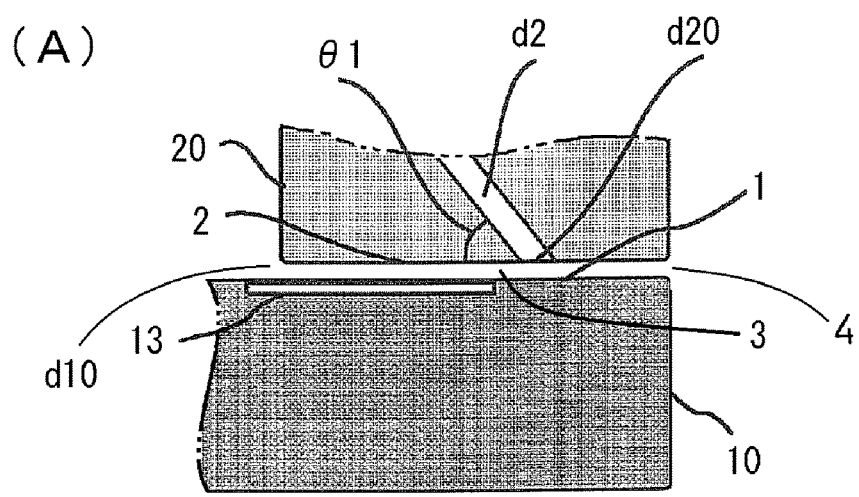
FIG. 3(A) is a cross-section view of the second introduction part of the apparatus.
FIG. 3(B) is an enlarged view of the essential part of the processing surface for explanation of the second introduction part.
Figure 3:
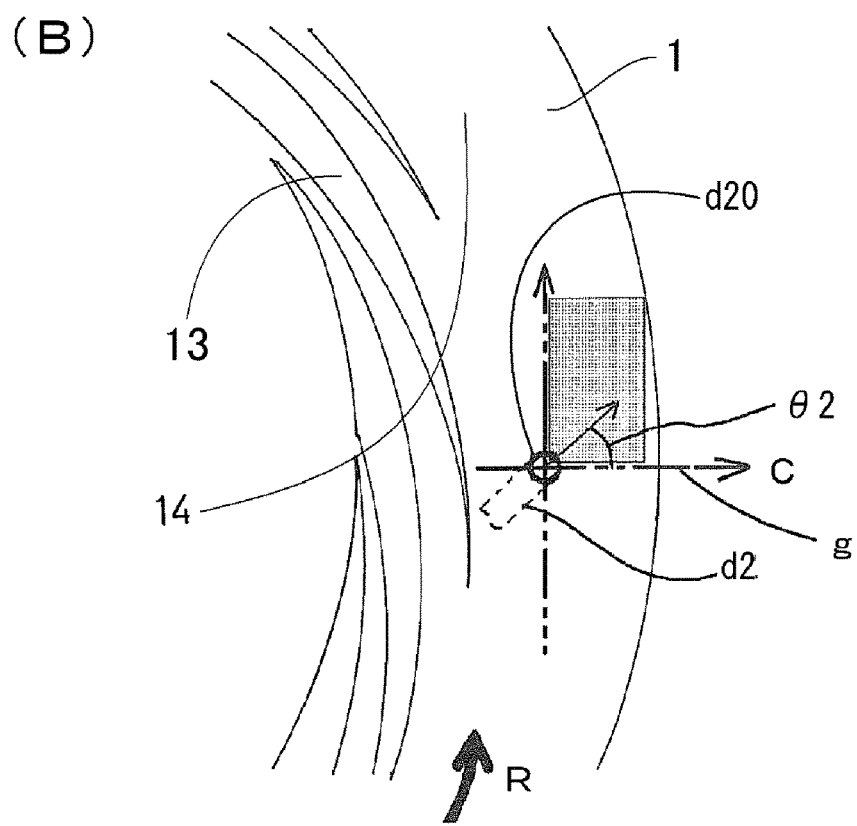

As shown in FIG. 2, in the first processing surface 1 of the first processing member 10, a groove-like depression 13 extended toward an outer side from the central part of the first processing member 10, namely in a radius direction, may be formed. The depression 13 may be, as a plane view, curved or spirally extended on the first processing surface 1 as shown in FIG. 2(B), or though not shown in the drawing, may be extended straight radially, or bent at a right angle, or jogged; and the concave portion may be continuous, intermittent, or branched. In addition, this depression 13 may be formed also on the second processing surface 2, or on both the first and second processing surfaces 1 and 2. By forming the depression 13 as mentioned above, the micro-pump effect can be obtained so that the fluid to be processed may be sucked into between the first and second processing surfaces 1 and 2.

When the depression 13 is provided on the first processing surface 1, it is preferable that the base end of the depression 13 reach the introduction space 51. The front end of the depression 13 extends toward the outer circumferential direction of the first processing member 10, and the depth thereof (cross-section area) may be gradually decreased as going from the base end toward the front end thereof.

Between the front end of the depression 13 and the outer circumferential surface 11 of the first processing member 10, a flat surface 14 not having the depression 13 is provided.

Rotation Speed and Fluid Processing

When the second introduction port d20 of the second introduction part d2 is arranged in the second processing surface 2, it is preferable to provide in the position facing the flat surface 14 of the first processing surface 1.

This second introduction port d20 is arranged preferably in the downstream (outside in this case) of the depression 13 of the first processing surface 1. The second introduction port d20 is arranged especially preferably at a position opposite to the flat surface 14 located nearer to the outer diameter than a position where the direction of flow upon introduction of the first fluid by the micro-pump effect into the upstream-side processing space is changed to the direction of a spiral and laminar flow formed between the processing surfaces. Specifically, in FIG. 2(B), a distance n from the outermost side of the depression 13 arranged in the first processing surface 1 in the radius direction is preferably about 0.5 mm or more. Especially in the case of separating fine particles from a fluid, it is preferable that mixing of a plurality of fluids to be processed due to the molecular dispersion as well as reaction and separation of the fine particles therefrom be effected under the condition of a laminar flow.

In order to carry out the processing of the fluids to be processed under the laminar flow condition, the circumferential velocity in the outer circumference of the first processing member 10 is suitable for in the range of 0.3 to 35 m/sec.

Second Introduction Part

The shape of the second introduction port d20 may be, as shown in FIG. 1, a continuous opening having a shape such as a concentric circular ring-shape surrounding the central opening of the second processing surface 2 that is a ring-like disk or as shown in FIG. 2(B) and FIG. 3(B), may be an independent opening having a shape such as a circular. In the case that the shape of the second introduction port d20 is the circular ring-shaped, the opening of the circular ring-shaped may be continuous over the entire circumference or may be partially discontinuous.

When the circular ring-shaped second introduction port d20 is arranged in concentrically surround the central opening of the second processing surface 2, the second fluid can be processed under the same condition in the circumferential direction upon introduction this into the upstream-side processing space 3, thus, when producing the mass production of an intended product, it is preferable that the shape of the opening be a concentric circular ring-shape.

This second introduction part d2 may have directionality. For example, as shown in FIG. 3(A), the direction of introduction from the second introduction port d20 of the second processing surface 2 is inclined at a predetermined elevation angle ($\theta 1$) relative to the second processing surface 2. The elevation angle ($\theta 1$) is set at more than 0° and less than 90°, and when the reaction speed is high, the angle ($\theta 1$) is preferably set in the range of 1° to 45°.

In addition, as shown in FIG. 3(B), in the case that the second introduction port is an independent opening hole, this may have directionality in a plane along the second processing surface 2. The direction of introduction of this second fluid is in the outward direction departing from the center in a radial component of the processing surface and in the forward direction in a rotation component of the fluid between the relatively rotating processing surfaces. In other words, a predetermined angle ($\theta 2$) exists facing the rotation direction R from a reference line g, which is the line to the outward direction and in the radius direction passing through the second introduction port d20. This angle ($\theta 2$) is also set preferably at more than 0° and less than 90°.

Kinds of Fluid to be Processed and Number of the Flow Path

In the embodiment shown in FIG. 1, kinds of the fluid to be processed and numbers of the flow path thereof are set two respectively; but they may be one, or three or more. In the embodiment shown in FIG. 1, the second fluid is introduced into the upstream-side processing space 3 from the second introduction part d2; but this introduction part may be arranged in the first processing member 10 or in both. Alternatively, a plurality of introduction parts may be arranged relative to one fluid to be processed. Each production port is not particularly restricted in its form, size, and number; and these may be changed as appropriate. Further, the introduction port may be arranged immediately before between the first and second processing surfaces 1 and 2, or even in the upstream side thereof. The expression "first" or "second" for each fluid has a meaning for merely discriminating an $n^{th}$ fluid among a plurality of the fluids present; and therefore, a third or more fluids can also exist. In FIG. 6 to FIG. 8 and FIG. 10, the third introduction part d3 and its opening d30, which are the flow path of the third fluid as the third fluid to be processed, are shown. The third introduction part d3 is a flow path arranged inside the second processing member 20, as in the case of the second introduction part d2, and one end thereof is open at the second processing surface 2, and the introduction port thereof (third introduction port d30) is located in the second processing surface 2 in the downstream side of the second introduction port d20 of the second introduction part d2. In FIG. 6 to FIG. 8 and FIG. 10, the first introduction part d1 is omitted in order to avoid complicating the drawings. Regarding this point, it can be considered as the cross-section views at the position where the first introduction part d1 is not arranged. Each flow path is tightly sealed by liquid-tight (when the fluid to be processed is a liquid) or by airtight (when the fluid to be processed is a gas).

Downstream-Side Processing

Next, the fluid processing (downstream-side processing) in a downstream-side processing space 81, which is the essential part of the fluid processing apparatus F used in the embodiment of the present invention, will be described.

The fluid processing apparatus F comprises the downstream-side processing part arranged on the downstream side of the upstream-side processing part, and the downstream-side processing part is provided with the downstream-side processing space 81. DS region where the downstream-side processing space 81 is arranged is illustratively shown in FIG. 1 and FIG. 12(A).

In the fluid processing apparatus F used for carrying out the present invention, the upstream-side processing is carried out in the upstream-side processing space 3, and the downstream-side processing space 81 is provided for further performing the fluid processing to the fluid discharged from the downstream end of the upstream-side processing space 3 (the fluid in which the upstream-side processing is performed). The fluid processing performed in the downstream-side processing space 81 is referred to as downstream-side processing.

Outer Casing

An outer casing 61 is provided on the outside of the rotating first processing member 10 to accommodate the first processing member 10. The outer casing 61 receives the fluid discharged from the upstream-side outflow port 4. In this embodiment, the outer casing 61 accommodates the first processing member 10 and a part of the second processing member 20, the fluid flowed out from the upstream-side outflow port 4 of the first processing member 10 is subjected to the downstream-side processing in the downstream-side processing space 81 between the inner surface of the outer casing 61 and the outer surface of the first processing member 10.

In this embodiment, as shown in FIG. 1, the outer casing 61 may constitutes the cylindrical receiving part having a cylindrical shape as a whole and having a bottom part as necessary. The outer casing 61 may not be movable in an axial direction (upward and downward directions in the figure), though in this embodiment, the outer casing is provided so as to be movable in upward and downward directions. As a result, the distance between the bottom part of the first processing member (outer end surface 12 of the first processing member 10) and the bottom part 62 of the outer casing 61 (inner surface 71 of the bottom part 62) can be adjusted. In FIG. 1, a state in which the outer casing 61 is raised is illustrated on the left side of the center line, and the state in which the outer casing 61 is lowered is illustrated on the right side of the center line.

The configuration for upward and downward movement can be variously changed, but to show an example of a structure suitable for this, the outer casing 61 comprises the bottom part 62 and a circumferential wall part 63 extending upward from circumference of the bottom part 62, and in the upper end of the circumferential wall part 63, a flange 67 protruding outward in radius direction from the circumferential wall part 63 is formed over the entire circumference. In this embodiment, the circumferential wall part 63 comprises a thin wall part 64 where the thickness of the wall is thin, a thick wall part 65 where the thickness of the wall is thick, and a boundary part 66 that is a boundary between the thin wall part 64 and the thick wall part 65, the outflow part 68 is provided in the center of the bottom part 62. In this embodiment, the circumferential wall part 63 is configured to have the thin wall part 64 and the thick wall part 65; but the thickness of the circumferential wall part 63 may be constant. The flange 67 may be formed only partially in the circumferential direction, or the flange 67 may not be provided on the outer casing 61. The outflow part 68 is a discharge port to discharge the fluid flowing through the downstream-side processing space 81 to the outside of the system (outside of the apparatus).

The outer casing 61 is attached to the second holder 22, and the first processing member 10 and the second processing member 20 are accommodated in the outer casing 61. As shown in FIG. 1, the second holder 22 is provided with protruding part 24 that protrudes outward in a radius direction from the outer circumferential surface of the second holder 22. When the outer circumferential surface of the second holder 22 and the inner circumferential surface of the thin wall part 64 in the outer casing 61 are brought into close contact and the lower surface of the protruding part 24 and the upper surface of the flange 67 are assembled so as to abut to each other, a step part 66 of the outer casing 61 abuts to the bottom surface of the second holder 22 in the outer circumferential side. Then, by using a fitting tool such as a bolt or a sealing mechanism such as an O-ring 72, the outer casing 61 is liquid-tightly and airtightly attached to the second holder 22, and the first processing member 10 and second the processing member 20 are accommodated in the outer casing 61. If the fluid discharged from the processing surfaces 1 and 2 to the outside of both the processing members 10 and 20, that is, the fluid discharged from the upstream-side outflow port 4, can be received by the outer casing 61, a part of the outer circumferential surface of the second holder 22 is assembled so as to be close contact with a part of the inner circumferential surface of the thin wall part 64, whereby the outer casing 61 may be liquid-tightly and airtightly attached to the second holder 22.

Downstream-Side Processing Space

As described above, by attaching the outer casing 61 to the second holder 22, the downstream-side processing space 81 can be arranged (a) between the outer circumferential surfaces 11 and 21 of the first and second processing members 10 and 20 and an inner circumferential surface 70 of the circumferential wall 63 (thick wall part 65) in the outer casing 61 and (b) between the outer end surface 12 of the first processing member 10 and the inner surface 71 of the bottom part 62 of the outer casing 61. Here, the outer end surface 12 of the first processing member 10 is the lower surface of the first processing member 10 (in other words, the surface opposite to the first processing surface 1 in an axial direction).

In this embodiment, the first processing member 10 that rotates integrally with the rotating first processing surface 1 is the rotating member, and the outer circumferential 11 and the outer end surface 12 of the first processing member 10 constitute a part of the wall part that constitutes the downstream-side processing space 81. In other words, the first processing member 10 constitutes the column part having a columnar shape, as a whole, and the space between the outer surface thereof and the inner surface of the outer casing 61 constitutes the downstream-side processing space 81, and the downstream-side processing is performed between the outer surface and the inner surface.

The upstream-side outflow port 4 is open into the downstream-side processing space 81, and the downstream-side processing space 81 can receive and retain the fluid discharged from the processing surfaces 1 and 2 to outside of both the processing members 10 and 20. By such a configuration, the downstream-side processing part having the downstream-side processing space 81 is arranged on the downstream side of the first and second processing surfaces 1 and 2 that define the upstream-side processing part, the upstream-side processing space 4 and the downstream-side processing space 81 are connected, whereby the downstream-side processing can be continuously carried out with the upstream-side processing.

Further, by utilizing the rotation of the first processing member 10 which is the rotation member, the downstream-side processing can be performed. The downstream-side processing is the fluid processing performed in the downstream-side processing space 81, which is the reaction processing after the upstream-side processing is performed and is a process of obtaining a reaction product by advancing the reaction. Mixing by molecular dispersion is mainly completed in the upstream processing in the upstream-processing space 4, but the following processing can be performed as the downstream-side processing. Illustrative example thereof can include such as retention of fluid, stirring of fluid, mixing of fluid, heat treatment, pH adjustment, ageing. For example, in the case of an organic reaction, the reaction may be completed by retention treatment, or upon the reaction, a stirring processing may be performed additionally.

The clearance of the downstream-side processing space 81 is depended on the retention time of the fluid in the downstream-side processing space 81, but it is preferably in the range of 2 to 30% relative to the outer diameter D of the first processing member 10, and it is more preferably in the range of 3 to 20% relative to the outer diameter D of the first processing member 10. For example, when the outer diameter of the first processing member 10 is set to 100 mm, the clearance of the downstream-side processing space 81 is preferably in the range of 2 to 30 mm, more preferably in the range of 3 to 20 mm. Here, the outer diameter D of the first processing member 10 is the diameter of the first processing member 10 not including a protruding part 16 to be mentioned later.

Figure 4:
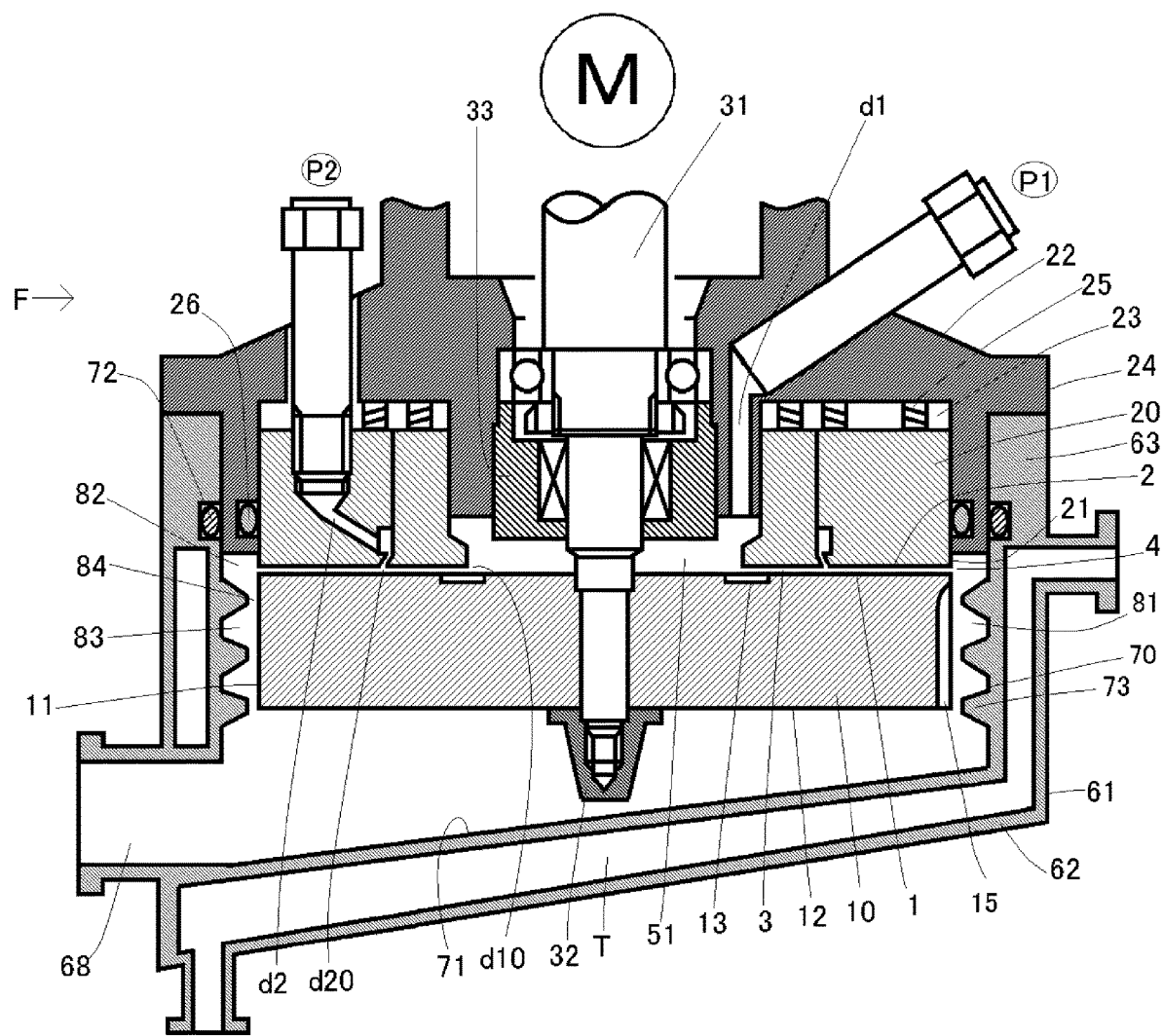
FIG. 4 This is a rough cross-section view of the fluid processing apparatus according to another embodiment of the fluid processing apparatus that is used to carry out the present invention.
Figure 10:
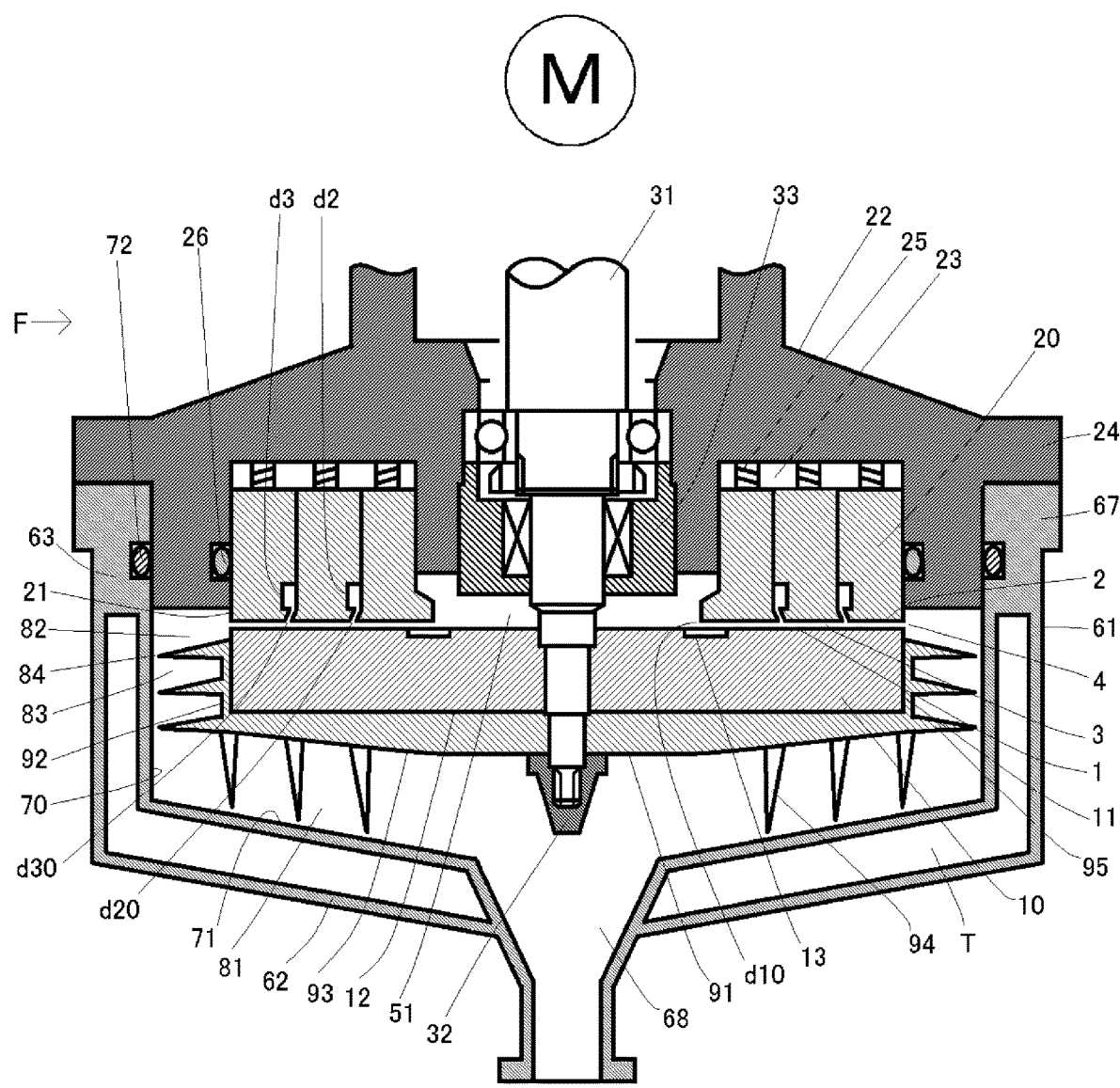
FIG. 10 This is a rough cross-section view of the fluid processing apparatus according to still another embodiment of the fluid processing apparatus that is used to carry out the present invention.

The shape of the outer casing 61 is not particularly restricted so far as the condition that includes the part being performed the downstream-side processing between the outer casing 61 and the first processing member 10, and for example, as shown in FIG. 10, the bottom part 62 may be funnel shape having the conical shape whose diameter gradually decreases, and outflow part may be provided at the lower end of this funnel shape, or as shown in FIG. 4, the bottom part 62 of the outer casing 61 may be inclined toward the outflow part 68 arranged in the circumferential wall part 63.

Outflow Part

The outflow part 68 is not limited to the one that is open to the bottom part 62, and may be, for example, one that is open to the circumferential wall part 63. Further, a plurality of the outflow parts 68 may be provided, and by providing the plurality of the outflow parts 68, it makes possible to allow the inflow and outflow of the fluid to flow in accordance with the retention time of the fluid in the downstream-side processing space 81.

Separate Introduction Part

In addition, as can be seen in the embodiment shown by FIG. 12(A), an introducing device (not shown) for supplying the fluid to the downstream-side processing space 81 may be provided, and an introduction part 69 may be arranged in the outer casing 61. As illustrative examples of the substance contained in the fluid supplied to the downstream-side processing space 81 from the introduction part 69 include a raw material itself, a polymerization initiator, a reaction terminating agent, a polymerization terminating agent, a pH adjusting agent, a catalyst, and a coating agent and the like.

Casing Movability

The outer casing 61 may be provided so as to be movable in upward and downward directions (axial direction of rotation) by means of an attachment position adjustment mechanism (not shown). By providing the outer casing 61 so as to be movable in an upward and a downward direction (axial direction of rotation), the volume of the downstream-side processing space 81 can be increased and decreased, thus the retention time of the fluid in the downstream-side processing space 81 can be controlled. The specific configuration of the attachment position adjustment mechanism is not particularly restricted, any linearly sending means such as a sending mechanism by a screw, a fluid pressure driving mechanism such as air, oil pressure, or the like may be employed by appropriately selecting them.

Concave and Convex for Stirring

The downstream-side processing space 81 may be provided with concave and convex for stirring to have a stirring function to the fluid. For example, A stirring blade may be provided on the outer circumferential surface 11 of the first processing member 10 and the outer end surface 12 of the first processing parts 10. When the outer circumferential surface 11 of the first processing member 10 and the outer end surface 12 of the first processing parts 10 are provided with the stirring blade, the fluid being subjected to the upstream-side processing can be stirred by the stirring blade by utilizing the rotation of the rotation axis 31. The stirring blade may be implemented in various shapes capable of applying a shear force to the fluid discharged from the processing surfaces 1 and 2 to the outside of both the processing members 10 and 20; and for example, the blade may be a plate-like blade, a screw-type blade, or a blade processed to concave shape. The shape of the stirring blade is optimally selected in accordance with the discharge amount (flow amount from the outflow part 68) and shear force for the processing purpose.

Figure 11:
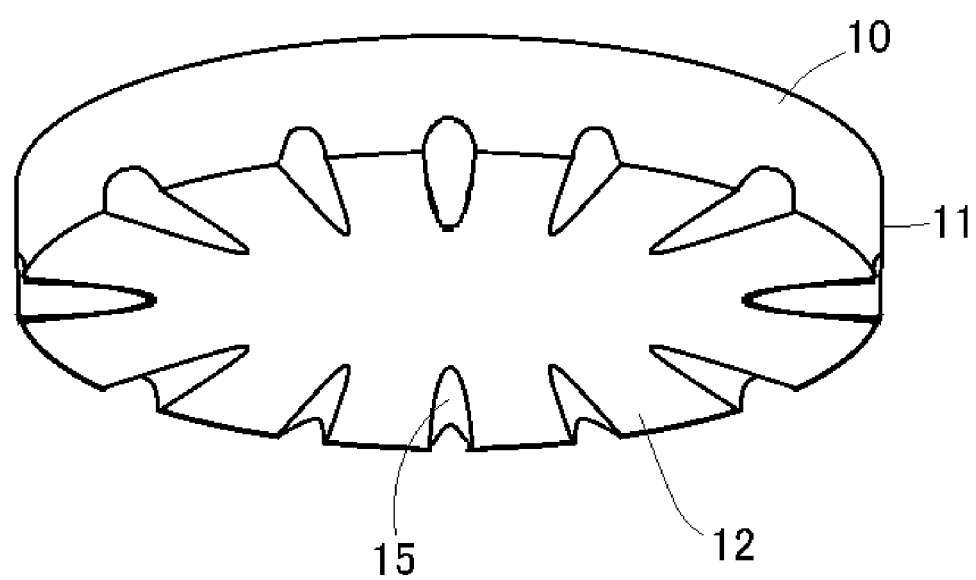
FIG. 11 This is a perspective view of the first processing part in the fluid processing apparatus illustrated in FIG. 1, which is seen from a lower side.
Figure 12:
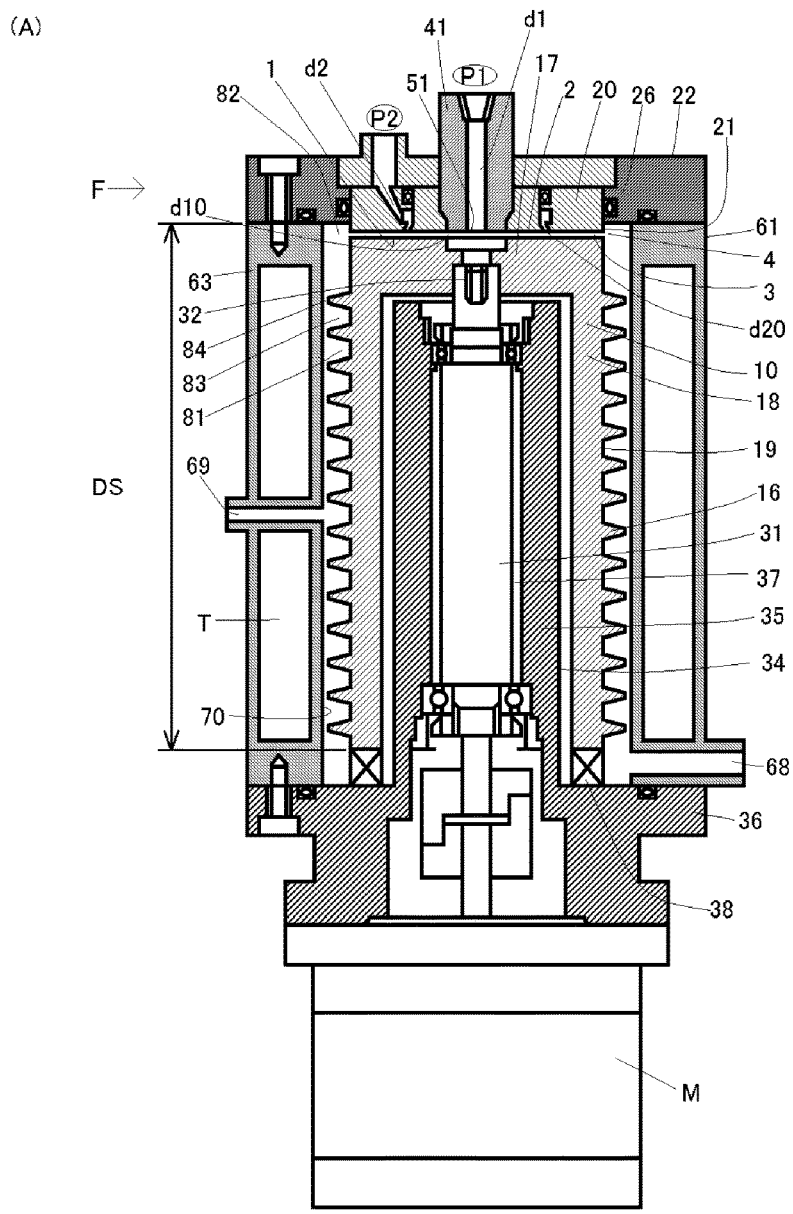
FIG. 12(A) is a rough cross-section view of the fluid processing apparatus according to still another embodiment of the fluid processing apparatus that is used to carry out the present invention.
FIG. 12(B) is an enlarged cross-section view of the essential part of FIG. 12(A)
FIG. 12(C) is an enlarged cross-section view of the essential part of the modified example of FIG. 12(A).
Figure 12:
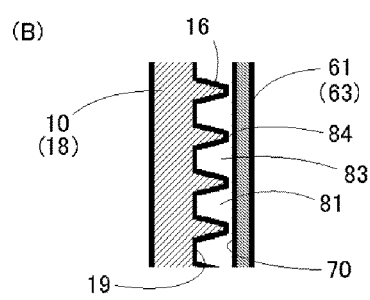
Figure 12:
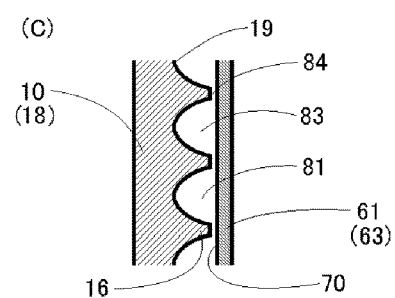

As an illustrative example thereof, as shown in the half cross-section view of FIG. 1 at right side and FIG. 11, the outer end surface 12 of the first processing member 10 is provided with a plurality of groove-like depressions 15 extending from the outer side in the radius direction to the inner side thereof. When the first processing member 10 rotates in the comparatively narrow limited space between the column part having columnar shape as a whole (specifically, the first processing member 10) and the cylindrical receiving part having cylindrical shape as a whole (specifically, the outer casing 61), the depression 15 serves as the stirring blade, and the fluid around the depression 15 is discharged to outside of the first processing member 10, so that the fluid is stirred. The fluid discharged to outside of the first processing member 10 collides with and bounces back from the inner circumferential surface 70 of the circumferential wall part 63 of the outer casing 61 and the inner surface 71 of the bottom part 62 whereby the stirring action is further facilitated. As shown in FIG. 4, the depression 15 may be provided on the outer circumferential surface 11 of the first processing member 10.

Labyrinth Seal Mechanism

In the wall parts that constitute the downstream-side processing space 81 such as the outer circumferential surface 11 and the outer end surface 12 of the first processing member 10, and the inner circumferential surface 70 of the circumferential wall part 63 and the inner surface 71 of the bottom part 62 in the outer casing 61, the labyrinth seal mechanism may be provided to extend the retention time of the fluid in the downstream-side processing space 81. The labyrinth seal is a seal that provides resistance to flow of the fluid while maintaining the clearance in the radius direction or in the axial direction and minimizes leakage, and a maze formed by the peripheral part of knife-like structure and contact points causes expansion of the fluid passing through one after another.

As one example of the protruding part to perform the labyrinth mechanism, as shown in FIG. 4, the embodiment provided with the protruding part 73 which protrudes toward the downstream-side processing space 81 from the inner circumferential surface 70 of the circumferential wall part 63 of the outer casing 61 in a radius inner side direction may be mentioned. The protruding part 73 has a circular shape in a plan view, and one or plurality of the protruding part 73 may be arranged concentrically.

In this embodiment, the protruding part 73 is tapered from the base end to the front end thereof. There is a minute clearance of about 0.01 to 1 mm between the front end of the protruding part 73 and the outer circumferential surface 11 of the first processing member 10, depending on the viscosity of the processed substance. Further, the bottom part 62 of the outer casing 61 may be inclined toward the outflow part 68 arranged in the circumferential wall part 63.

Figure 5:
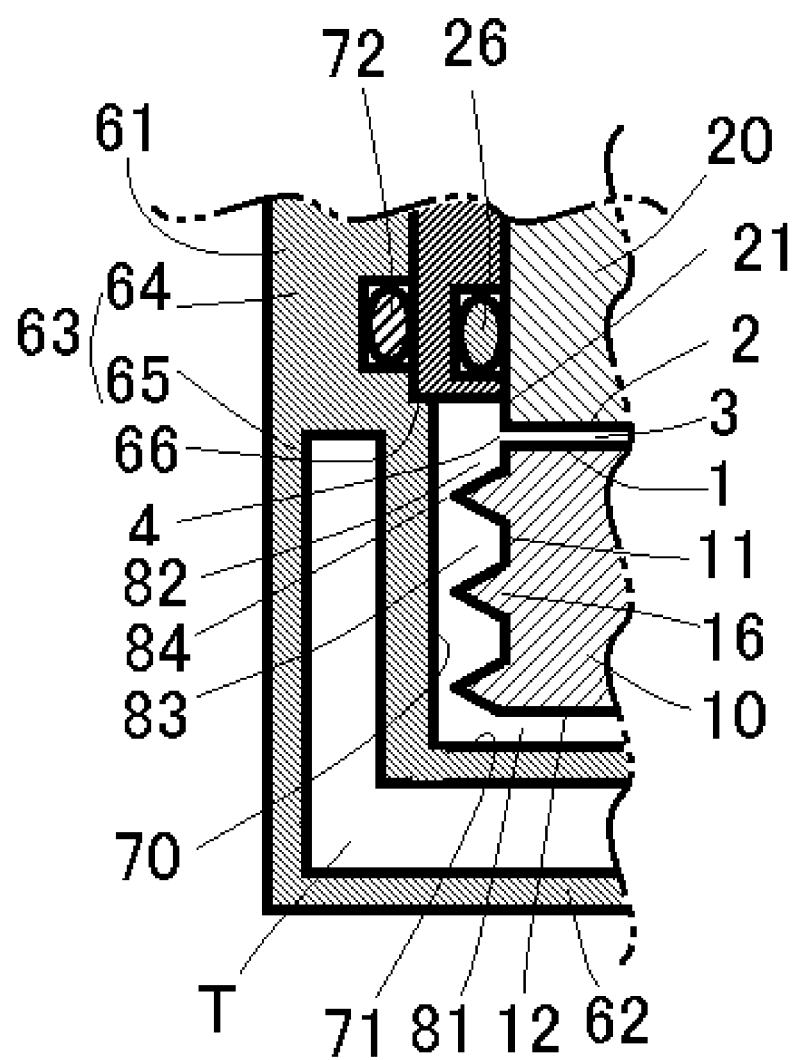
FIG. 5 This is an explanatory drawing of the essential part of the fluid processing apparatus according to still another embodiment of the fluid processing apparatus that is used to carry out the present invention.

In another embodiment, as shown in FIG. 5, the embodiment provided with a plurality of the protruding parts 16 that protrude toward the downstream-side processing space 81 from the outer circumferential surface 11 of the first processing member 10 in a radius outside direction may be mentioned. In this embodiment, the protruding part 16 is tapered from the base end to the front end thereof. A minute clearance in the range of about 0.01 to 1 mm is provided between the front end of the protruding part 16 and the inner circumferential surface 70 of the circumferential wall part 63 (the thick wall part 65) of the outer casing 61.

By setting such a minute clearance, the fluid becomes laminar flows when passing through the minute clearance and becomes difficult to pass through. As a result, it takes a time to pass through this minute clearance, and the fluid retains in a comparatively large space in the upstream side of this minute clearance.

In other words, it can be said that the labyrinth seal mechanism applied to the fluid processing apparatus F used in the embodiment of the present invention is not a seal mechanism that completely prevents the leakage but is the mechanism that gradually leaks the fluid to the downstream side while retaining the fluid in the space on the upstream-side thereof.

The first processing member 10 may not necessarily be composed of one member but may be integrally assembled a plurality of members. In this way, the concave and convex are readily processed and formed on the first processing member 10 having a columnar shape as a whole by the plurality of the members.

Figure 6:
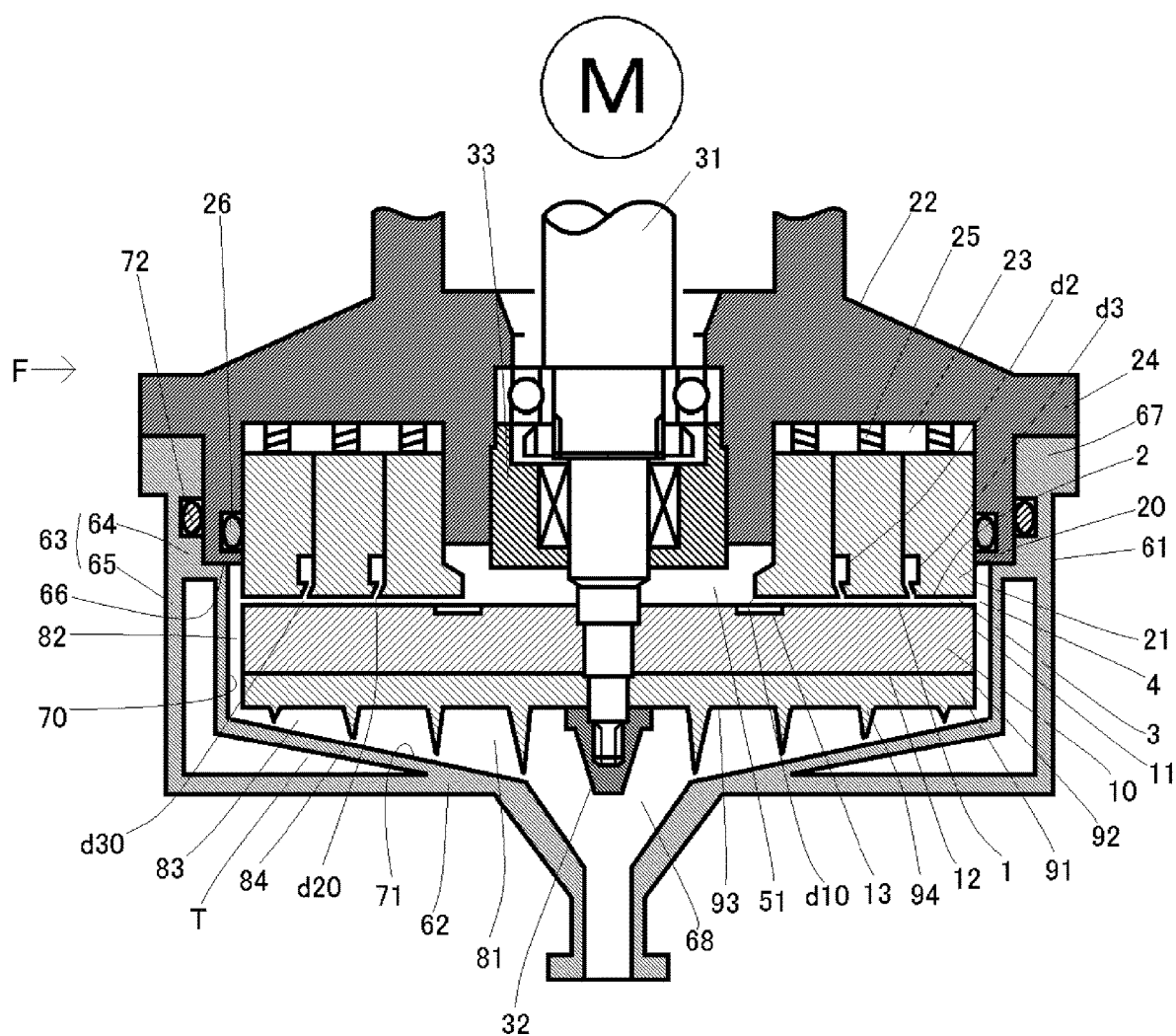
FIG. 6 This is a rough cross-section view of the fluid processing apparatus according to still another embodiment of the fluid processing apparatus that is used to carry out the present invention.

Specifically, as still another embodiment, the one shown in FIG. 6 may be mentioned. This embodiment provided that the outer end surface 12 of the first processing member 10 is provided with a bottom member 91, and a plurality of protruding parts 94 protruding downward from lower surface 93 of the bottom member 91 toward the downstream-side processing space 81 may be mentioned. The bottom member 91 is attached to the first processing member 10 so as to rotate in the same body as the first processing member 10. In this embodiment, the plurality of the protruding parts 94 are inclined from the base end to the front end thereof. A minute clearance in the range of about 0.01 to 1 mm is formed between the front end of the protruding parts 94 and the inner surface 71 of the bottom part 62 of the outer casing 61. In this embodiment, the downstream-side processing space 81 may be provided (a) between the outer circumferential surfaces 11, 21, and 92 of the first and second processing surfaces 10 and 20 and the bottom member 91 and the inner circumferential surface 70 of the circumferential wall part 63 (thick wall part 65) of the outer casing 61, and (b) between the lower surface 93 of the bottom member 91 and the inner surface 71 of the bottom part 62 of the outer casing 61. In this embodiment, the first processing member 10 and the bottom member 91 are the rotating member, and the outer circumferential surface 11 of the first processing member 10, and the outer circumferential surface 92 and the lower surface 93 of the bottom member 91 constitute a part of the wall part that constitutes the downstream-side processing space 81. In this embodiment, the bottom member 91 is prepared as a separate part from the first processing member 10, then although this is attached to the first processing member 10 so as to rotate in the same body as the first processing member 10, the bottom member 91 may be formed as a completely same body with the first processing member 10 such as by directly processing the first processing member 10 to form the bottom member 91. Further, as shown in FIG. 6, the inner surface 71 of the bottom part 62 of the outer casing 61 may be a funnel shape having the conical shape such that the depth of the downstream-side processing space 81 become deeper from the outer side in the radius direction to inner side.

Figure 7:
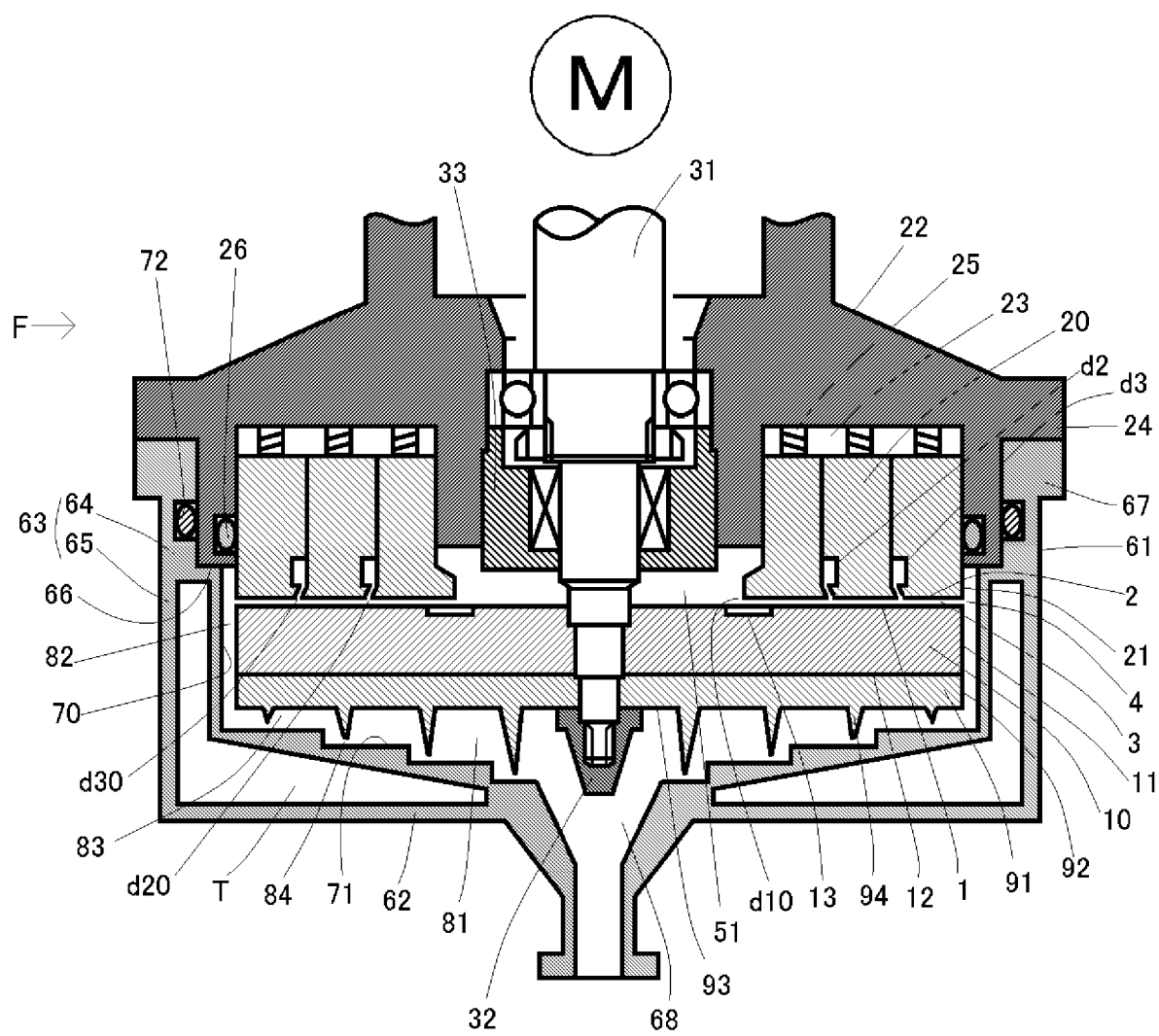
FIG. 7 This is a rough cross-section view of the fluid processing apparatus according to still another embodiment of the fluid processing apparatus that is used to carry out the present invention.

In still another embodiment, as shown in FIG. 7, in addition to the plurality of the protruding parts 94, steps may be provided on the inner surface 71 of the bottom part 62 of the outer casing 61 such that the depth of the downstream-side processing space 81 become deeper from the outside in the radius direction to inside. A minute clearance in the range of about 0.01 to 1 mm is formed between the front end of the protruding parts 94 and the inner surface 71 of the bottom part 62 of the outer casing 61.

In still another embodiment, as shown in FIG. 10, the embodiment provided that the bottom member 91 which is configured to mostly cover the outer end surface 12 of the first processing member 10 and the outer circumferential surface 11 of the first processing member 10, and a plurality of the protruding parts 94 protruding downward from the lower surface 93 of the bottom member 91 to the downstream-side processing space 81, and a plurality of protruding parts 95 protruding outward in radius direction from the outer circumferential surface 92 of the bottom member 91 to the downstream-side processing space 81 may be mentioned. The bottom member 91 is attached to the first processing member 10 so as to rotate in the same body as the first processing member 10. In this embodiment, the plurality of the protruding parts 94 and 95 are inclined from the base end to the front end thereof. A minute clearance in the range of about 0.01 to 1 mm is formed between the front end of the protruding parts 95 and the inner circumferential surface 70 of the circumferential wall part 63 of the outer casing 61, and further a minute clearance in the range of about 0.01 to 1 mm is formed between the front end of the protruding parts 94 and the inner surface 71 of the bottom part 62 of the outer casing 61. In this embodiment, the first processing member 10 and the bottom member 91 are the column part having a columnar shape as a whole, and the space with the cylindrical receiving part (outer casing 61) that receives the column part constitutes the downstream-side processing space 81.

The outer circumferential surface 11 of the first processing member 10 and the outer circumferential surface 92 and the lower surface 93 of the bottom member 91 constitute a part of the wall part that constitutes the downstream-side processing space 81.

Here, the specific configuration and function of the labyrinth seal mechanism will be described with referring to FIG. 5.

The downstream-side processing space 81 comprises seal part 84 and pool part 83. The seal part 84 is a narrow space formed between the front end of the protruding part 16 and the inner circumferential surface 70 of the circumferential wall part 63 (thick wall part 65) of the outer casing 61, the pool part 83 is a space formed between the outer circumferential surface 11 of the first processing member 10 not having the protruding part 16 and the inner circumferential surface 70 of the circumferential wall part 63 (thick wall part 65) of the outer casing 61, and the pool part 83 is arranged in the upstream side of the seal part 84 and is a wider space than the seal part 84.

The seal part 84 and the pool part 83 may be one pair, but it is preferable that a plurality of the pairs be continuously arranged from the upstream to downstream of the fluid flow.

The downstream-side processing space 81 comprises a receiving part 82 in the outer circumferential side of the upstream-side outflow port 4. The receiving part 82 is a space in the most upstream of the downstream-side processing space 81 and is a wider space than the seal part 84, this can receive the fluid discharged from the upstream-side outflow port 4 that is open into the downstream-side processing space 81 without resistance. The receiving part 82 may also serve as the pool part 83 that is arranged in the most upstream of the fluid flow.

The fluid discharged from the upstream-side outflow port 4 is firstly received by and stored in the receiving part 82. When the receiving part 82 is filled with the fluid, the fluid leaks to the seal part 84 arranged in the downstream side of the receiving part 82. When the seal part 84 is filled with the fluid, the fluid leaks to the pool part 83 arranged in the downstream side of the seal part 84. The fluid is received by and stored in the pool part 83. When the pool part 83 is filled with the fluid, the fluid leaks to the seal part 84 arranged in the downstream side of the pool part 83. In the downstream-side processing space 81, plurality of sets of the seal part 84 and the pool part 83 are continuously arranged, therefore movements of these fluids are repeated.

On the other hand, the first processing member 10 having the protruding part 16 on the outer circumferential surface 11 thereof rotates. When the spaces of the receiving part 82, the seal part 84, and the pool part 83 are filled with the fluid respectively, the centrifugal force acts due to the rotation of the first processing member 10, therefore for example, the fluid in the receiving part 82 is difficult to leak out to the seal part 84 arranged in the downstream side of the receiving part 82. Especially in the seal part 84, which is a narrow space, due to the rotation of the first processing member 10, the fluid is difficult to leak out to the pool part 83 arranged in the downstream side of the seal part 84.

Accordingly, when the first processing member 10, which is the rotation member constituting a part of the wall part of the downstream-side processing space 81, is rotated, and a plurality of sets of the receiving part 82, the seal part 82 which is a narrow seal space, and the pool part 83 which is a retention space wider than the seal part are continuously arranged in the downstream-side processing space 81, the leaking amount of the fluid discharged from the upstream-side outflow port 4 to the downstream-side processing space 81 is minimized in the seal part 84, and the fluid leaked from the seal part 84 is filled and stored in the pool part 83 arranged in the downstream side of the seal part 84; as a result of the above, the retention time of the fluid in the downstream-side processing space 81 is extended due to the labyrinth seal.

Especially, by providing a plurality of sets of the pool part 83 and the seal part 84, the retention time of the fluid in the entire apparatus is leveled. For example, considering the case where the single part 83 fills the total storing capacity of the fluid planned for the entire apparatus, even if the retention time of the fluid from the empty state of the single pool part 83 to the filled state thereof is constant, when a continuous operation is carried out after the pool part is filled, it is difficult to configure all the fluids that fill the single pool part 83 replacing with all of new fluids flowing in from the upstream, a part of the fluid flows out to the downstream before attaining the retention time, and the other part of the fluid retain in the pool part 83 indefinitely.

Accordingly, the control of the retention time is more likely to be controlled by chance, as a result, a percentage of the fluid flowing out to downstream before attaining the planned determined retention time is also controlled by chance. On the other hand, when the plurality of sets of the pool part 83 and the seal part 84 are arranged, even if the retention time in the single pool part 83 is controlled by chance, by increasing the number of the sets, the retention times of each fluid are leveled, and it is advantageous in terms of a stable control of the retention time.

The retention time of the fluid in the downstream-side processing space 81 can be adjusted by adjusting the volume of the downstream-side processing space 81, the clearance and length of the downstream-side processing space 81, the number of sets of the seal part 84 and the pool part 83, the rotation number of the rotation member such as the first processing member 10 and the bottom member 91, and the introduction amount of the fluids (the first fluid and the second fluid) introduced into the fluid processing apparatus F. When it is desired to adjust the retention time while the fluid processing apparatus F is under operation, the rotation number of the rotation member such as the first processing member 10 and the bottom member 91 and the introduction amount of the fluids (the first fluid and the second fluid) that are introduced into the fluid processing apparatus F are adjusted. By adjusting these, the desired retention time is realized depending on the product.

The specific configuration and function of the labyrinth seal mechanism have been explained with referring to FIG. 5, however, in other embodiments, too, the functions of the rotation member (the first processing member 10 and the bottom member 91), the receiving part 82, the pool part 83, and the seal part 84 are the same as those of the above embodiment, and the same effect is obtained. The shapes of the protruding parts 16, 73, 94, and 95 may be any shape that can form the seal part 84, which is a narrow space between the front end thereof and the column (the first processing member 10 and the bottom member 91) or the cylindrical receiving part (outer casing 61). The length of the protruding part and the width of the front end of the protruding part may be arbitrarily set within a range necessary for obtaining labyrinth seal property.

The fluid that fills the narrow space of the seal part 84 becomes a laminar flow, so that the seal effect thereof can be enhanced. On the other hand, the fluid stored in the receiving part 82 and the pool part 83, which are comparatively wide spaces, becomes a turbulent flow, so that the stirring action is given to the fluid during its retention.

Next, with referring to FIG. 12 to FIG. 15, modification examples of the downstream-side processing part will be described. Hereinafter, the basic structure and action of the fluid processing apparatus F are the same as above, the explanation will be mainly given to the different points, with regard to the points not explained here, the explanation given to the previous embodiments shall be applied as it is. In any modification, too, the labyrinth seal mechanism is provided, and the function is exhibited.

The downstream-side processing part is provided with a cylindrical flow path extending in the axial direction of the rotation member in at least part of the downstream-side processing space 81, which is advantageous in allowing the reaction, which is the downstream-side processing, to proceed for long time.

FIG. 12(A) shows at least the first processing member 10 is extended long in the axial direction and the cylindrical flow path between an outer circumferential surface 19 and the inner circumferential surface 70 of the circumferential wall part 63 of the casing 61 is extended longer as compared with the previous embodiment.

In this embodiment, too, the first processing member 10 constitutes the column part. As shown in FIG. 12(A), the first processing member 10 comprises an upper part 17, the upper surface of which is the first processing surface 1.

Here, an extended part 18 extending long in the axial direction (downward direction in the figure) of the first processing member 10 is arranged, and in the outer circumferential surface 19, the protruding part 16 protruding outward in the radius direction to the downstream-side processing space 81 is provided. The protruding part 16 is tapered from the base end to the front end thereof. The outer circumferential surface 19 of the extended part 18 may be flat as shown in FIG. 12(B), or may be curved as shown in FIG. 12(C). Since the outer circumferential surface 19 of the extended part 18 is curved as shown in FIG. 12(C), adhesion of the product to the outer circumferential surface 19 and protruding part 16 of the extended part 18 can be prevented.

The seal part is configured by having a minute clearance in the range of about 0.01 to 1 mm between the front end of the protruding part 16 and the inner circumferential surface 70 of the circumferential wall part 63 of the outer casing 61 described later. The comparatively large pool part 83 is formed on the upstream side of the seal part 84.

Rotation of the Processing Member

In this embodiment, the first processing member 10 attached to a rotation axis 31 rotates to the second processing member 20. Therefore, the first processing member 10 is the rotation member. The rotation axis 31 is arranged in a hollow cylinder that penetrates the first processing member 10 and is fixed to the center of the upper part 17 of the first processing member 10 by means of a fixing tool 32 such as a screw. The base end of the rotation axis 31 is connected to the driving axis of the rotation drive mechanism M, and the driving force of the rotation drive mechanism M is transmitted to the first processing member 10 to rotate the first processing member 10. In order to smoothly support this rotation, a rotation support part 34 is arranged in the outer circumference thereof, and the rotation axis 31 is rotatably supported on the front-end side and the base-end side.

Specifically, the rotation support part 34 comprises a columnar axis part 35 and a columnar base part 36 having a diameter larger than the columnar axis part 35 in the lower part of the axis part 35, and a through hole 37 in which the rotation axis 31 is mounted is provided in the center. The axis part 35 is arranged inside the extended part 18 of the first processing member 10, and the rotation axis 31 is mounted in the through hole 37 so that the rotation axis 31 is pivotally supported.

The distance between the processing surfaces 1 and 2 is preferably 1 mm or less in the case of separating superior nanoparticles for the same reasons as previously mentioned in the upstream-side processing part. However, in the case that the fluid processing such as an organic reaction is performed to not separate the nanoparticles, or in the case that the particle size is relatively large even though the fine particles are separated, the clearance may be adjusted to 5 mm or less, for example, in the range of about 1 μm to 5 mm. When the distance between the processing surfaces 1 and 2 is adjusted comparatively large, the adjustment thereof can be suitably carried out in the way other than setting of the clearance by the balance between the surface-approaching pressure and the separating force, and thus, a mechanical setting of the clearance can be carried out. Thus, it should be understood that even in all the embodiments described above, there is a case where the adjustment of the distance between the processing surfaces 1 and 2 can be carried out by the structure of the setting of the mechanical clearance.

In the setting of the mechanical clearance, the processing surfaces 1 and 2 can be implemented as having a fixed clearance, not approaching to and separating from.

Mechanical Clearance Adjustment Mechanism

As one example of the structure of the mechanical clearance setting, though not shown, the distance between the processing surfaces 1 and 2 is measured by a measurable sensor, and based on the measurement result, the second processing member 20 may be configured movable in the axial direction by means of the clearance adjustment mechanism. Specific configuration of the clearance adjustment mechanism is not particularly restricted, any linearly sending means such as a sending mechanism by a screw, a fluid pressure driving mechanism such as air, oil pressure, or the like may be employed by appropriately selecting them.

In this embodiment, the second processing member 20 is attached to the center of the circular second holder 22 by means of a seal mechanism such as the O-ring 26.

In this embodiment, the first introduction part d1 is a flow path that axially penetrates a central part 41 arranged in the center of the circular second processing member 20, and the downstream end thereof is connected to the introduction space 51. The introduction space 51 is a space defined by the lower surface of the center part 41 and the first processing surface 1.

In this embodiment, the shape of the outer casing 61 is cylindrical shape.

The outer casing 61 is attached to the second holder 22 and the rotation support part 34, and the first processing member 10 and the second processing member 20 are accommodated in the outer casing 61. First, the lower surface of the second holder 22 and the upper surface of the circumferential wall part 63 that constitutes the cylindrical shape of the outer casing 61 are fixed to each other by a fixing tool such as a bolt or a sealing mechanism such as an O-ring, by using them, the outer casing 61 is liquid-tightly and airtightly attached to the second holder 22. Next, the upper surface of the base part 36 of the rotation support part 34 and the lower surface of the outer casing 61 are fixed to each other by a fixing tool such as a bolt or a sealing mechanism such as an O-ring thereby liquid-tightly and air-tightly fixing the outer casing 61 to the rotation support part 34; and also, the lower surface of the extended part 18 of the first processing member 10 and the upper surface of the base part 36 are sealed by means of the seal member 38.

By attaching the outer casing 61 which is substantially cylindrical shape as a whole to the second holder 22 and the rotation support part 34, the downstream-side processing space 81 that is a cylindrical space can be provided (a) between the outer circumferential surface 21 of the second processing member 20 and the inner circumferential surface 70 of the circumferential wall part 63 of the outer casing 61, and (b) between the outer circumferential surface 19 of the extended part 18 of the first processing member 10 and the inner circumferential surface 70 of the circumferential wall part 63 of the outer casing 61. In this embodiment, the extended part 18 of the first processing member 10 becomes the column part, and the circumferential wall part 63 of the outer casing 61 becomes the cylindrical receiving part. The extended part 18 of the first processing member 10, which is column part, rotates to the circumferential wall part 63 of the outer casing 61; on the contrary to this, when the column part may be in the fixed state, the other cylindrical receiving part may rotate, or both may rotate, but in this case, it is required to rotate relative to each other.

The circumferential wall part 63 of the outer casing 61 is provided with the outflow part 68 and the introduction part 69. The introduction part 69 is to supply a fluid to the downstream-side processing space 81 from a flow path different from the flow path of the fluid that is supplied from the upstream-side outflow port 4 to the downstream-side processing space 81. The fluid from the introduction part 69 may be the same as or different from the fluid from the upstream-side outflow port 4 when comparing the fluid itself.

The introduction part 69 may be used as a discharge port to discharge a gas generated in the upstream-side processing and/or the downstream-side processing, or separate discharge port may be arranged. Accordingly, the fluid flowing out from the upstream-side outflow port 4 is discharged from the outflow part 68 while introducing a fluid and discharging a fluid such as a gas through the introduction part 69 as needed, whereby the downstream-side processing in the restricted downstream-side processing space 81 is completed.

Figure 13:
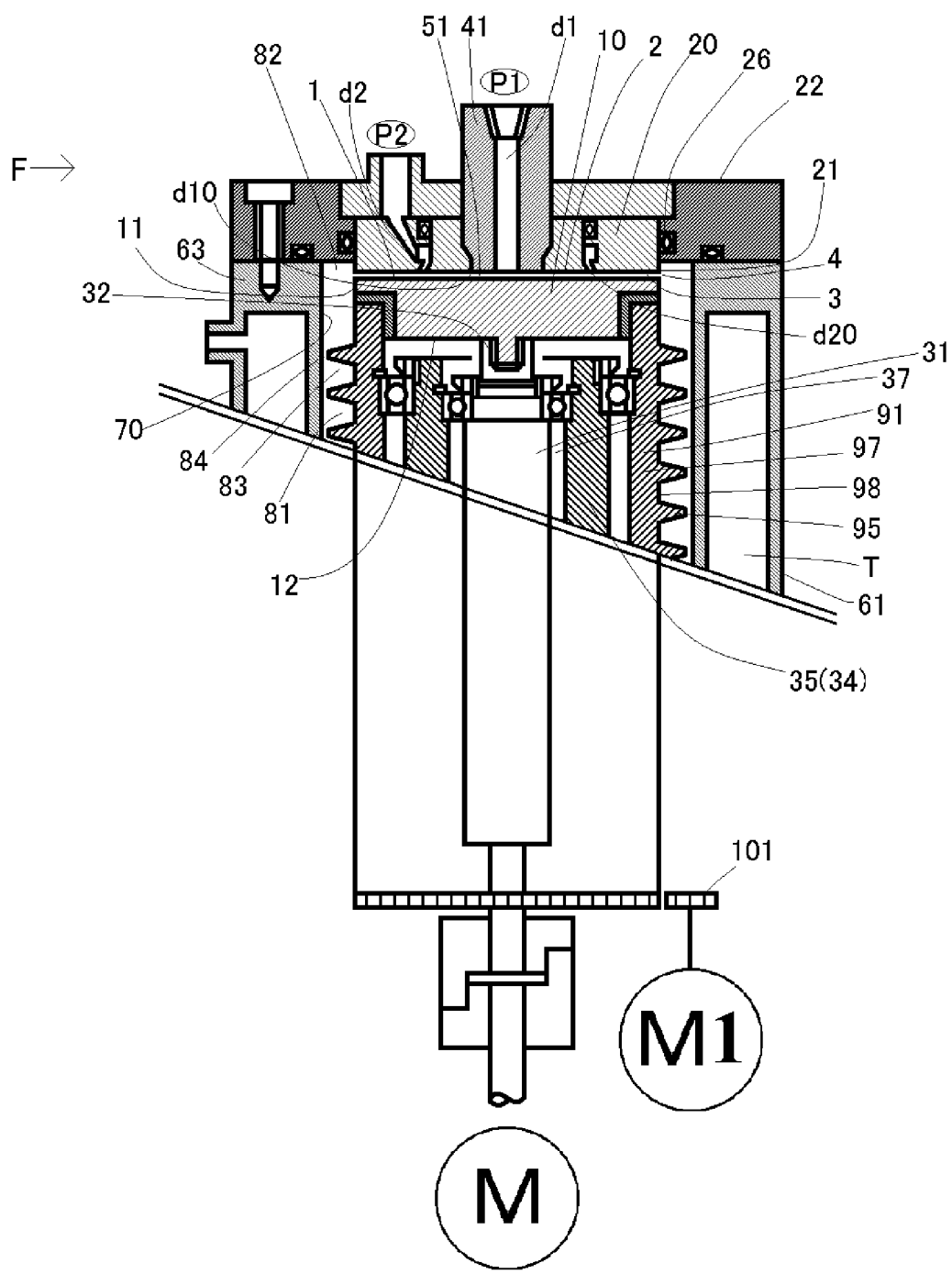
FIG. 13 This is an explanatory drawing of the essential part of the fluid processing apparatus according to still another embodiment of the fluid processing apparatus that is used to carry out the present invention.

FIG. 13 shows still another example, in which the bottom member 91 is driven independent of the first processing member 10.

In this embodiment, the first processing member 10 is a thin column, i.e., a disk body, in the upper part thereof, a brim part for receiving the bottom member 91 is provided. The upper surface of the first processing member 10 is the first processing surface 1.

In this embodiment, the bottom member 91 is a columnar shape, and the protruding part 95 that protrudes outward in the radius direction to the downstream-side processing space 81 from an outer circumferential 98 of the bottom member 91 is provided. The protruding part 95 is tapered from the base end to the front end thereof.

A minute clearance in the range of about 0.01 to 1 mm is formed between the front end of the protruding part 95 and the inner circumferential surface 70 of the circumferential wall part 63 of the outer casing 61.

The space between the lower surface of the brim part of the first processing member 10 and the upper surface of the bottom member 91 are sealed by a seal member, and the first processing member 10 and the bottom member 91 liquid-tightly and airtightly are attached.

The bottom member 91 rotates by means of the rotation drive mechanism M1 such as an electric motor, which is different from the rotation drive mechanism M that is to rotate the first processing member 10. As one example thereof, the bottom member 91 rotates by means of the rotation drive mechanism M1 via a rotation power transmitting means such as gear 101 and shifting means. With such a configuration, the first processing member 10 and the bottom member 91 rotate concentrically, but the bottom member 91 is driven independently of the first processing member 10. This configuration is advantageous when it is desired to rotate the bottom member 91 at a different rotation speed from the first processing member 10.

The rotation support part 34 mounts the rotation axis 31 in the through hole 37 to pivotally support the rotation axis 31 and supports the bottom member 91 in the outer circumferential side of the axis part 35 by using the bearing or the like.

Figure 14:
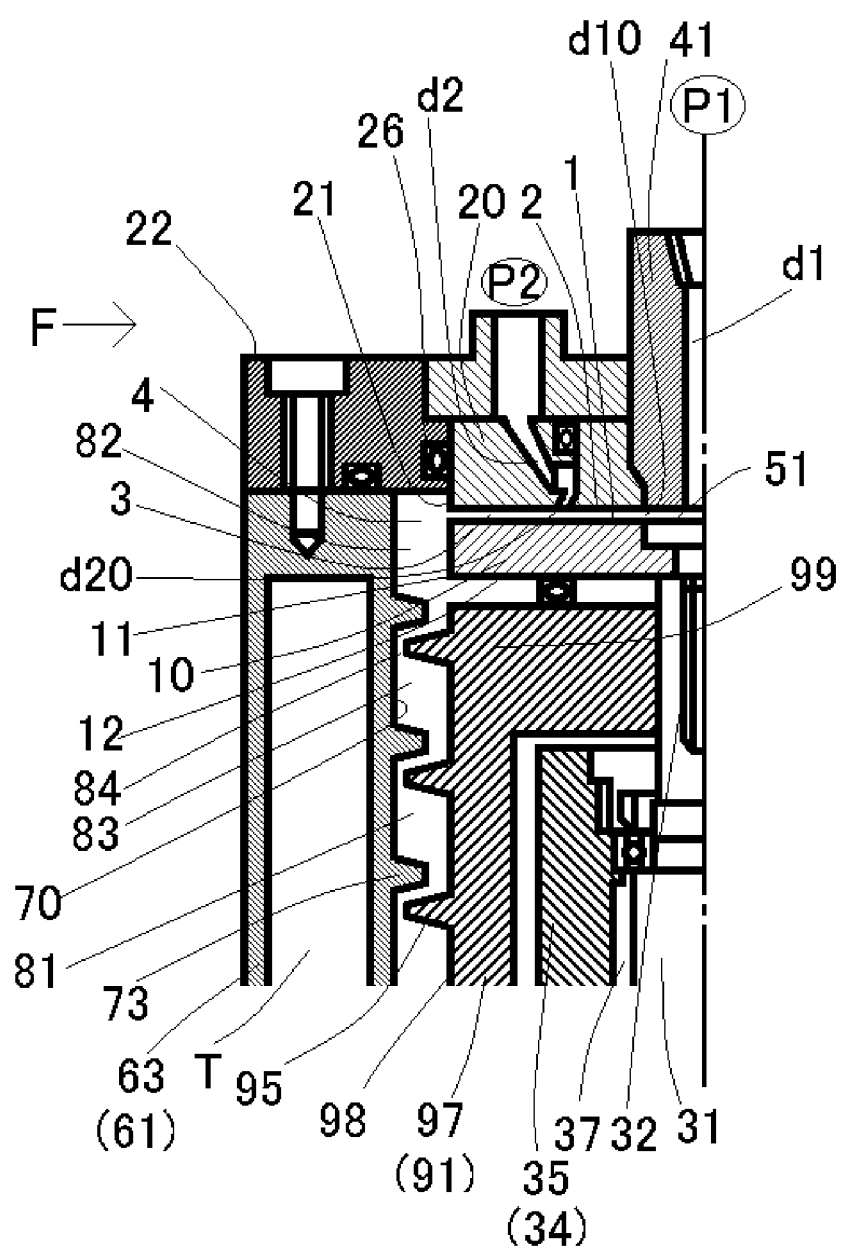
FIG. 14 This is an explanatory drawing of the essential part of the fluid processing apparatus according to still another embodiment of the fluid processing apparatus that is used to carry out the present invention.

FIG. 14 shows still another example, in which the protruding part 73 that protrudes inward in the radius direction from the inner circumferential surface 70 of the circumferential wall part 63 of the cylindrical shape of the outer casing 61 to the downstream-side processing space 81 is provided, and also the protruding part 95 that protrudes outward in the radius direction from the outer circumferential surface 98 of a circumferential wall part 97 of the bottom member 91, which is column part, to the downstream-side processing space 81. The embodiment may be shown in which the protruding part 95 is received between the protruding part 73 and the protruding part 73, and the protruding parts 73 are received between the protruding part 95 and the protruding part 95. The protruding parts 73 and 95 are inclined from the base end to the front end thereof. In this embodiment, the space between the protruding part 95 of the bottom member 91 and the inner circumferential surface 70 of the circumferential wall part 63 of the outer casing 61 may serve as the seal part 84, but in addition to this, the space between the protruding part 73 of the outer casing 61 and the outer circumferential surface 98 of the circumferential wall part 97 of the bottom member 91 may serve as the seal part 84. Here, the bottom member 91 is a cylindrical shape having an upper part 99 as the column part forming a columnar shape as a whole.

A minute clearance in the range of about 0.01 mm to 1 mm is formed between the front end of the protruding part 95 and the inner circumferential surface 70 of the circumferential wall part 63 of the outer casing 61.

Figure 15:
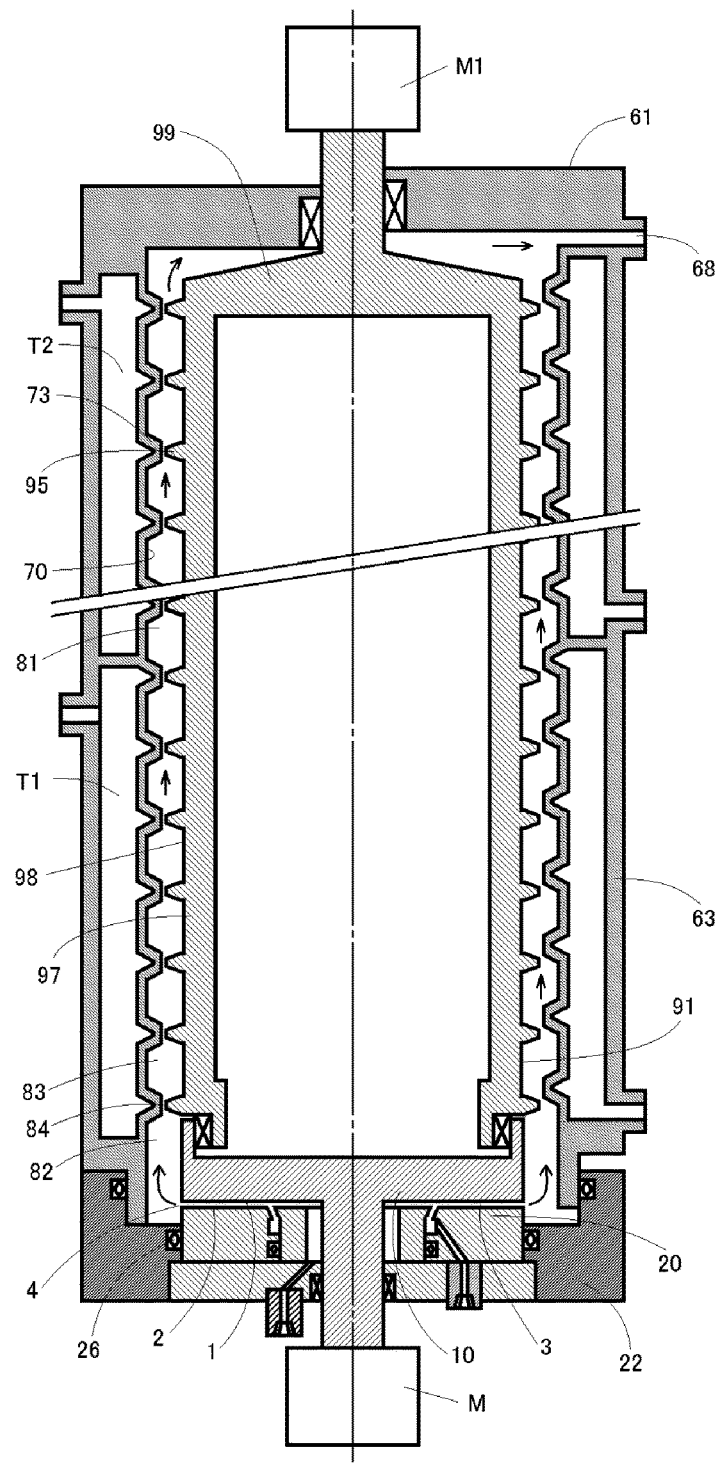
FIG. 15 This is a rough cross-section view of the fluid processing apparatus according to still another embodiment of the fluid processing apparatus that is used to carry out the present invention.
Figure 16:
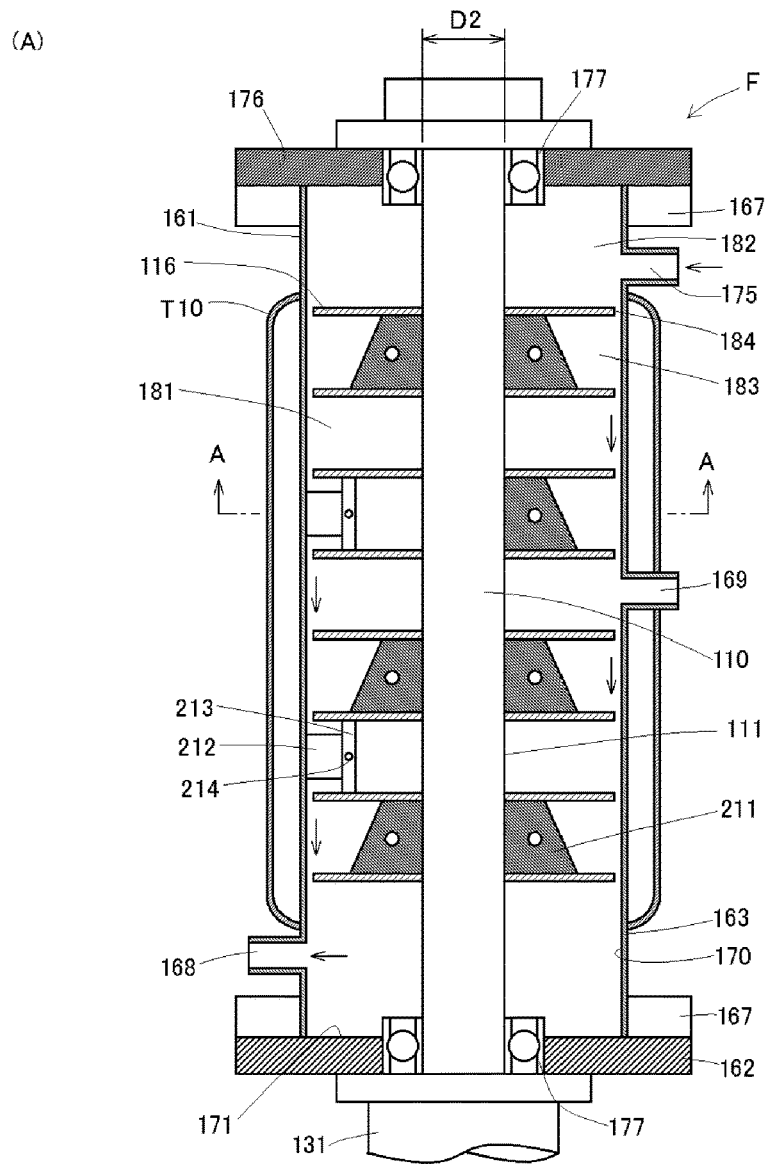
FIG. 16(A) is a rough cross-section view of the continuous stirring apparatus that is used to carry out the present invention.
FIG. 16(B) is an explanatory drawing of the essential part of this apparatus.
Figure 16:
Figure 16:
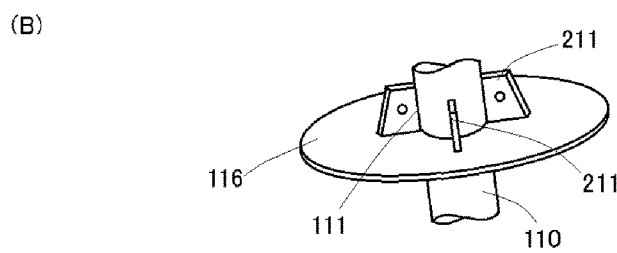
Figure 17:
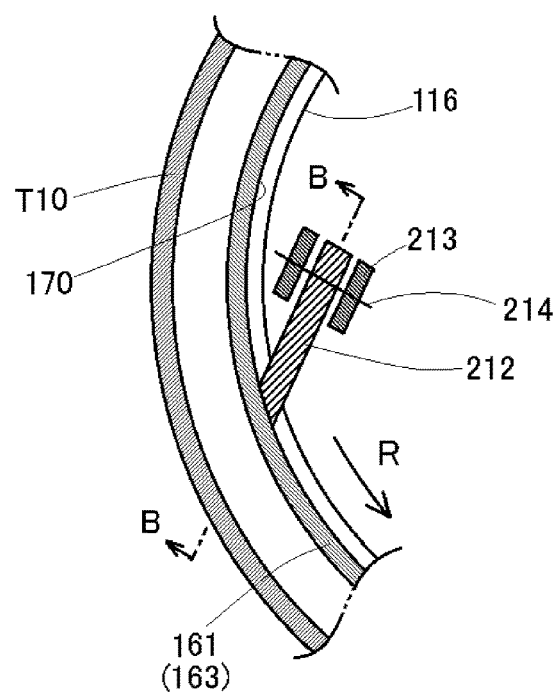
FIG. 17(A) is a cross-section view of the essential part along the A-A line in FIG. 16(A)
FIG. 17(B) is a cross-section view of the essential part along the B-B line in FIG. 17(A).
Figure 17:
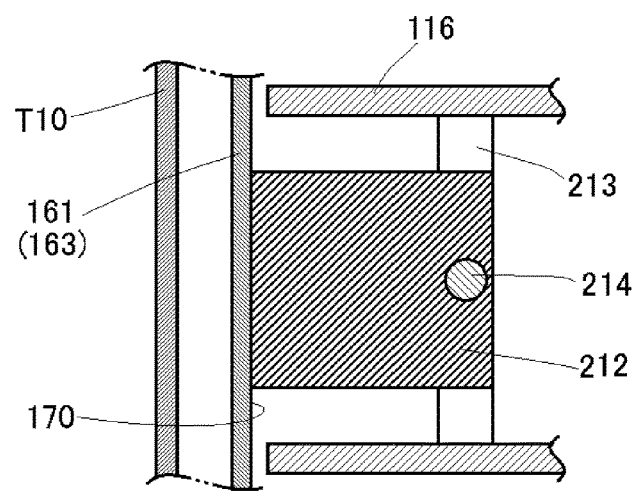

FIG. 15 shows still another example. In this example, the lower side of FIG. 15 is the upstream side, the upper side of FIG. 15 is the downstream side, and the second processing member 20 is arranged in the lower side of the first processing member 10 and includes the downstream-side processing part in the upper side of the first and second processing surfaces 1 and 2 that define the upstream-side processing part. For example, when an emulsion polymerization reaction or a suspension polymerization reaction is conducted, the upstream-side processing part is in a suitable emulsion state or suspension state, and it is suitable for the case of discharging a gas generated during reaction to the outside of the system when performing polymerization reaction in the downstream-side processing part. Note that the fluid processing apparatus F according to the present invention can be installed regardless of the up, down, right, and left; this may be installed horizontally as well.

In this example, the protruding part 73 of the outer casing 61 and the protruding part 95 of the bottom member 91 are arranged in the position opposite to each other, the bottom member 91 and the first processing member 10 are driven independently, and the outer casing 61 is provided so as to be movable in upward and downward directions (axial direction of the rotation).

More specifically, the outer casing 61 is a cylindrical shape having an upper part and is provided with a plurality of the protruding parts 73 that protrude inward in the radius direction from the inner circumferential surface 70 of the circumferential wall part 63 to the downstream-side processing space 81, and the protruding part 73 has a circular shape in its plan view. The bottom member 91 is a cylindrical shape having the upper part 99 as column part having a columnar shape as a whole and is provided with a plurality of the protruding parts 95 that protrude to outward in the radius direction from the outer circumferential surface 98 of the circumferential wall part 97 to the downstream-side processing space 81, and the protruding part 95 has a circular shape in its plan view. The protruding part 73 of the outer casing 61 and the protruding part 95 of the bottom member 91 are arranged in the position opposite to each other. Here, the fact that the protruding part 73 and the protruding part 95 are arranged in the position opposite to each other means that the protruding part 73 and the protruding part 95 are arranged close to each other or overlapped each other in the radius direction.

In this embodiment, the outer casing 61 is provided so as to be movable in upward and downward directions by means of an attachment position adjustment mechanism (not shown). By providing the outer casing 61 so as to be movable in upward and downward directions, the size of the seal part 84 can be adjusted. It is advantageous since a comparatively large size of the seal part 84 can be provided by adjusting the size of the seal part 84 when a gas generated during the reaction is desired to be removed or when a highly viscous substance to be processed is processed. In FIG. 15, a state in which the outer casing 61 is lowered is illustrated on the left side of the center line, and the state in which the outer casing 61 is raised is illustrated on the right side of the center line. The specific configuration of the attachment position adjusting mechanism is not particularly restricted, any linearly sending means such as a sending mechanism by a screw, a fluid pressure driving mechanism such as air, oil pressure, or the like may be employed by appropriately selecting them.

In this embodiment, the temperature adjusting mechanism T is installed in the outer casing 61, the temperature thereof is adjusted by heating or cooling, so that the temperature of the fluid flowing in the downstream-side processing space 81 is adjusted. As the temperature adjusting mechanism T, the outer casing 61 is provided with a temperature adjusting jacket for flowing various heat media including iced water and steam. One temperature adjusting jacket may be installed in the outer casing 61, or as shown in FIG. 15, a plurality of the temperature adjusting jackets (in FIG. 15, two jackets of T1 and T2) may be installed in the outer casing 61. Further, when a plurality of the temperature adjusting jackets are used, these jackets may be adjusted to the same temperature or may be adjusted to different temperatures. By adjusting a plurality of the temperature adjusting jackets to different temperatures, the temperature of the fluid flowing through the downstream-side processing space 81 can be adjusted according to the progress of the downstream-side processing. In place of the temperature adjusting jacket, a cooling element and a heat-generating element may be attached to at least any one of the members.

In the Case of Applying Shear Force to Fluid

Figure 8:
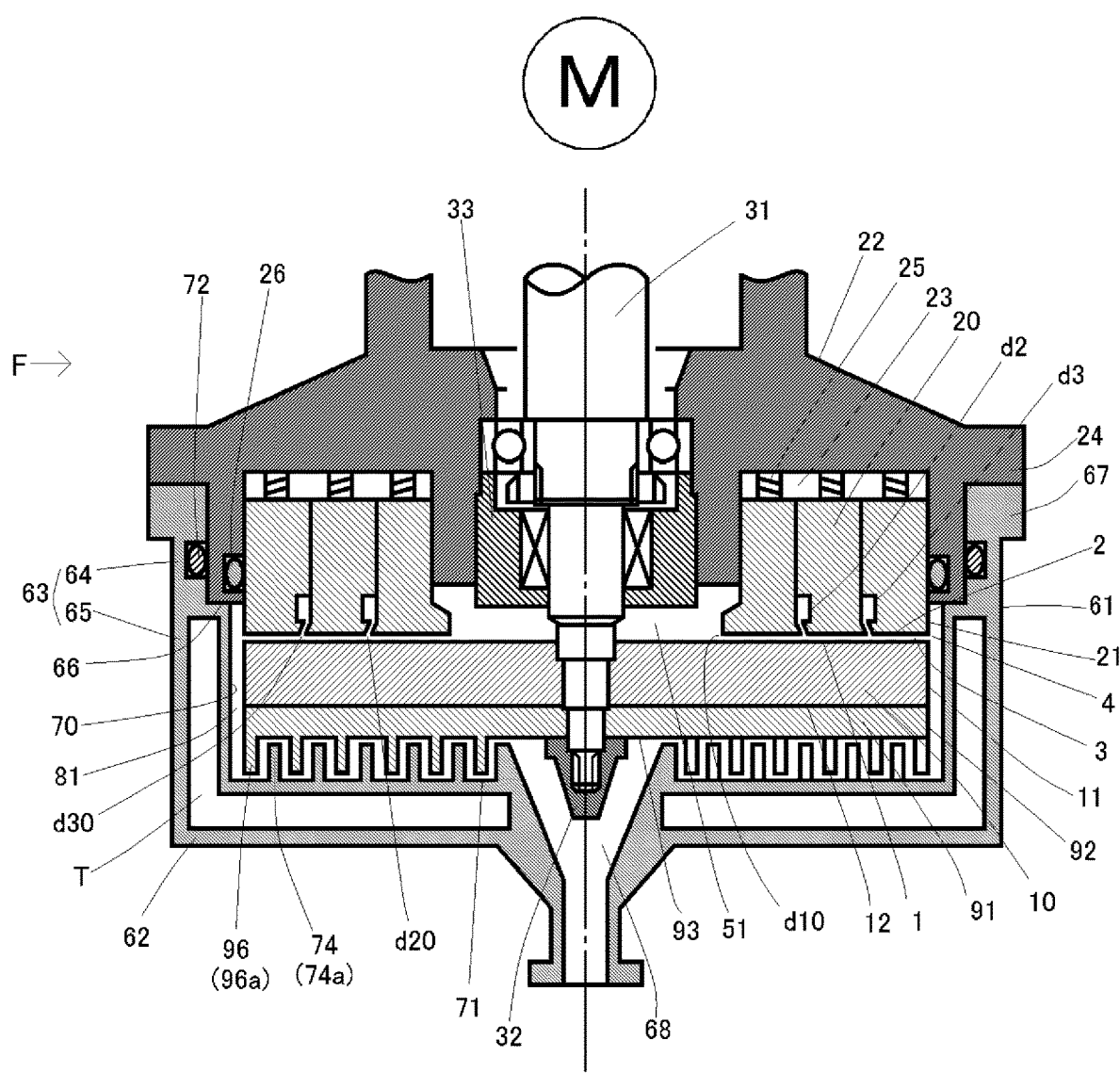
FIG. 8 This is a rough cross-section view of the fluid processing apparatus according to still another embodiment of the fluid processing apparatus that is used to carry out the present invention.
Figure 9:
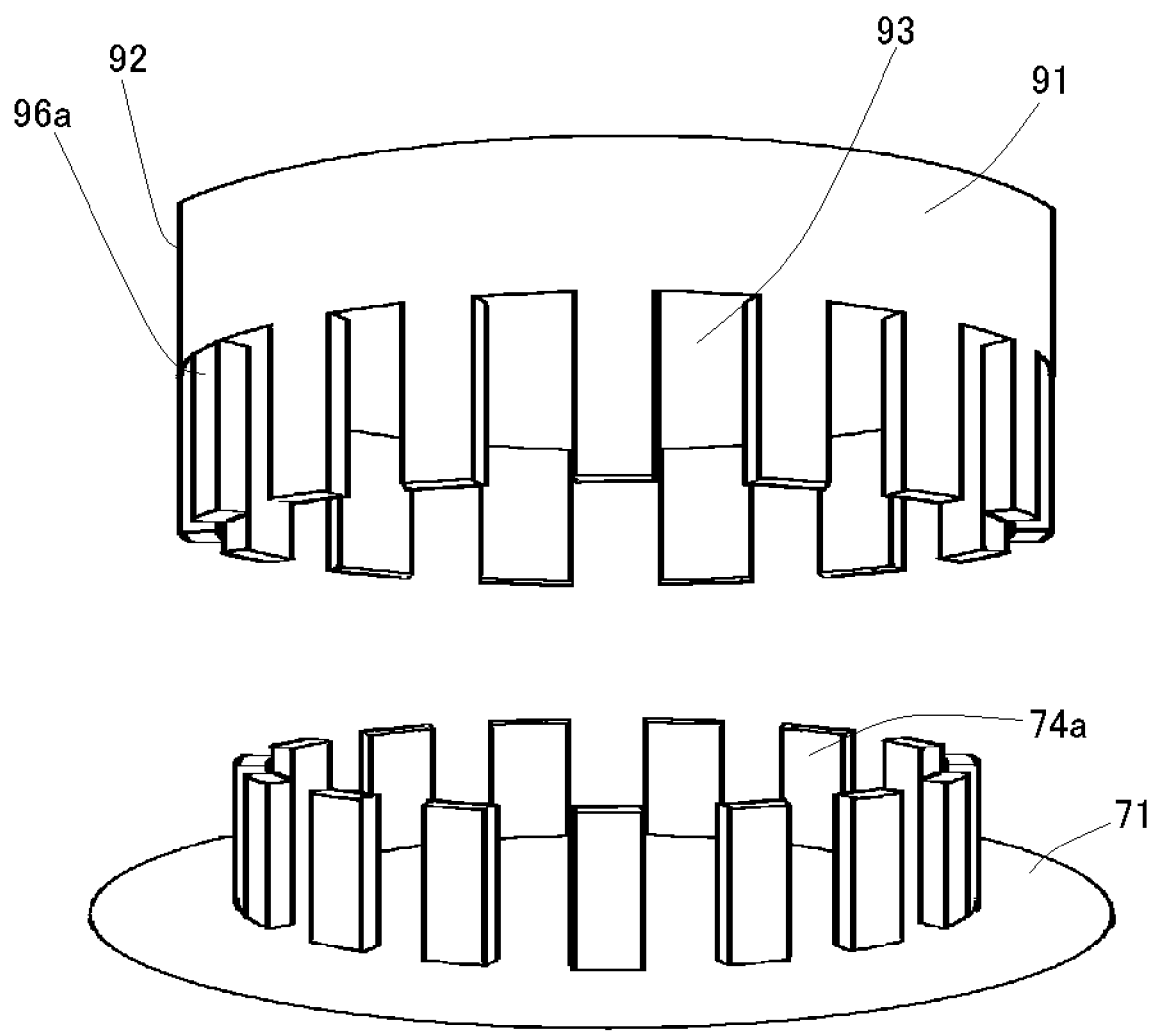
FIG. 9 This is an explanatory drawing of the protruding parts of the bottom member and the protruding parts of the outer casing of the fluid processing apparatus illustrated in FIG. 8, the protruding parts of the bottom member are drawn as a perspective view seen from a lower side and the protruding parts of the outer casing are drawn as a perspective view seen from an upper side.

Still another embodiment is shown in FIG. 8, though this is not the example of the labyrinth seal mechanism, the embodiment provided that the bottom member 91 is arranged in the outer end surface 12 of the first processing member 10, a comb-like protruding parts 96 that protrude downward to the downstream-side processing space 81 from the lower surface 93 of the bottom member 91 and a comb-like protruding parts 74 that protrude upward to the downstream-side processing space 81 from the inner surface 71 of the bottom part 62 of the outer casing 61, the protruding part 74 is received between the protruding part 96 and the protruding part 96, and the protruding part 96 is received between the protruding part 74 and the protruding part 74 may be described. The bottom member 91 is attached to the first processing member 10 so as to rotate in the same body as the first processing member 10. With such arrangement, a shear force can be applied to the fluid passing between the protruding part 96 and the protruding part 74. More specifically, due to the rotation of the bottom member 91 in the same body as the first processing member 10, the comb-like protruding part 96 arranged in the bottom member 91 rotates, when passing the rotating comb-like protruding parts 96 through between the comb-like protruding part 74 and protruding part 74, a shear force can be applied to the fluid to be processed in a minute clearance between the protruding part 96 and the protruding part 74. In order to efficiently apply the shear force to the fluid passing through between the protruding part 96 and the protruding part 74, the clearance between the protruding part 96 and the protruding part 74 is preferably in the range of about 0.1 to 1 mm. Also, A minute clearance in the range of about 0.5 mm to 2 mm is formed between the front end of the comb-like protruding part 96 and the inner surface 71 of the bottom part 62 of the outer casing 61, and a minute clearance in the range of about 0.5 mm to 2 mm is formed between the front end of the comb-like protruding part 74 and the lower surface 93 of the bottom member 91. In FIG. 8, Regarding the comb-like protruding parts 96 and 74, FIG. 8 shows that on the left side of the center line, the comb-like protruding parts 96 and 74 are overlapped each other, on the right side of the center line, they are not overlapped each other. FIG. 9 shows the explanatory view of a set of the comb-like protruding 96a and the comb-like protruding part 74a arranged in the outermost side in the radius direction. For ease of understanding, only the inner surface 71 of the bottom part 62 and the comb-like protruding part 74a in the outer casing 61 are illustrated.

Movement of Fluid to be Processed

The fluid being subjected to the upstream-side processing is discharged from the downstream end of the upstream-side processing space 3. The fluid discharged from the downstream end of the upstream-side processing space 3 is received in the outer casing 61, and while flowing through the downstream-side processing space 81, the reaction is performed as the downstream-side processing to obtain a reaction product, and then, the fluid is discharged from the outflow part 68 to outside of the system (outside of the apparatus).

Centrifugal Force

Since the first processing member 10 and the bottom member 91, which are the rotation member, rotate, a centrifugal force acts outward in the radius direction when the fluid flowing through the downstream-side processing space 81 fills the downstream-side processing space 81. By the action of this centrifugal force, the retention time of the fluid in the downstream-side processing space 81 is controlled.

Specifically, for example, by adjusting the rotation number of the first processing member 10 and the bottom member 91, the centrifugal force acting on the fluid flowing through the downstream-side processing space 81 is adjusted to control the retention time of the fluid in the downstream-side processing space 81. In order to control this retention time, the circumferential velocity in the outer circumference of the first processing member 10 is appropriate in the range of 0.5 to 35 m/sec. The protruding part 16 is not included in the outer circumference of the first processing member 10. The rotation number of the rotation member may be set by both the upstream-side processing and the downstream-side processing. For example, under the laminar flow condition in the upstream-side processing space 3, the rotation number of the first processing member 10 in the downstream-side processing may be set from the range of the rotation number of the first processing member suitable for the upstream-side processing.

When focusing on the adjustment of the retention time, by arranging the labyrinth seal mechanism in the downstream-processing part, or by increasing the volume of the downstream-side processing space 81, or by slowing the discharge speed at which the fluid being subjected to the downstream-side processing is discharged from the outflow part 68 to the outside of the system, the retention time of the fluid in the downstream-side processing space 81 can be extended. The retention time of the fluid in the downstream-side processing space 81 is preferably in the range of about 5 to 60 minutes, more preferably in the range of about 10 to 30 minutes, but when the fluid processing is a polymerization reaction or the like, the retention may be required for several hours in some cases. When the introduction amounts of the raw material, namely, the introduction velocity of the first fluid and the second fluids into the upstream-side processing space 3 (introduction amount per unit time) is adjusted, the relative rotation number of the first and second processing members are kept constant, the retention time can be adjusted even when the parts are not replaced.

Material

The outer casing 61 may be configured as a single member or of a combination of plurality of members; the material thereof is not only metal, but also ceramics such as silicon carbide (SiC), sintered metal, abrasion-resistant steel, sapphire, and other metal subjected to hardening treatment, and rigid material subjected to lining, coating, or plating and the like, the materials equivalent to those first and second processing members 10 and 20 can be adopted. In the bottom member 91, materials that can be readily processed such as metals like stainless steel and titanium, and resins like polytetrafluoroethylene (PTFE) and polyether ether ketone (PEEK) may be selected and used.

Temperature Adjusting Mechanism

At least any one of the first processing member 10, the bottom member 91, and the outer casing 61 may be equipped with the temperature adjusting mechanism T, the temperature of these members may be adjusted by cooling or heating. By so doing, the temperature of the fluid flowing thorough the downstream-side processing space 81 can be adjusted. In the embodiments shown in FIG. 1, FIG. 4 to FIG. 8, FIG. 10, and FIG. 12 to FIG. 15, as the temperature adjusting mechanism T, the temperature adjusting jackets through which various heat media including iced water and steam flow are provided on the outer casing 61. In place of the heat media, a cooling element and a heat-generating element may be attached to at least any one of the members.

Microwave

At least any one of the first processing member 10, the bottom member 91, and the outer casing 61 may be equipped with a microwave-generating device such as a magnetron for irradiating the microwave as a microwave irradiation mechanism, so that the fluid flowing through the downstream-side processing space 81 may be heated, and a chemical reaction thereof may be facilitated.

Pressure Adjusting Mechanism

The first processing member 10, the bottom member 91, and the outer casing 61 may be equipped with a pressure adjusting mechanism for adjusting the pressure of the fluid flowing through the downstream-side processing space 81. For example, various pumps can be used as the pressure adjusting mechanism. Negative pressure may be applied to the downstream-side processing space 81. Specifically, the downstream-side processing space 81 may be pressurized by a nitrogen gas, or a vacuum degree in the downstream-side processing space 81 may be controlled by a vacuum pump.

Control of Processing Characteristics

By performing the upstream-side processing and the downstream-side processing using the fluid processing apparatus of the present invention, reaction conditions such as temperature condition, pressure condition, stirring condition, and reaction time in the reaction field can be adjusted, thus, for example, the processing characteristics such as the reaction rate of the raw material, selectivity, and yield of the product can be controlled. Here, the reaction rate of the raw material is a ratio of the raw material consumed by the reaction to the supplied raw material, the selectivity is a ratio of the raw material consumed by the reaction consumed to produce an intended product, and the yield of the product is the multiplied value of the reaction rate by the selectivity.

Under Laminar Flow Condition and Non-Laminar Flow Condition

In the present invention, it is preferable that the upstream-side processing in the upstream-side processing space 3 be performed under a laminar flow condition and the downstream-side processing in the downstream-side processing space 81 be performed under a non-laminar flow condition. It is preferable that the second fluid be merged with the first fluid which become the thin film fluid in the upstream-side processing space 3 under the laminar flow condition and the fluids to be processed be uniformly mixed by the molecular dispersion under the laminar flow condition. The fluid discharged from the downstream end of the upstream-side processing space 3 is released from the forcing applied by the processing surfaces 1 and 2, and then, the fluid is discharged to the wider downstream-side processing space 81. On the other hand, A turbulent state is created by applying shear force to the fluid discharged from the downstream end of the upstream-side processing space 3 to the downstream-side processing space 81 or by increasing the representative length L described in the above-described formula (2), in this state, a product may be obtained by increasing the frequency of contact and collision among the molecules in the fluid. For example, when it is desired to disperse organic pigment particles after preparing the organic pigment particles by an organic reaction in the upstream-side processing space 3, the stirring under the turbulent flow condition is useful. In addition, under the turbulent flow condition, the enhancement of the heat exchange efficiency can be expected between heat medium flowing through the temperature adjusting mechanism T and the fluid flowing through the downstream-side processing space 81.

By performing the upstream-side processing under the laminar flow condition using the fluid processing apparatus F, the reactants contained in the fluids to be processed can be instantly mixed in the molecular level by the molecular dispersion in the upstream-side processing part. Then, by performing the downstream-side processing subsequent to the upstream-side processing with the fluid processing apparatus F, the fluid to be processed having been subjected to the upstream-side processing under the laminar flow condition can keep the fluid to be processed for a long time while keeping the reaction condition required for the reaction such as the temperature condition, pressure condition, and stirring condition in the reaction field in the downstream-side processing part. Accordingly, the fluid processing apparatus F is an apparatus suitable for carrying out the organic reactions such as addition reaction, polymerization reaction, condensation reaction, and solvolysis, which are difficult to complete the reaction in a short time.

By increasing the rotation number of the first processing member 10 to increase the Reynolds number, a shear force may be applied to the fluid to be processed flowing through the upstream-side processing space. For example, when an emulsion polymerization is carried out by using the fluid processing apparatus F, the emulsification process is performed in the upstream-side processing part and the polymerization process is performed in the downstream-side processing part, in this case, the emulsification can be performed efficiently by applying a shear force to the fluids to be processed being not compatible with each other that are flowing through the upstream-side processing space.

Continuous Stirring Apparatus F

The continuous stirring apparatus F suitable for carrying out the method of producing an organic compound according to the present invention will be explained by referring with FIG. 16 to FIG. 20. In these embodiments, the upstream-side processing part of the continuous stirring apparatus F is removed, so that the downstream-side processing is performed only in the downstream-side processing part. The downstream-side processing is the processing of an organic reaction.

In FIG. 16(A) and FIG. 20(A), the upside and downside of the figure correspond to the upside and downside of the apparatus, however, in the present invention, up and down, front and back and right and left shown therein indicate merely a relative positional relationship and does not indicate an absolute position. In FIG. 17(A), reference character R indicates a rotational direction.

The continuous stirring apparatus F comprises the processing part having an outer wall 161 and an inner wall 110 which is arranged inside the outer wall 161. The outer wall 161 and the inner wall 110 are concentric, and the processing part comprises a processing space 181 that is formed between the outer wall 161 and the inner wall 110. At least any one of the outer wall 161 and the inner wall 110 rotates relative to the other.

Outer Wall

As shown in FIG. 16(A), the outer wall 161 may be implemented as having a cylindrical shape as a whole and having a bottom part and a ceiling part as required. In this embodiment, the outer wall 161 serve as a cylindrical wall 163, and in both ends thereof, flange 167 that protrudes from the cylindrical wall 163 to outside thereof in the radius direction are formed. Both ends of the cylindrical wall 163 are closed by fixing a ceiling part 176 or a bottom part 162, which are separate members from the outer wall 161, and the flanges 167 and 167.

Inner Wall

As shown in FIG. 16(A), an inner wall 110 has a columnar shape as a whole. In this embodiment, the inner wall 110 is columnar shape and comprises a plurality of protruding parts 116 that protrudes from the outer circumferential surface 111 to outside thereof in the radius direction. The protruding part 116 has a circular shape in a plan view and are provided at a predetermined intervals in the axial direction. FIG. 16(B) shows an explanatory view of the essential part of the continuous stirring apparatus F, and this shows a perspective view showing the arrangement of the inner wall 110, the protruding part 116, and a stirring blade 211 described later, which illustrates the state having no other protruding part 116 on the above this protruding part. As shown in FIG. 16(B), the protruding part 116 has a disk-like shape having the same thickness as a whole. The protruding part 116 may have a thickness that changes in the radius direction.

In place of the protruding part 116 or together with the protruding part 116, the protruding part that protrudes from an inner circumferential 170 of the cylindrical wall 163 of the outer wall 161 in the radius inside direction may be arranged, or the protruding part that protrudes from an inner surface 171 of the bottom part 162 and the inner surface of the ceiling part 176 toward the processing space 181 may be arranged as well.

The outer wall 161 has a cylindrical shape as a whole, and the inner wall 110 has a columnar shape as a whole. The outer wall 161 is a hollow cylinder because the inner surface of the outer wall 161 that constitutes the processing space 181 is important to conduct the fluid processing, and the inner wall 110 may be solid or hollow because the outer surface of the inner wall 110 that constitutes the processing space 181 is important to conduct the fluid processing. It should be understood that the shape of the inner wall 110 include a circular cross-sectional shape, an angular cross-sectional shape, and a modified cross-sectional shape regardless of expressions of the circular or columnar shapes. Similarly, it can be also understood that the shape of the outer wall 161 include a circular cross-sectional shape, an angular cross-sectional shape, and a modified cross-sectional shape regardless of expressions of the circular or columnar shapes. However, since the minute clearance between the protruding part 116 and the outer wall 161 is important to carry out the present invention, when the outer wall 161 does not have a circular cross-sectional shape, upon carrying out this embodiment, a care should be paid to the point that the clearance with the protruding part 116 changes with rotation.

Processing Space

The inner wall 110 is arranged inside the outer wall 161, and the outer wall 161 and the inner wall 110 are arranged concentrically. The processing space 181 is formed between the outer wall 161 and the inner wall 110. In this embodiment, the processing space 181 is arranged between the outer circumferential surface 111 of the inner wall 110 and the inner circumferential surface 170 of the inner cylindrical wall 163 of the outer wall 161. The substance to be processed is processed in the processing space 181. The substance to be processed is a fluid for which a fluid is planned to be processed in the processing space 181; hereinafter, the substance to be processed is also described as the fluid. In the present invention, the substance to be processed contains at least one kind of organic compound. When the processing space 181 can be arranged between the outer wall 161 and the inner wall 110, the outer wall 161 and the inner wall 110 may not be arranged concentrically.

The clearance of the processing space 181, that is, in this embodiment, the clearance between the outer circumferential surface 111 of the inner wall 110 and the inner circumferential surface 170 of the cylindrical wall 163 of the outer wall 161 is preferably in the range of 5 to 200% relative to the outer diameter $D2$ of the inner wall 110, more preferably in the range of 10 to 150% relative to the outer diameter $D2$ of the inner wall 110, though these values may change depending on the retention time of the substance to be processed in the processing space 181. For example, when the outer diameter $D2$ of the inner wall 110 is set to 100 mm, the clearance of the processing space 181 is preferably in the range of 5 to 200 mm, more preferably in the range of 10 to 150 mm. Here, the outer diameter $D2$ of the inner wall 110 is the diameter of the inner wall 110 not including the protruding part 116.

At least any one of the outer wall 161 and the inner wall 110 rotates relative to the other. In this embodiment, the driving axis of the rotation drive mechanism M such as an electric motor is connected to a rotation axis 131, the rotation axis 131 rotatably supports the inner wall 110 via bearings 177 and 177 provided on the bottom part 162 and the ceiling part 176, thereby rotating the inner wall 110 relative to the outer wall 161. The outer wall 161 may be rotated relative to the inner wall 110, or both may be rotated, but it is necessary to rotate both relative to each other.

Supplying Part and Outflow Part

The outer wall 161 is provided with a supplying part 175 and an outflow part 168. The supplying part 175 is a supplying port to supply the substance to be processed, which is planned to be processed in the processing space 181, from outside of the system (outside of the apparatus) into the processing space 181, and the one end thereof is connected to outside of the continuous stirring apparatus F such as a tank for storing the substance to be processed, and the other end thereof is connected directly or indirectly to the processing space 181. In this embodiment, as shown in FIG. 16(A), the supplying part 175 is provided on the outer wall 161 and communicates with a seal part 184 via a receiving part 182 described later. The outflow part 168 is a discharge port to discharge the processed substance that has been subjected to the fluid processing in the processing space 181 to outside of the system (outside of the apparatus). In this embodiment, the upper part of FIG. 16(A) is the upstream side of the flow of the substance to be processed, and the lower part of FIG. 16(A) is the downstream side of the flow of the substance to be processed, and the supplying part 175 is provided on the upper part of the cylindrical wall 163 of the outer wall 161, and the outflow part 168 is provided on the lower part of the cylindrical wall 163 of the outer wall 161. a plurality of the supplying parts 175 and outflow parts 168 may be provided on the outer wall 161. By providing a plurality of the supplying parts 175 on the outer wall 161, a plurality of the substances to be processed can be supplied to the processing space 181 from outside of the system (outside of the apparatus), and by providing a plurality of the outflow parts 168 on the outer wall 161, the processed substance can flow out to outside of the system (outside of the apparatus) from the processing space 181 according to the processing time of the substance to be processed in the processing space 181.

Labyrinth Seal Mechanism

In the members that constitute the processing space 181 such as the outer circumferential surface 111 of the inner wall 110, and the cylindrical wall 163 of the outer wall 161, the labyrinth seal mechanism may be provided to extend the retention time of the fluid in the processing space 181. The labyrinth seal is a seal that provides resistance to flow of the fluid while maintaining the clearance in the radius direction or in the axial direction and minimizes leakage, and a maze formed by the peripheral part of knife-like structure and contact points causes expansion of the fluid passing through one after another.

In this embodiment, the protruding part 116 is a member that constitutes the labyrinth seal, and a minute clearance in the range of about 0.01 to 1 mm is formed between the front end of the protruding part 116 and the inner circumferential surface 170 of the cylindrical wall 163 of the outer wall 161, though this range may change depending on the viscosity of the substance to be processed.

By setting such a minute clearance, the substance to be processed becomes a laminar flow upon passing through the clearance, which makes difficult to pass through. As a result, it takes a time to pass through the minute clearance, and the substance to be processed retains in a comparatively large space in the upstream side of the minute clearance.

In other words, it can be said that the labyrinth seal mechanism applied to the continuous stirring apparatus F used in the present invention is not a seal mechanism that completely prevents the leakage but is the mechanism that gradually leaks the fluid to the downstream side while retaining the fluid in the space on the upstream-side thereof.

The specific configuration and function of the labyrinth seal mechanism will be described with referring to FIG. 16(A).

The processing space 181 comprises the seal part 184 and a pool part 183. The seal part 184 is a narrow space formed between the front end of the protruding part 116 and the inner circumferential surface 170 of the cylindrical wall 163 of the outer wall 161, the pool part 183 is a space formed between the outer circumferential surface 111 of the inner wall 110 not having the protruding part 116 and the inner circumferential surface 170 of the cylindrical wall 163 of the outer wall 161, and the pool part 183 is arranged in the upstream side of the seal part 184 and is a wider space than the seal part 184.

In the continuous stirring apparatus F, the labyrinth seal means the seal part 184, and the labyrinth seal mechanism means a set of the seal part 184 and the pool part 183.

As in this embodiment, it is ideal in the point of controlling the age of the substance to be processed in which the inner wall 110 rotates relative to the outer wall 161, the protruding part 116 is provided on the outer circumferential surface 111 of the inner wall 110, and the seal part 184 is provided between the front end of the protruding part 116 and the inner circumferential surface 170 of the cylindrical wall 163 of the outer wall 161.

In this embodiment, the seal part 184 and the pool part 183 are made as a set, a plurality of the sets of them are continuously arranged from the upstream to the downstream of the flow of the substance to be processed. One set of the seal part 184 and the pool part 183 may be arranged.

The processing space 181 comprises the receiving part 182. The receiving part 182 is a space in the most upstream of the processing space 181 and is a wider space than the seal part 184, and this can receive the substance to be processed supplied from the supplying part 175 without resistance. This may also serve as the pool part 183 arranged in the most upstream of the flow of the substance to be processed.

The fluid supplied from the supplying part 175 to the processing space 181 is firstly received by and stored in the receiving part 182. When the receiving part 182 is filled with the fluid, this fluid leaks to the seal part 184 arranged in the downstream side of the receiving part 182. When the seal part 184 is filled with the fluid, the fluid leaks to the pool part 183 arranged in the downstream side of the seal part 184. The fluid is received by and stored in the pool part 183. When the pool part 183 is filled with the fluid, this fluid leaks to the seal part 184 arranged in the downstream side of the pool part 183. In the processing space 181, plurality of sets of the seal part 184 and the pool part 183 are continuously arranged, therefore, movements of these fluid are repeated.

On the other hand, the inner wall 110 having the protruding part 116 on the outer circumferential surface 111 thereof rotates. When the spaces of the receiving part 182, the seal part 184, and the pool part 183 are filled with the fluid respectively, the centrifugal force acts due to the rotation of the inner wall 110, therefore for example, the fluid in the receiving part 182 is difficult to leak out to the seal part 184 arranged in the downstream side of the receiving part 182. Especially in the seal part 184, which is a narrow space, due to the rotation of the inner wall 110, the fluid is difficult to leak out to the pool part 183 arranged in the downstream side of the pool part 184, but it is not completely sealed, so a predetermined small amount of the fluid is moved to the downstream side. This predetermined amount is determined according to the necessary processing conditions such as the required processing purpose, the processing amount, and the processing speed.

Accordingly, when the inner wall 110 is rotated, and a plurality of the sets of the receiving part 182, the seal part 184 which is a narrow seal space, and the pool part 183 which is a retention space wider than the seal part 184 are continuously arranged in the processing space 181, the leaking amount of the fluid supplied from the supplying part 175 to the processing space 181 is minimized in the seal part 184, and the fluid leaked out from the seal part 184 is filled and stored in the pool part 183 that is arranged in the downstream side of the seal part 184; as a result of the above, the retention time of the fluid in the processing space 181 is extended due to the labyrinth seal.

Especially, by providing a plurality of sets of the pool part 183 and the seal part 184, the retention time of the fluid in the entire apparatus is leveled. For example, considering the case where the single part 183 fills the total storing capacity of the fluid planned for the entire apparatus, even if the retention time of the fluid from the empty state of the single pool part 183 to the filled state thereof is constant, when a continuous operation is carried out after the pool part is filled, it is difficult to configure all the fluids that fill the single pool part 183 replacing with all of new fluids flowing in from the upstream, a part of the fluid flows out to the downstream before attaining the retention time, and the other part of the fluid retain in the pool part 183 indefinitely. Accordingly, the control of the retention time is more likely to be controlled by chance, as a result, a percentage of the fluid flowing out to downstream before attaining the planned determined retention time is also controlled by chance. On the other hand, when the plurality of sets of the pool part 183 and the seal part 184 are arranged, even if the retention time in the single pool part 183 is controlled by chance, by increasing the number of the sets, the retention times of each fluid are leveled, and it is advantageous in terms of a stable control of the retention time.

By continuously providing a plurality of the sets of the seal part 184 and the pool part 183, which the seal part 184 and the pool part 183 serve as one set, in the processing space 181 and by rotating the inner wall 110 that constitutes the processing space 181 relative to the outer wall 161, retention of the substance to be processed in the pool part 183 that is in the upstream side of the seal part 184 and passing of the substance to be processed subsequent to the retention through the seal part 184 are repeatedly performed whereby the retention time of the substance to be processed can be controlled.

The retention time of the fluid in the processing space 181 can be adjusted by adjusting the volume of the processing space 181, the clearance and length of the processing space 181, the number of the sets of the seal part 184 and the pool part 183, the rotation number of the inner wall 110, and the introduction amount of the fluid introduced into the continuous stirring apparatus F. The retention time of the fluid in the processing space 181 is preferably in the range of about 2 to 30 minutes, more preferably in the range of about 3 to 10 minutes, but when the fluid processing is polymerization reaction or the like, the retention may be required for several hours in some cases. The circumferential velocity of the inner wall 110 at the outer circumference thereof is preferably in the range of 0.5 to 35 m/sec. The outer circumference of the inner wall 110 does not include the protruding part 116. When the retention time is required to be adjusted while the continuous stirring apparatus F is under operation, the rotation number of inner wall 110 and the introduction amount of the fluid introduced into the continuous stirring apparatus F are adjusted. By adjusting these, the desired retention time is realized depending on the product.

The shape of the protruding part 116 may be any shape as long as this can form the seal part 184 which is a narrow space between the front end thereof and the outer wall 161. When the protruding part is provided on the outer wall 161, the shape of the protruding part may by any shape as long as this can form the seal part 184, which is a narrow space between the front end thereof and the inner wall 110. The length of the protruding part and the width of the front end of the protruding part may be arbitrarily set within a range necessary for obtaining labyrinth seal property.

The fluid that fills the narrow space of the seal part 184 becomes a laminar flow, so that the seal effect thereof can be enhanced. On the other hand, the fluid stored in the receiving part 182 and the pool part 183, which are comparatively wide spaces, becomes a turbulent flow, so that the stirring action is given to the fluid during its retention.

Introduction Part

An introduction part 169 may be arranged in the outer wall 161 or in the ceiling part 176. The introduction part 169 is a supplying port to supply a substance to be processed to the processing space 181 from the flow path different from the flow path of the substance to be processed that is supplied from the supplying part 175 to the processing space 181. In this embodiment, the introduction part 169 is provided on the outer wall 161 between the suppling part 175 and the outflow part 168 and supplies another substance to be processed to the substance to be processed under the processing. The introduction part 169 may be provided on the upper end of the cylindrical wall 163 of the outer wall 161, or the position thereof may be changed. The substance to be processed supplied to the processing space 181 from the introduction part 169 may be different from or the same as the substance to be processed itself that is supplied from the supplying part 175 to the processing space 181. As illustrative examples of the substance to be processed supplied from the introduction part 169 to the processing space 181 include a raw material itself, a polymerization initiator, a reaction terminating agent, a polymerization terminating agent, a pH-adjusting agent, a catalyst, and a coating agent.

The introduction part 169 may be used as the discharge port to discharge a gas generated during the fluid processing, or separate discharge port to discharge the gas may be arranged.

Accordingly, the substance to be processed supplied from the supplying part 175 to the processing space 181 is discharged from the outflow part 168 while introducing a fluid and discharging a fluid such as a gas through the introduction part 169 as needed, whereby the fluid processing in the restricted processing space 181 is completed.

Temperature Adjusting Mechanism

A temperature adjusting mechanism T10 is equipped with at least any one of the outer wall 161 and the inner wall 110, the temperature of the member is adjusted by cooling or heating, so that the temperature of the fluid flowing in the processing space 181 may be adjusted. In FIG. 16(A), as the temperature adjusting mechanism T10, the outer circumferential surface of the cylindrical wall 163 of the outer wall 161 is provided with a temperature adjusting jacket for flowing various heat media including iced water and steam. As shown in FIG. 16(A), one temperature adjusting jacket may be installed in the outer wall 161, or as shown in FIG. 20(A) described later, a plurality of the temperature adjusting jackets (in FIG. 20(A), two jackets of T11 and T21) may be installed in the outer wall 161. Further, when a plurality of the temperature adjusting jackets is installed in the outer wall 161 as shown in FIG. 20(A), these jackets may be adjusted to the same temperature or may be adjusted to different temperatures. By adjusting a plurality of the temperature adjusting jackets to different temperatures, the temperature of the fluid flowing through the processing space 181 can be adjusted according to the progress of the fluid processing in the processing space 181. In place of the temperature adjusting jacket, a cooling element and a heat-generating element may be installed in at least any one of the outer wall 161 and the inner wall 110.

Stirring Blade and Scraper

The inner wall 110 may be provided with the stirring blade 211 and a scraper 212. They are effective when fluid processing of a highly viscous substance to be processed is carried out.

In this embodiment, as shown in FIG. 16(A) and FIG. 16(B), a plurality of plate-like stirring blades 211 are provided with an interval in the circumferential direction on the outer circumferential surface 111 not having the protruding part 116 which is provided between the protruding part 116 arranged in the inner wall 110 and the protruding part 116. The stirring blade 211 may be fixed to the outer circumferential surface 111 of the inner wall 110, or may be fixed to the disk-like protruding part 116. By rotating the stirring blade 211 together with the inner wall 110, the stirring function to the substance to be processed flowing through the processing space 181 can be enhanced. A different blade may be detachably installed to the stirring blade 211.

In this embodiment, as shown in FIG. 16(A), the scraper 212 is provided between the protruding part 116 and the protruding part 116 that are provided on the inner wall 110. FIG. 17(A) is the cross-section view of the essential part along the line A-A in FIG. 16(A), and FIG. 17(B) is the cross-section view of the essential part along the line B-B in FIG. 17(A). As shown in FIG. 17(A) and FIG. 17(B), a pillar part 213 to support the scraper 212 is provided between the protruding part 116 and the protruding part 116. As shown in FIG. 17(A), the pillar part 213 is composed of two plate-like members, the scraper 212 is interposed between the two plate-like members, and the scraper 212 is fixed to the two plate-like members by means of a bolt 214 or the like so that the pillar part 213 can support the scraper 212. As shown in FIG. 17(A) and FIG. 17(B), the front end of the scraper 212 is closely contacted to the inner circumferential surface 170 of the cylindrical wall 170 of the outer wall 161.

The scraper 212 is a scraping blade to scrape off an adhered substance that is adhered to the inner circumferential surface 170 of the cylindrical wall 163 of the outer wall 161. The scraper 212 is fixed to the pillar part 213 provided on the inner wall 110, the front end of the scraper 212 is closely contacted to the inner circumferential surface 170 of the cylindrical wall 163 of the outer wall 161, and the scraper 212 rotates with inner wall 110, whereby the scraper 212 scrapes off the adhered substance continuously.

In the case that the temperature adjusting mechanism T10 is attached to the outer circumferential surface of the cylindrical wall 163 of the outer wall 161 and the fluid processing such as polymerization reaction is performed while adjusting the temperature of the substance to be processed flowing through the processing space 181, when the adhered substance is generated on the inner circumferential surface 170 of the cylindrical wall 163 of the outer wall 161, the heat transfer efficiency of the inner circumferential surface 170, which is the heat transfer surface, is significantly decreased, and the temperature of the fluid in the processing space 181 cannot be adjusted. the scraper 212 continuously scrape off the adhered substance, so that the decrease of the heat transfer efficiency of the inner circumferential surface 170 of the cylindrical wall 163 of the outer wall 161 is prevented, and further the yield of the product is improved.

Figure 18:
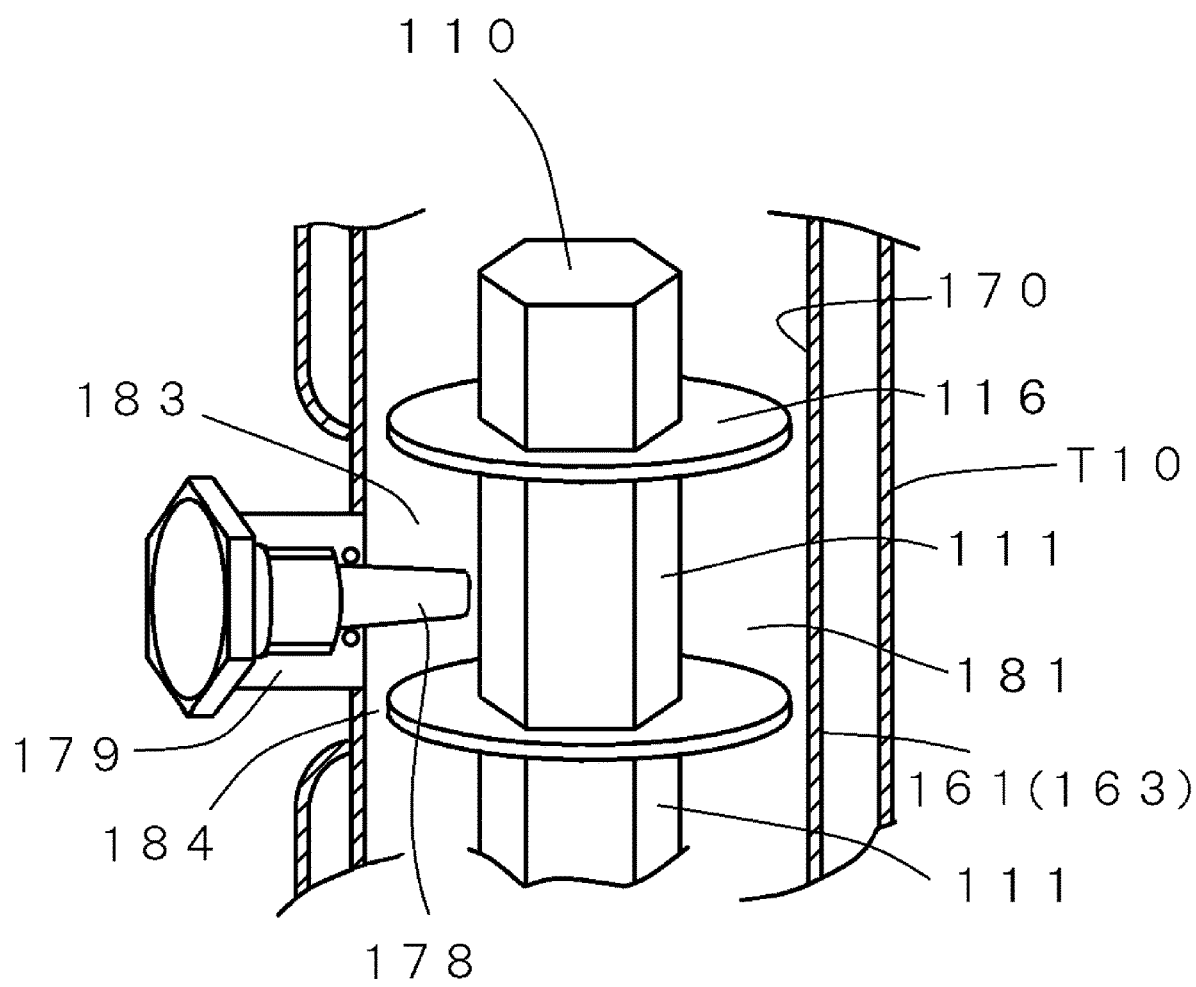
FIG. 18 This is a perspective view of the essential part of the continuous stirring apparatus according to another embodiment of the continuous stirring apparatus that is used to carry out the present invention.

Another embodiment may also be implemented by providing a baffle plate 178 on the outer wall 161. In FIG. 18, the embodiment in which the baffle plate 178 is attached to the outer wall 161 is illustrated. More specifically, a supporting part 179 to support the baffle plate 178 is provided on the cylindrical wall 163 of the outer wall 161, and the front end of the baffle plate 178 supported by the supporting part 179 protrudes toward the pool part 183. As such, the baffle plate 178 is provided to promote the stirring of the fluid.

In this embodiment, the inner wall 110 has the shape of a hexagonal prism and is provided with a plurality of the protruding parts 116 that protrude outward in the radius direction from the outer circumferential surface 111 thereof. The inner wall 110 may be a columnar shape, and prismatic shape such as a hexagonal pillar and a square pillar, or may be odd-shape pillar.

Figure 19:
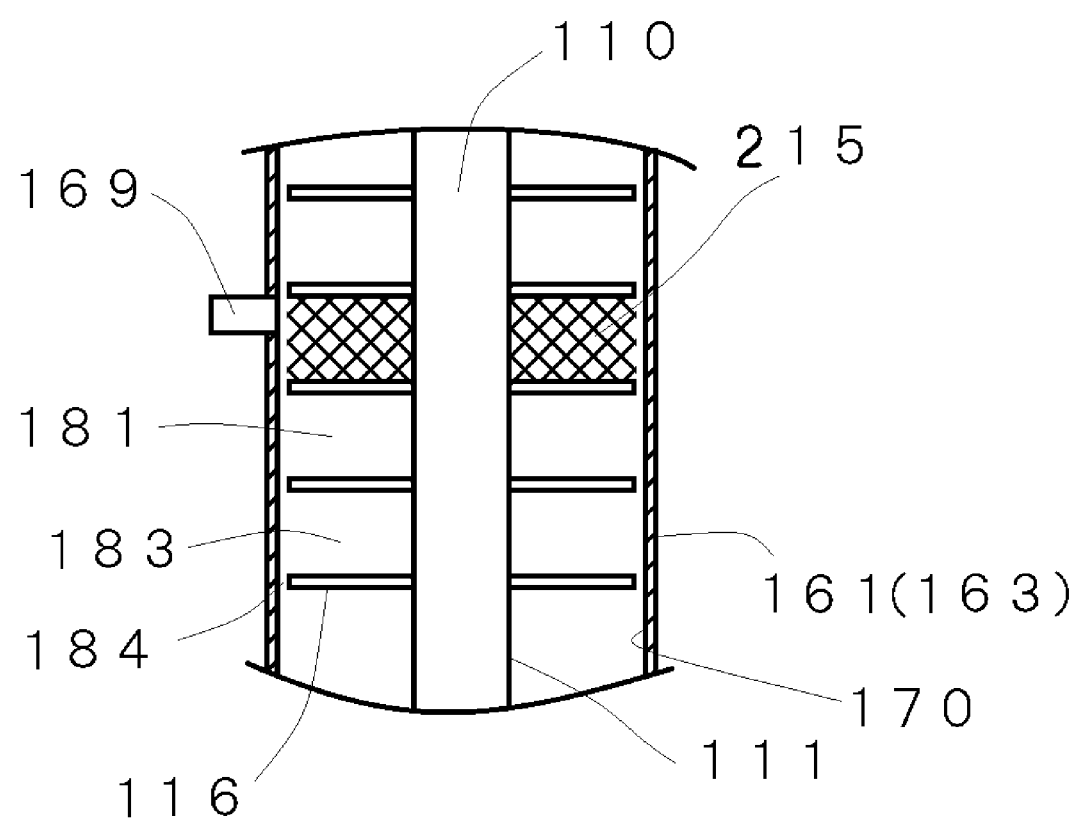
FIG. 19 This is a perspective view of the essential part of the continuous stirring apparatus according to still another embodiment of the continuous stirring apparatus that is used to carry out the present invention.
Figure 20:
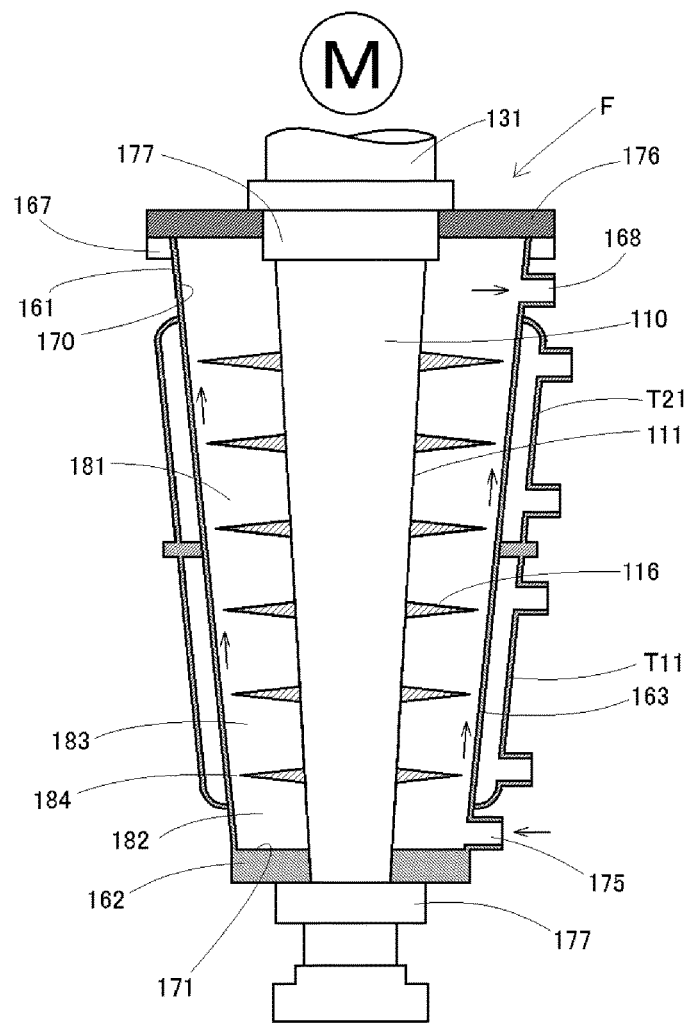
FIG. 20(A) is a rough cross-section view of the continuous stirring apparatus according to still another embodiment of the continuous stirring apparatus that is used to carry out the present invention.
FIG. 20(B) and FIG. 20(C) are explanatory drawings of the essential parts of this apparatus.
Figure 20:
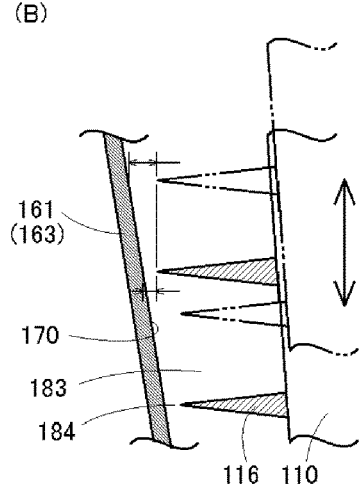
Figure 20:
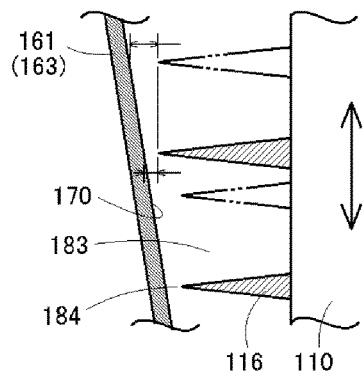

Still another embodiment may be implemented by providing a catalyst part 215 on the pool part 183. In FIG. 19, the embodiment can be described that the catalyst supported on a carrier is attached as the catalyst part 215, more specifically, the catalyst part 215 having substantially the same outer diameter as the protruding part 116 is attached to the outer circumferential surface 111 not having the protruding part 116 which is provided between the protruding part 116 arranged in the inner wall 110 and the protruding part 116. The outer diameter of the catalyst part 215 may be shorter than the protruding part 116. Here, the outer diameter of the catalyst part 215 refers to the outer diameter of the entire carrier on which the catalyst is supported. The catalyst part 215 may be attached to the protruding part 116 having the disk-like shape, and at that time, the catalyst part 215 may be attached to the protruding part 116 having the disk-like shape by providing a space between the outer circumferential surface 111 of the inner wall 110 and the catalyst part 215. The catalyst supported on a plurality of the carriers may be attached as the catalyst part 215 to the outer circumferential surface 111 of the inner wall 110 with an interval in the circumferential direction. Since the catalyst part 215 rotates with the inner wall 110, the carrier on which the catalyst is supported is preferably strong enough to endure the rotation. The carrier on which the catalyst is supported is preferably a honeycomb-like or a mesh-like carrier, and it is not preferable to use a carrier that causes resistance to the fluid flowing through the processing space 181 more than required. The catalyst supported on the carrier or the catalyst itself is a solid, which can be selected and implemented as necessary depending on the kind of the substance to be processed and the type of reaction. As such, the catalyst part 215 is provided on the pool part 183, so that the reaction can be carried out efficiently.

Each embodiment may be implemented in combination with the previous embodiments mentioned above.

Material

The inner wall 110 and the outer wall 161 may be configured as a single member or of a combination of plurality of members; the material thereof is not only metal, but also ceramics such as silicon carbide (SiC), sintered metal, abrasion-resistant steel, sapphire, and other metal subjected to hardening treatment, and rigid material subjected to lining, coating, or plating and the like.

MODIFIED EXAMPLES

Next, with referring to FIG. 20(A), modification examples of the continuous stirring apparatus F will be explained. Hereinafter, the basic structure and action of the continuous stirring apparatus F are the same as above, the explanation will be mainly given to the different points, with regard to the points not explained here, the explanation given to the previous embodiments shall be applied as it is. In any modification, too, the labyrinth seal mechanism is provided, and the function is exhibited.

In FIG. 20(A), both the outer wall 161 and the inner wall 110 are circular truncated cone shape, the outer wall 161 and the inner wall 110 are arranged concentrically. In this example, the lower part of FIG. 20(A) is the upstream side of the flow of the substance to be processed, and the upper part of FIG. 20(A) is the downstream side of the flow of the substance to be processed. This embodiment is suitable, for example, when an emulsion polymerization reaction or a suspension polymerization reaction is performed, upon carrying out the polymerization reaction in the processing space 181 to the fluid in the suitable emulsified state or a suitable suspension state in pretreatment, a gas generated during the reaction is discharged to outside of the system (outside of the apparatus). Here, the circular truncated cone shape is a cylindrical shape having a circular cross-section view, the diameter thereof gradually decreases or increases from the upstream side to the downstream side of the flow of the substance to be processed, though the diameter thereof may include a part where the diameter is constant. For example, as it will be described later, when at least any one of the outer wall 161 and the inner wall 110 is provided so as to be movable by means of a clearance adjustment mechanism (not shown), a part where the diameter is constant may be provided on the upstream side and downstream side of the flow of the substance to be processed. In addition, even in the part where the labyrinth seal mechanism is applied, there may be the part where the diameter thereof gradually increases or decreases and the part where the diameter thereof is constant. In this embodiment, both the outer wall 161 and the inner wall 110 have the cylindrical shape having a circular cross-section view in which the diameter thereof gradually increases from the upstream side to the downstream side of the flow of the substance to be processed.

The outer wall 161 has a circular truncated cone shape having the bottom part 162, and a flange that protrudes outward in the radius direction is formed at the opening end thereof, the ceiling part 176, which is a separate member from the outer wall 161 is fixed to the flange 167 thereby being closed.

The inner wall 110 has a circular truncated cone shape having a plurality of the protruding parts 116 that protrude outward in the radius direction from the outer circumferential surface 111 thereof. In this embodiment, the protruding part 116 has a circular shape in a plan view and is provided at predetermined interval in the axial direction, and the protruding part 116 is tapered from the base end to the front end, and the thickness thereof changes in the radius direction. The inner wall 110 may be a solid circular truncated cone shape.

Clearance Adjustment Mechanism

At least any one of the outer wall 161 and the inner wall 110 may be provided so as to be movable by means of a clearance adjustment mechanism (not shown). By providing at least any one of the outer wall 161 and the inner wall 110 so as to be movable, the size of the seal part 184 can be adjusted. In this embodiment, the inner wall 110 is provided so as to be movable concentrically, namely, in the center axis direction, by means of the clearance adjustment mechanism (not shown). Here, it is preferable that the position of the center axis do not change. By providing the inner wall 110 so as to be concentrically movable, the size of the seal part 184 can be adjusted. In this embodiment, the outer wall 161 has a circular truncated cone shape, and by providing the inner wall 110 so as to be concentrically movable, a minute clearance between the front end of the protruding part 116 and the inner circumferential surface 170 of the cylindrical wall 163 of the outer wall 161 can be adjusted. It is advantageous since a comparatively large size of the seal part 184 can be provided by adjusting the size of the seal part 184 when a gas generated during the reaction is desired to be removed or when a highly viscous substance to be processed is processed. FIG. 20(B) and FIG. 20(C) are the explanatory views of the essential part of the continuous stirring apparatus F, showing the change of the size of the seal part upon concentrically moving the inner wall 110 by means of the clearance adjustment mechanism (not shown). The solid line illustrates the state in which the inner wall 110 descends, and the two-dot chain line illustrates the state in which the inner wall 110 ascends. FIG. 20(C) is the cross-section view of the essential part when the inner wall 110 having a columnar shape is concentrically moved by means of the clearance adjustment mechanism (not shown). As shown in FIG. 20(B) and FIG. 20(C), when the inner wall 110 is concentrically ascended by means of the clearance adjustment mechanism (not shown), the size of the seal part 184 is enlarged. The specific configuration of the clearance adjustment mechanism is not particularly restricted, any linearly sending means such as a sending mechanism by a screw, a fluid pressure driving mechanism such as air, oil pressure, or the like may be employed by appropriately selecting them.

Microwave Irradiating Mechanism

At least any one of the outer wall 161 and the inner wall 110 may be equipped with a microwave-generating device such as a magnetron for irradiating the microwave as a microwave irradiation mechanism, so that the fluid flowing through the processing space 181 may be heated, and a chemical reaction thereof may be facilitated.

Pressure Adjusting Mechanism

The inner wall 110 and the outer wall 161 may be equipped with a pressure adjusting mechanism for adjusting the pressure of the fluid flowing thorough the processing space 181. Examples of the pressure adjusting mechanism include various pumps. Negative pressure may be applied to the processing space 181. Specifically, the processing space 181 may be pressurized by a nitrogen gas, or the vacuum degree in the space 181 may be controlled by a vacuum pump.

The substance to be processed in which the fluid processing in the processing space 181 is planned is supplied from the supplying part 175 to the processing space 181. The substance to be processed supplied from the supplying part 175 to the processing space 181 is subjected to the fluid processing while flowing through the processing space 181 and discharged from the outflow part 168 to outside of the system (outside of the apparatus). The fluid processing is a reaction processing, which is the processes of mixing raw materials as well as a subsequent reaction progress and the process for obtaining a reaction product, and the processes that can be conducted include residing of the following processes can be performed. As for the example, retention of the fluid, stirring of the fluid, mixing of the fluid, heat-treatment, pH-adjustment, and ageing and the like can be mentioned. These reaction processes may be or may not be accompanied with crystallization, precipitation, separation, and the like. For example, in the case of an organic reaction, the reaction may be completed by the retention process, at that time, the stirring processing may be further added.

The continuous stirring apparatus F used for carrying out the present invention may be used as an apparatus to carry out, a first fluid processing (mixing of a raw material A with a raw material B) and a second fluid processing (progress of a reaction of the raw material A with the raw material B), as exemplified above. The first fluid processing may be carried out by an apparatus different from the continuous stirring apparatus F according to the present invention and the second fluid processing after the first fluid processing may be carried out by the continuous stirring apparatus F according to the present invention, or the first fluid processing may be carried out by the continuous stirring apparatus F according to the present invention and the second fluid processing after the first fluid processing may be carried out an apparatus different from the continuous stirring apparatus F according to the present invention.

In addition, the development is possible such as that fluid processing such as pre-dispersion, pre-emulsification, or pre-grinding is performed to the pretreated fluid using an apparatus different from the continuous stirring apparatus F of the present invention, or the fluid processing is directly performed without these pre-processes.

Control of Processing Characteristics

By performing the fluid processing using the continuous stirring apparatus F of the present invention, reaction conditions such as temperature condition, pressure condition, stirring condition, and reaction time in the reaction field can be adjusted, thus, for example, the processing characteristics such as the reaction rate of the raw material, selectivity, and yield of the product can be controlled. Here, the reaction rate of the raw material is a ratio of the raw material consumed by the reaction to the supplied raw material, the selectivity is a ratio of the raw material consumed by the reaction consumed to produce an intended product, and the yield of the product is the multiplied value of the reaction rate by the selectivity.

Under the Non-Laminar Flow

In the present invention, it is preferable that the fluid processing in the processing space 181 be performed under a non-laminar flow condition. A turbulent state is created by applying shear force to the fluid supplied from the supplying part 175 to the processing space 181 or by increasing the representative length L described in the above-described formula (2), in this state, a product may be obtained by increasing the frequency of contact and collision among the molecules in the fluid. For example, when it is desired to obtain a dispersion solution of pigment particles by dispersing a fluid having pigment particles, the stirring under the turbulent flow is useful. In addition, under the turbulent flow condition, the enhancement of the heat exchange efficiency can be expected between heat medium flowing through the temperature adjusting mechanism T10 and the fluid flowing through the processing space 181.

Hereinafter, the present invention will be explained in more detail by using several chemical reactions as the examples of them. However, the present invention is not limited to these embodiments. They are only a few examples of all the organic reactions using an organic compound as the starting raw material thereof.

In the organic reaction in the present invention, an organic compound being reaction substrate contained in the fluid to be processed and/or a substance facilitating the reaction (reacting agent) is/are passed through the upstream-side processing part and the downstream-side processing part having a plurality of the labyrinth seals that function to retain and stir the fluid to be processed in the fluid processing apparatus F as shown in FIG. 12(C), thereby forcibly and uniformly being mixed and stirred to proceed the organic reaction. In the present invention, the fluid to be processed contains at least one kind of organic compound.

Kinds of Reactions and Reaction Conditions

The reaction in the present invention may be any of a homogeneous liquid phase reaction, a reaction of the liquids immiscible to each other, and an inhomogeneous reaction of a liquid-solid system or of a liquid-gas system. Typically, an organic compound itself that is a reaction substrate, or an organic compound in the state of solution in which the organic compound is dissolved in a solvent in advance and/or a substance itself that facilitates the reaction (reacting agent), or a substance that facilitates the reaction (reacting agent) in the state of solution obtained by previously dissolving in a solvent is introduced from the first introduction part d1 and the second introduction part d2 according to the fluid processing apparatus F as shown in FIG. 12(C), thereby forcibly and uniformly being mixed and stirred to cause the organic reaction. Further, at the time of reaction between the reaction substrate and the reaction substrate, or the reaction between the reaction substrate and the reacting agent, a third component different from the reaction substrate and the reacting agent may be present, if necessary. As illustrative example of the third component includes such as a polymerization initiator, a reaction terminating agent, a polymerization terminating agent, a pH-adjusting agent, a catalyst, and a coating agent, and a plurality of the components may be present during the reaction.

When a solvent different from the organic compound, as the reaction substrate is used, water, liquid ammonia, an organic solvent, a supercritical fluid, an ionic liquid, an inorganic acid, or the like may be used as the solvent.

An illustrative examples of the organic solvent includes: aliphatic hydrocarbons such as pentane and hexane; aromatic hydrocarbons such as benzene, toluene, and xylene; alcohols such as methanol, ethanol, propanol, and isopropanol; diols such as ethyleneglycol, propanediol, and butanediol; ketones such as acetone, diethyl ketone, and methyl ethyl ketone; aldehydes such as butylaldehyde; ethers such as diethyl ether, dibutyl ether, dimethoxyethane, tetrahydrofuran, and dioxane; esters such as methyl acetate, ethyl acetate, butyl acetate, and γ-butyrolactone; amines such as triethylamine, pyrrolidine, and pyridine; nitriles such as acetonitrile; amides such as dimethylformamide and N-methylpyrrolidone; sulfoxides such as dimethyl sulfoxide; halogen-based solvents such as carbon tetrachloride, chloroform, dichloromethane, and dichloroethane; carboxylic acids such as acetic acid and formic acid; and sulfonic acids such as methanesulfonic acid. Mixtures of them can be used with an arbitrary mixing ratio.

As for supercritical fluid, supercritical water, supercritical carbon dioxide and the like can be used.

An illustrative example of ionic liquid includes ammonium salts, imidazolium salts, morpholinium salts, phosphonium salts, piperidinium salts, pyridinium salts, pyrrolidinium salts, and sulfonium salts. Mixtures of them can be used with an arbitrary mixing ratio.

An illustrative example of the inorganic acid includes nitric acid and nitrous acid; sulfric acids such as sulfuric acid, persulfuric acid, sulforous acid, thiosulfuric acid, and adithionic acid; and phosphoric acids such as phosphonic acid, phosphorous acid, phosphoric acid, and polyphosphoric acid. Mixtures of them can be used with an arbitrary mixing ratio.

Of these, water and organic solvents are preferable. The amount of the solvent used is usually such that the concentration of the reaction substrate with respect to 1 liter of the solvent is in the range of 0.01 to 20 moles, preferably in the range of 0.1 to 10 moles, while more preferably in the range of 1 to 5 moles.

An illustrative example of the reaction in the present invention includes an oxidation reaction, a reduction reaction, a substitution reaction, an addition reaction, an elimination reaction, a rearrangement reaction, a condensation reaction, a pericyclic reaction, a polymerization reaction, a solvolysis, a dehydration reaction, and a halogenation reaction and the like.

An illustrative example of the oxidation reaction includes an oxidation reaction of a hydroxy group to a carbonyl group, an oxidation reaction of an aldehyde group to a carboxylic acid, an oxidation reaction of a carboxylic acid to a percarboxylic acid, a dehydrogenation reaction of an alkane to an alkene, a dehydrogenation reaction of an alkene to an alkyne, an oxidation reaction of an alkene to an alkene oxide, a nitro group synthesis reaction by an oxidation of an amine, and a N—O radical synthesis reaction by an oxidation reaction of an amine. An illustrative example of the reacting agent for the oxidation reaction includes chromate salts, hypochlorite salts, perchlorate salts, osmium compound, hypervalent iodine compound, sulfur oxide, N-oxide compound, peroxides such as an aqueous hydrogen peroxide solution and hydroperoxide, and an oxygen.

An illustrative example of the reduction reaction includes a reduction reaction of an ester to an aldehyde, a reduction reaction of an ester to an alcohol, a reduction reaction of an ester to a methyl group, a reduction reaction of a ketone to an alcohol, a reduction reaction of a ketone to a hydrocarbon group, a reduction reaction of a cyano group to a Shiff base, a reduction reaction of a cyano group to a methylamino group, a reduction reaction of a nitro group to an amino group, a reduction reaction of a Shiff base to an amino group, and a reductive amination reaction of a carbonyl group. An illustrative example of the reacting agent for the reduction reaction includes aluminum hydride compound, borane compound, borohydride compound, metal hydride compound, silane compound, and tin hydride compound and the like.

The substitution reaction is a reaction in which an atom or a substituent group in an organic compound is replaced, and this reaction is roughly classified into an electrophilic substitution reaction and a nucleophilic substitution reaction in accordance with the type of reaction. An illustrative example thereof includes a nucleophilic substitution reaction of an alkyl halide, an aromatic nucleophilic substitution reaction, an aromatic electrophilic substitution reaction, an electrophilic substitution reaction, a substitution reaction of an alcohol with a hydrogen atom, a nucleophilic substitution reaction of a silyloxy compound, a halogen atom substitution reaction of a diazonium group, and a hydroxy group substitution reaction of a diazonium group, and the like.

The addition reaction is a reaction in which multiple bonds are cleaved, and each end thereof forms new single bond with another atomic groups, similarly to the substitution reaction, this reaction is roughly classified into an electrophilic addition reaction and a nucleophilic addition reaction in accordance with the type of reaction. An illustrative example thereof includes an addition reaction of halogens to an alkene, an addition reaction of halogens to an alkyne, an addition reaction of a hydrogen halide to an alkene, an addition reaction of a hydrogen halide to an alkyne, a conjugated addition reaction to an $\alpha,\beta$-unsaturated carbonyl compound, a hydroboration of an alkene, a hydroformylation of an alkene, a diol synthesis reaction from an alkene, an alcohol addition reaction to an isocyanate group, an amine addition reaction to an isocyanate group, an acid addition reaction to an isocyanate group, a cyanohydrination reaction of a carbonyl group, a reaction to give an acetal group from a carbonyl group and an alcohol, a hemiacetalization reaction to a carbonyl group, a synthesis reaction of a secondary amine, a tertiary amine, or a quaternary ammonium salt by alkylation reaction of an amine, and a nucleophilic addition reaction of an organometallic compound (Grignard reagent, butyl lithium, and the like) to a carbonyl group or a cyano group.

The elimination reaction is a reaction form in which an organic compound releases an atomic group to become a molecule having less atoms, as a result a multiple bond is formed. An illustrative example thereof includes a decyanation hydrogen reaction of a cyano group, a Hoffman elimination reaction of a quaternary ammonium salt, and a dealcoholization reaction of an ether, and the like.

The rearrangement reaction is a reaction in which an atom or an atomic group (group) constituting a compound changes the bonding position thereof, and this reaction is classified into a nucleophilic rearrangement, an electrophilic rearrangement, a sigmatropic rearrangement, and a radical rearrangement in accordance with the type of reaction. An illustrative example thereof includes a Wagner-Meerwein rearrangement, a pinacol-pinacolone rearrangement, a benzyl-benzylic acid rearrangement, an allyl rearrangement, a Favorskii rearrangement, a Pummerer rearrangement, a Beckmann rearrangement, a Curtius rearrangement, a Lossen rearrangement, a Hoffman rearrangement, a Schmid reaction, and a Baeyer-Villiger oxidation, and the like.

The condensation reaction is a reaction in which an addition reaction and an elimination reaction take place continuously, so that this reaction also called an addition elimination reaction. Of the condensation reactions, the case where a water molecule is eliminated is called a dehydration condensation. An illustrative example of the condensation reaction includes: an esterification reaction of an alcohol with a carboxylic acid, a carboxylic acid anhydride, or a carboxylic acid chloride; an amidation reaction of an amine with a carboxylic acid, a carboxylic acid anhydride, or a carboxylic acid chloride; an aldol condensation reaction of a carbonyl compound having a hydrogen at the $\alpha$ position thereof with an aldehyde, or a ketone; a Claisen condensation reaction between esters under a basic condition; an acid anhydride synthesis reaction of a carboxylic acid; and a reaction to obtain an alkene by condensation of an active methylene compound with an aldehyde or a ketone.

The pericyclic reaction is a type of reaction in which a plurality of bonds including a n-electron system are simultaneously formed and cleaved via a cyclic transition state without passing through a reaction intermediate. An illustrative example thereof includes a Diels-Alder reaction of an alkene with a diene, a Diels-Alder reaction of an alkyne with a diene, a hetero Diels-Alder reaction of a carbonyl group with a diene, an ene reaction of an alkene having a hydrogen at an allyl position thereof with an alkene or a carbonyl group, and a cheletropic reaction of 1,3-butadiene with sulfur dioxide.

The polymerization reaction is a group of reactions aimed at synthesizing a polymer, and this reaction includes an addition polymerization in which a polymerizable monomer having a double bond is polymerized while opening the double bond, a ring-opening polymerization in which a monomer having a ring structure is polymerized while opening the ring, and a condensation polymerization in which a monomer is polymerized while releasing a molecule such as water or an atomic group. The process in which a monomer is reacted with an active species generated by a small amount of an initiator to newly form the same kind of an active species, and this reaction occurs continuously to produce a polymer is called a chain polymerization; and depending on the difference of the active species, it is classified into a radical polymerization, an anionic polymerization, a cationic polymerization, and a coordination polymerization, respectively. When a liquid phase polymerization is carried out, this is classified into a homogeneous polymerization in which a polymer is dissolved in a monomer or in a solvent, and an inhomogeneous polymerization in which a polymer is separated without being dissolved in a monomer or in a solvent; an example of the former includes a solution polymerization and a bulk polymerization, and an example of the latter includes a suspension polymerization and an emulsion polymerization.

The solvolysis is a nucleophilic substitution reaction or an elimination reaction in which a solvent acts as a nucleophilic agent and an organic compound as a solute is used as a reactant. The solvolysis is classified, depending on the types of solvents acting as a nucleophilic agent, into a hydrolysis (when water is the nucleophilic agent), an alcoholysis (when an alcohol is the nucleophilic agent), an ammonolysis (when an ammonia is the nucleophilic agent), an aminolysis (when an alkylamine is the nucleophilic agent), and the like. An illustrative example of the reactant of the solvolysis includes an ester, a nitrile, an isocyanide, and an amide, and generally, two decomposition products are generated from one reactant. For example, in the case of hydrolysis, ester is decomposed into alcohol and carboxylic acid, and amide is decomposed into carboxylic acid and amine. The alcoholysis using an ester as the reactant is known as the ester-exchange reaction, which is the exchange of alcohol part.

The dehydration reaction is a reaction that takes place by elimination of a water molecule from within or between molecules. An illustrative example thereof includes a reaction for synthesizing ether by intermolecular dehydration from two alcohol molecules, a reaction for synthesizing an alkene by intramolecular dehydration from an alcohol itself, and a reaction to give a Schiff base by intermolecular dehydration from a carbonyl group and an amino group.

The halogenation reaction is a reaction to introduce one or more halogen atoms into an organic compound, and this is classified into a fluorination reaction, a chlorination reaction (chlorolysis), a bromination reaction (bromization), and an iodination reaction depending on the halogen. An illustrative example thereof includes a halogenation reaction of an alkyl group, a halogenation reaction of an aromatic ring, and a halogenation reaction at the α-position of a carbonyl group. An illustrative example of the reaction agent in the halogenation reaction includes fluorine, hydrogen fluoride, a fluoride salt, chlorine, thionyl chloride, phosphorous trichloride, phosphorous pentachloride, sulfuryl chloride, oxalyl chloride, N-chlorosuccinimide, bromine, tribromide, N-bromosuccinimide, iodine, and N-iodosuccinimide.

In addition to the reactions mentioned above, illustrative examples of the reaction in the present invention also include an ester-exchange reaction between a carboxylic acid and an ester, an amid-exchange reaction between a carboxylic acid and an amide, an exchange reaction between an ester and an amide, a Wittig reaction, a reaction for producing alkene from a phosphorous compound and a carbonyl compound such as a Horner-Wadsworth-Emmons reaction, a reaction for producing alkene from an organic silicon compound and a carbonyl compound such as a Peterson olefination reaction, an olefination reaction using a titanium carbene complex such as Tebbe's reagent, a reaction for synthesizing an epoxide from a carbonyl compound and sulfur ylide such as a Corey-Chaykovsky reaction, a Simons-Smith reaction to form a cyclopropane from an alkene by a dihaloalkane, various coupling reactions (Suzuki-Miyaura coupling reaction, a Kumada-Corriu reaction, and an Ullmann coupling), and the like.

The method of the present invention is suitable for a reaction that generates significant heat or a reaction that may cause runaway, since the reaction heat generated during the reaction can be effectively removed by using the fluid processing apparatus F equipped with the temperature adjusting mechanism T in the downstream-side processing space.

In the present invention, it is considered that the downstream-side processing is particularly effective in the reaction that is difficult to be completed in a short time, and the details will be explained later, but the reactions using the fluid processing apparatus F are not restricted in any way. In addition to the reactions described below, this apparatus is effective and can be expected to further enhance the high yield and reduce the amounts of the reaction promoter and the catalyst to be used.

Reaction Example 1 (Emulsion Polymerization)

Emulsion polymerization is a widely used polymerization method because fine particles having a particle size in a wide range of 0.01 to several micrometers can be produced by using water, which is inexpensive and safe, as a medium and being obtained polymer having a high molecular weight. In a typical emulsion polymerization, an aqueous dispersion solution of polymer fine particles is produced through radical polymerization using a monomer, an emulsifier or a dispersant, an initiator, and water. In the fluid processing apparatus F used in the present invention, since a shear force is applied to the fluid to be processed in between at least two processing surfaces that rotate relative to each other in the upstream-side processing part, two fluids that are incompatible with each other can be efficiently emulsified by passing them through the upstream-side processing part. In addition, since the reaction can be continuously performed for a certain period of time in the downstream-side processing part, this apparatus is suitable for the reaction that requires to keep the same condition, for example, a chain polymerization. For example, in the case where the emulsion polymerization is carried out by using the apparatus shown in FIG. 12(C), it is preferable to produce a dispersion solution of the polymer fine particles in such a way that various raw materials used in the emulsion polymerization are prepared as a first fluid and a second fluid, and each of fluids is introduced from the first introduction part d1 and the second introduction part d2, and an emulsification process or a dispersion process of the monomer is carried out as the upstream-side processing in the upstream-side processing part, then, in the downstream-side processing part, as the downstream-side processing, the fluid to be processed is performed heating and stirring process to carry out a polymerization process. Partial polymerization may be conducted as the upstream-side processing, and the emulsification or dispersion of the monomer may be continuously conducted as the downstream-side processing in parallel to the polymerization. Examples of the first fluid and the second fluid include the fluid containing at least one monomer and the fluid containing the initiator and at least any of the emulsifier and the dispersant in water, which is the medium immiscible with the monomer.

The emulsion polymerization that can be used in the present invention is not particularly restricted to the following, but illustrative examples thereof include: α-olefins such as ethylene and propylene; (meth)acrylic acid alkyl esters such as methyl (meth)acrylate, ethyl (meth)acrylate, n-butyl (meth)acrylate, and isobutyl (meth)acrylate; alkoxyalkyl (meth)acrylates such as 2-methoxyethyl (meth)acrylate and 2-ethoxyethyl (meth)acrylate; styrene; ethylene glycol such as ethylene glycol di(meth)acrylate, diethylene glycol di(meth)acrylate, triethylene glycol di(meth)acrylate, tetraethylene glycol di(meth)acrylate, or both terminal hydroxide groups of oligomers thereof are esterified with acrylic acid or methacrylic acid; neopentyl glycol di(meth)acrylate, and di(meth)acrylate; α,β-unsaturated acids such as acrylic acid and methacrylic acid; divalent carboxylic acids having unsaturated group such as maleic acid, fumaric acid, itaconic acid, and cinnamic acid and the alkyl esters thereof, styrenic monomers such as styrene, o-methylstyrene, m-methylstyrene, p-methylstyrene, 2,4-dimethylstyrene, 2,5-dimethylstyrene, 3,4-dimethylstyrene, 3,5-dimethylstyrene, p-ethylstyrene, m-ethylstyrene, o-ethylstyrene, p-tert-butylstyrene, and isopropenylbenzene (α-methylstyrene); aromatic vinyl compounds such as 1-vinylnaphthalene, 2-vinylnaphthalene, 1,1-diphenylethylene, isopropenyltoluene, isopropenylethylbenzene, isopropenylpropylbenzene, isopropenylbutylbenzene, isopropenylpentylbenzene, isopropenylhexylbenzene, and isopropenyloctylbenzene; vinyl cyanide compounds such as acrylonitrile and methacrylonitrile; unsaturated carboxylic acid anhydrides such as maleic acid anhydride and itaconic acid anhydride; maleimide and N-substituted maleimides such as N-methyl maleimide, N-ethylmaleimide, N-phenyl maleimide, and N-cyclohexyl maleimide; amides such as acrylamide and methacrylamide; and polyfunctional monomers such as divinylbenzene. These may be used singly or as a combination of two or more of them.

The emulsifier or the dispersant are not particularly restricted to the following, but illustrative examples thereof include anionic surfactant, cationic surfactant, nonionic surfactant, and polymer-based dispersant. The emulsifier or the dispersant is a substance that emulsifies or disperses the monomer into water.

An illustrative example of the anionic surfactant include: aliphatic acid salts such as sodium laurate, potassium myristate, sodium palmitate, potassium oleate, sodium linoleate, sodium rosinate, and potassium rosinate; alkylbenzene sulfonate salts such as sodium dodecylbenzene sulfonate, potassium dodecylbenzene sulfonate, sodium decylbenzene sulfonate, potassium decylbenzene sulfonate, sodium cetylbenzene sulfonate, and potassium cetylbenzene sulfonate; alkyl sulfosuccinate salts such as sodium di(2-ethylhexyl) sulfosuccinate, potassium di(2-ethylhexyl) sulfosuccinate, and sodium dioctyl sulfosuccinate; alkyl sulfate ester salts such as sodium dodecyl sulfate and potassium dodecyl sulfate; polyoxyethylene alkyl ether sulfate ester salts such as sodium polyoxyethylene lauryl ether sulfate and potassium polyoxyethylene lauryl ether sulfate; and phosphate ester salts such as sodium lauryl phosphate, potassium lauryl phosphate, and sodium polyoxyethylene nonylphenyl ether phosphate. Among these anionic surfactants, alkyl sulfate ester salts and phosphate ester salts are preferable.

An illustrative example of the cationic surfactant includes alkyl trimethyl ammonium chloride, dialkyl ammonium chloride, and benzyl ammonium chloride and the like.

An illustrative example of the nonionic surfactant includes polyoxyethylene alkyl ether, polyoxyethylene alkyl phenyl ether, polyethyleneglycol monostearate, sorbitan monostearate, polyoxyethylene alkyl ester, polyoxyethylene sorbitan alkyl ester, polyoxyethylene polyoxypropyleneglycol, and polyethyleneglycol monostearate and the like. Among these nonionic surfactants, polyoxyethylene alkyl ether, polyoxyethylene alkyl phenyl ether, polyoxyethylene polyoxypropyleneglycol, and polyethyleneglycol monostearate are preferable.

An illustrative example of the polymer-based dispersant includes carboxy vinyl polymer, hydroxypropyl cellulose, hydroxypropyl methyl cellulose, hydroxyethyl cellulose, polyvinyl alcohol, polyvinyl pyrrolidone, carboxymethyl cellulose, and carboxyethyl cellulose.

The emulsifiers or dispersants mentioned above may be used singly, or two or more of them may be added to the system, if necessary. A polymerizable emulsifier or dispersant having a polymerizable functional group in the emulsifier or dispersant itself may be used as well.

An illustrative example of the initiator for initiating polymerization of the monomer include: persulfate salts such as potassium persulfate (potassium peroxodisulfate), sodium persulfate, and ammonium persulfate; peroxide-based polymerization initiators such as benzoyl peroxide, lauroyl peroxide, octanoyl peroxide, orthochlorobenzoyl peroxide, methyl ethyl ketone peroxide, diisopropylperoxy dicarbonate, cumene hydroperoxide, and t-butyl hydroperoxide; and azo-based polymerization initiators such as 2,2'-azobisisobutyronitrile and 2,2'-azobis(2,4-dimethylvaleronitrile).

These initiators may be used singly, or a redox type initiator may be used that is formed of an oxidant (for example, ammonium peroxide and potassium peroxide), a reducing agent (for example, sodium sulfite, sodium bisulfite, and sodium thiosulfate), and a transition metal salt (for example iron sulfate).

A polymerization terminator may be used if necessary for the purpose of controlling the reaction. An illustrative example of the polymerization terminator includes hydroxylamine, hydroxylamine sulfate, diethylhydroxyamine, hydroxyamine sulfonic acid and alkali metal salts thereof, sodium dimethyl dithiocarbamate, hydroquinone and the like.

In the present invention, in the case of carrying out the emulsion polymerization, the monomer, water, emulsifier or dispersant, initiator, and other chemical used as necessary (for example, polymerization terminator) may be used in appropriate ratio. The supply speed of the polymerization raw material (flow amount per unit time), the volume of the apparatus (volume of the downstream-side processing space 81), and the polymerization time (retention time of the fluid in the downstream-side processing space 81) are related to each other. Usually, the volume of the apparatus is often fixed once the apparatus is installed. Since the suitable polymerization time is set to an appropriate time depending on the polymerization raw material, generally, the supply speed of the polymerization raw material is appropriately set from the volume of the apparatus and the polymerization time, however, the present invention is not limited to the method like this. Here, the supply speed of the polymerization raw material means the supply speed (flow amount per unit time) of the first fluid and the second fluid into the upstream-side processing space 3. Hereinafter, in the present invention, the supply speed of the raw material in various organic reactions means a supply speed of the first fluid and the second fluid into the upstream-side processing space 3 (flow amount per unit time).

The polymerization temperature is usually from room temperature to about 95° C. and is preferably determined based on the radical generation temperature of the initiator that is used. When the polymerization of the polymer raw material is carried out in the downstream-side processing part, the temperature can be adjusted uniformly in a short time by conducting a heat exchange between the fluid flowing through the downstream-side processing space 81 and a heat medium by means of the installed temperature adjusting mechanism T, thus the fluctuation in the progress of the polymerization reaction can be suppressed, whereby the polymer fine particles having a uniform molecular distribution can be produced.

Reaction Example 2 (Hydrolysis Reaction of Ester)

The ester bond is a basic bond that is often found in plastic materials, fibers, pharmaceutical drugs, and so forth, in the case such as when a polymer is decomposed and is reused and when a protection group of the intermediate is removed in pharmaceutical drugs thereby bonding desired functional group, the ester bond included in the polymer, or the pharmaceutical drug is occasionally decomposed. Hydrolysis reaction is a reaction to separate an ester into an alcohol and a carboxylic acid, and this is one of the basic reaction operations. It is known that the reaction rate is catalytically increased by an acidic substance or a basic substance. The typical hydrolysis is carried out using an ester, water, a catalyst, and a solvent, in homogeneous system or in inhomogeneous system. For example, in the case where the hydrolysis of an ester is carried out by using the apparatus shown in FIG. 12(c), the various compounds used as the hydrolysis raw materials are prepared as the first fluid and the second fluid, and each of fluid is introduced from the first introduction part d1 and the second introduction part d2, a mixing process is carried out as the upstream-side processing, then, in the downstream-side processing part, as the downstream-side processing, the reaction process is performed to the fluid to be processed, whereby a mixed solution of an alcohol and a carboxylic acid is obtained. The mixing and reaction of the first fluid with the second fluid are carried out as the upstream-side processing and the reaction state of the fluid to be processed may be continued in the downstream-side processing.

Examples of the first fluid and the second fluid include a fluid containing at least one ester and a fluid containing at least any one of the acidic substance or the basic substance that can facilitate the hydrolysis of the ester.

An illustrative example of the ester that can be used in this reaction include following esters, though the present invention is not restricted in the following substances in any way. The illustrative examples of esters include: esters of aliphatic alcohols with aliphatic carboxylic acids, such as methyl formate, which is the simplest ester, ethyl formate, propyl formate, isopropyl formate, butyl formate, isobutyl formate, pentyl formate, hexyl formate, heptyl formate, octyl formate, methyl acetate, ethyl acetate, propyl acetate, butyl acetate, pentyl acetate, 3-methylbutyl acetate, hexyl acetate, heptyl acetate, and octyl acetate; esters of phenols or aromatic alcohols with aliphatic carboxylic acids, such as phenyl acetate and benzyl acetate; esters of aliphatic alcohols with aromatic carboxylic acid, such as methyl benzoate and diethyl phthalate; esters of phenols or aromatic alcohols with aromatic carboxylic acids, such as phenyl benzoate and benzyl benzoate; lactones of a chain structure as well as a cyclic structure; and esters of polyhydric alcohols with aliphatic acids, such as triglyceride. This reaction can also be used for deprotection of the compound having a hydroxy group protected by the acyl type protection group such as an acetyl group, a pivaloyl group, and benzoyl group (for example, retinol acetate (acetate ester of vitamin A) and tocopherol acetate (acetate ester of vitamin E)).

An illustrative example of the catalyst that can be used in the hydrolysis includes: in addition to mineral acids such as hydrochloric acid, nitric acid, and sulfuric acid, acidic substances of organic acids such as methane sulfonic acid and benzene sulfonic acid; basic substances including hydroxides of alkali metals such as sodium hydroxide and potassium hydroxide; hydroxides of alkali earth metals such as calcium hydroxide; and hydroxides of quaternary ammonium such as tetramethylammonium hydroxide.

The solvent is not particularly restricted, though hydrophilic solvents such as water and alcohols that can dissolve the reactants and the decomposition substances are preferable.

In the present invention, when the hydrolysis of an ester is carried out, the ester, water, catalyst, solvent, and other chemical used as necessary (for example, emulsifier, hydrolase, and buffer) may be used in appropriate ratio. The supply speed of the hydrolysis raw material (flow amount per unit time), the volume of the apparatus (volume of the downstream-side processing space 81), and the reaction time (retention time of the fluid in the downstream-side processing space 81) are related to each other. Since the suitable reaction time is set depending on the raw material and the catalyst, generally, the supply speed of the hydrolysis raw material is appropriately set from the volume of the apparatus and the reaction time, however, the present invention is not limited to the method like this.

The reaction time of the hydrolysis is usually from the lower limit of several minutes to the upper limit of several hours, preferably in the range of 5 minutes or more to 1 hour or less, and more preferably in the range of 10 minutes or more to 30 minutes or less. The reaction temperature is usually from 0° C. to about 95° C. and is preferably determined based on the strength of the catalyst and reactivity of the ester to be used.

Reaction Example 3 (Esterification Reaction or Amidation Reaction)

This is the reverse reactions of Reaction Example 2 and is frequently used in the syntheses of organic compounds. However, when the water released from the raw material is not appropriately removed upon conducting the esterification reaction or the amidation reaction, the progress of the esterification reaction or the amidation reaction is disturbed by the reverse reactions, thus, a reagent such as a dehydration agent is concurrently used as necessary. Especially when reactivity of the carboxylic acid itself is low, the reactivity can be improved by using the corresponding a carboxylic acid halide such as carboxylic acid chloride and carboxylic acid equivalent body such as carboxylic acid anhydride, it is desirable to use the carboxylic acid anhydride for ease of handling. When the esterification reaction or the amidation reaction is carried out, a compound (reactant) that facilitates the reaction may be used as necessary.

In the case of typical esterification reaction or the amidation reaction, the reaction is carried out by using an alcohol or an amine, a carboxylic acid equivalent body, a substance that facilitates the reaction (reacting agent), and a solvent, in a homogeneous system or in an inhomogeneous system. For example, in the case where the esterification reaction or the amidation reaction is carried out by using the apparatus shown in FIG. 12(C), the various compounds used as the esterification raw materials or the amidation raw materials are prepared as the first fluid and the second fluid, and each of fluid is introduced into the upstream-side processing part from the first introduction part d1 and the second introduction part d2, a mixing process is carried out as the upstream-side processing, then, in the downstream-side processing part, as the downstream-side processing, the reaction process is performed to the fluid to be processed, whereby an intended ester or amide is obtained. The mixing and reaction of the first fluid with the second fluid are carried out as the upstream-side processing and the reaction state of the fluid to be processed may be continued in the downstream-side processing.

Examples of the first fluid and the second fluid include a fluid containing at least one alcohol or an amine and a fluid containing at least any one of a carboxylic acid, a carboxylic acid anhydride, and a carboxylic acid halide.

An illustrative example of the alcohol used in the esterification reaction includes aliphatic alcohols having 1 to 10 carbon atoms (preferably 1 to 5), alicyclic alcohols having 3 to 10 carbon atoms (preferably 3 to 7), and aromatic alcohols having 6 to 30 carbon atoms (preferably 7 to 18). An illustrative example of the aliphatic alcohol having 1 to 10 carbon atoms include: monovalent aliphatic alcohols such as methanol, ethanol, 1-propanol, 2-propanol, 1-butanol, 2-butanol, 2-methylpropanol, 1-pentanol, 3-methyl-1-butanol, 1-hexanol, 1-heptanol, 2-ethyl-1-hexanol, 1-octanol, and 1-decanol; divalent aliphatic alcohols such as ethylene glycol, 1,2-propanediol, 1,3-propanediol, 1,3-butandiol, and 1,4-butanediol; and trivalent aliphatic alcohols such as glycerol. An illustrative example of the alicyclic alcohols having 3 to 10 carbon atoms includes cyclohexylmethyl alcohol, 2-cyclohexylethyl alcohol, glucose, and fructose. An illustrative example of the aromatic alcohols having 6 to 30 carbon atoms includes benzyl alcohol, 2-phenylethyl alcohol, 3-phenylpropyl alcohol, and 3-phenyl-2-propene-1-ol.

An illustrative example of the amine used in the amidation reaction includes: alkylamines such as methylamine, ethylamine, propylamine, isopropylamine, butylamine, isobutylamine, tert-butylamine, pentylamine, isopentylamine, and hexylamine; cyclic amines such as cyclohexylamine, piperidine, and morpholine; various isomers of aminoethanol and aminopropanol; various isomers of aminopropanediol; and bis(hydroxyethyl)amine, tris(hydroxymethyl)aminomethane, (dimethylamino)ethylamine, (dimethylamino)propylamine, (aminomethyl)pyridine, (aminoethyl)pyridine, histamine, and the like.

Illustrative examples of the carboxylic acid anhydride include an aliphatic carboxylic acid anhydride, an alicyclic carboxylic acid anhydride, and an aromatic carboxylic acid anhydride. The aliphatic carboxylic acid anhydride is not particularly restricted so far as it is the carboxylic acid anhydride having a saturated or an unsaturated aliphatic hydrocarbon group, though the illustrative examples thereof include acetic acid anhydride, propanoic acid anhydride (propionic acid anhydride), butanoic acid anhydride, pentanoic acid anhydride, hexanoic acid anhydride, heptanoic acid anhydride, octanoic acid anhydride, nonanoic acid anhydride, decanoic acid anhydride, lauric acid anhydride, myristic acid anhydride, palmitic acid anhydride, stearic acid anhydride, maleic acid anhydride, and succinic acid anhydride. The alicyclic carboxylic acid anhydride is not particularly restricted so far as it is the carboxylic acid anhydride having a saturated or an unsaturated alicyclic hydrocarbon group, though the illustrative examples thereof include cyclohexane dicarboxylic acid anhydride, cyclohexene dicarboxylic acid anhydride, bis(cyclopentane carboxylic acid) anhydride, bis(cyclohexane carboxylic acid) anhydride, bis(adamantane carboxylic acid) anhydride, bis(norbornane carboxylic acid) anhydride, and the like. The aromatic carboxylic acid anhydride is not particularly restricted so far as it is the carboxylic acid anhydride having an aromatic hydrocarbon group, though the illustrative examples thereof include benzoic acid anhydride, phthalic acid anhydride, and derivatives of them.

Illustrative examples of the carboxylic acid halide include an aliphatic carboxylic acid halide, an alicyclic carboxylic acid halide, and an aromatic carboxylic acid halide. Illustrative examples of the halide include a fluoride, a chloride, a bromide, and an iodide. The aliphatic carboxylic acid halide is not particularly restricted so far as it is the carboxylic acid halide having a saturated or an unsaturated aliphatic hydrocarbon group, though the illustrative examples thereof include acetyl fluoride, acetyl chloride, acetyl bromide, acetyl iodide, propionyl fluoride, propionyl chloride, propionyl bromide, propionyl iodide, butyryl fluoride, butyryl chloride, butyryl bromide, butyryl iodide, and the like. The alicyclic carboxylic acid halide is not particularly restricted so far as it is the carboxylic acid halide having a saturated or an unsaturated alicyclic hydrocarbon group, though the illustrative examples thereof include cyclohexane dicarbonyl chloride and cyclohexene dicarbonyl chloride. Further, the aromatic carboxylic acid halide is not particularly restricted so far as it is the carboxylic acid halide having an aromatic hydrocarbon group, though the illustrative examples thereof include benzoyl fluoride, benzoyl chloride, benzoyl bromide, and benzoyl iodide.

The substance (including catalyst and dehydrating agent) that facilitates the esterification reaction or the amidation reaction is preferably used, and the illustrative examples thereof include: inorganic acids such as hydrochloric acid, sulfuric acid, nitric acid, and phosphoric acid; organic carboxylic acids such as acetic acid, propionic acid, phthalic acid, and benzoic acid; organic sulfonic acids such as methyl sulfonic acid, benzene sulfonic acid, p-toluene sulfonic acid, and trifluoromethane sulfonic acid; organic phosphoric acids such as diethyl phosphate and phenyl phosphate; hydroxides of an alkali metal or an alkali earth metal such as sodium hydroxide, potassium hydroxide, and magnesium hydroxide; carbonate salts or hydrogen carbonate salts of an alkali metal or an alkali earth metal such as sodium hydrogen carbonate, potassium carbonate, and calcium hydrogen carbonate; phosphate salts and hydrogen phosphate salts of an alkali metal or an alkali earth metal such as trilithium phosphate, potassium dihydrogen phosphate, sodium pyrophosphate, and calcium metaphosphate; borate salts of an alkali metal or an alkali earth metal such as potassium metaborate, sodium tetraborate, and magnesium orthoborate; carboxylate salts of an alkali metal or an alkali earth metal such as sodium acetate, potassium acetate, sodium benzoate, and magnesium acetate; alkoxide compounds or phenoxide compounds of an alkali metal or an alkali earth metal such as lithium ethoxide, sodium methoxide, potassium methoxide, magnesium methoxide, and sodium phenoxide; oxides of an alkali metal or an alkali earth metal such as calcium oxide; ammonia and ammonium salts such as ammonium hydroxide, tetramethyl ammonium hydroxide, tetraethyl ammonium hydroxide, tetrabutyl ammonium hydroxide, ammonium carbonate, ammonium hydrogen carbonate, tetramethyl ammonium methylcarbonate, tetramethyl ammonium ethylcarbonate, methyl triethyl ammonium methylcarbonate, methyl tri-n-butyl ammonium methylcarbonate, and methyl tri-n-octyl methylcarbonate; phosphonium salts such as tetraphenyl phosphonium hydroxide, tetramethyl phosphonium hydroxide, tetramethyl phosphonium methylcarbonate, methyl tri-n-butyl phosphonium ethylcarbonate, and methyl tri-n-octyl phosphonium methylcarbonate; primary amines such as n-butylamine, benzylamine, aniline, and ethylenediamine; secondary amines such as diethylamine, methylethylamine, pyrrolidine, and N-methyltoluidine; tertiary amines such as triethylamine, tri-n-butylamine, N-methyl-N-ethylaniline, 1,4-diazabicyclo[2,2,2]octane, 1,8-diazabicyclo[5,4,0]-7-undecene; nitrogen-containing aromatic heterocyclic compounds such as pyridine, picoline, quinoline, imidazole, pyrimidine, and N,N-dimethyl-4-aminopyridine; cadmium compounds such as cadmium chloride, cadmium oxide, and cadmium acetate; tin compounds such as tin chloride, tin oxide, tin acetate, tin octanoate, tributyl tin, and acetylacetone tin (IV) chloride; lead compounds such as lead chloride, lead oxide, lead carbonate, and lead tetraacetate; aluminum compounds such as aluminum chloride, aluminum oxide, aluminum acetate, and aluminum alkoxide; zinc based-compounds such as zinc chloride, zinc bromide, zinc iodide, zinc oxide, zinc acetate, zinc trifluoroacetate, zinc stearate, zinc nitrate, zinc carbonate, zinc sulfate, zinc (II) acetylacetonate, zinc (II) trifluoromethanesulfonate, zinc 2-tetrafluoroborate, and tetrazinc oxo[hexa(trifluoroacetate)]; bismuth based-compounds such as bismuth chloride, bismuth oxide, and bismuth acetate; iron based-compounds such as iron chloride, iron oxide, iron acetate, iron (III) acetylacetonate, and iron (II) N,N'-bis(salicylidene)ethylenediamine; cobalt based-compounds such as cobalt chloride, cobalt oxide, cobalt acetate, cobalt stearate, and cobalt (II) acetylacetonate; copper based-compounds such as copper chloride, copper bromide, copper iodide, copper oxide, copper acetate, and copper (II) acetylacetonate; chromium based-compounds such as chromium chloride, chromium oxide, chromium acetate, and chromium (III) acetylacetonate; molybdenum based-compounds such as molybdenum chloride, molybdenum oxide, molybdenum acetate, and molybdenum (VI) acetylacetonate dioxide; manganese based-compounds such as manganese chloride, manganese oxide, manganese acetate, and manganese (II) acetylacetonate; titanium based-compounds such as titanium chloride, titanium oxide, titanium acetate, alkoxy titanium, and titanium (VI) acetylacetonate oxide; zirconium based-compounds such as zirconium chloride, zirconium oxide, zirconium acetate, and zirconium (IV) acetylacetonate; hafnium based-compounds such as hafnium chloride, hafnium oxide, and hafnium (IV) trifluoromethane sulfonate; lanthanum based-compounds such as lanthanum chloride, lanthanum oxide, lanthanum acetate, lanthanum nitrate, lanthanum alkoxide, lanthanum (III) acetylacetonate, and lanthanum (III) trifluoromethane sulfonate; germanium based-compounds such as germanium chloride and germanium oxide; and enzymes such as lipase.

The solvent used is not particularly restricted, though the illustrative examples thereof include: aliphatic or alicyclic hydrocarbons such as n-hexane, n-pentane, and cyclohexane; aromatic hydrocarbons such as benzene and toluene; aliphatic or aromatic halides such as dichloromethane, chloroform, chlorobenzene, and dichlorobenzene; ethers such as tetrahydrofuran, diethyl ether, diphenyl ether, anisole, 1,2-dimethoxyethane, and 1,4-dioxane; sulfoxides such as dimethyl sulfoxide; and sulfolanes such as sulfolane. Amine, which is a substance to facilitate the reaction, may be used as it is as a solvent.

In the present invention, when the esterification reaction or the amidation reaction is carried out, the alcohol or amine as the raw material for the esterification or amination, the carboxylic acid equivalent body, solvents, substance that facilitates the reaction, and other chemical used as necessary (for example, polymerization inhibitor and dehydrating agent) may be used in appropriate ratio. The supply speed of the esterification raw materials or the amidation raw materials (flow amount per unit time), the volume of the apparatus (volume of the downstream-side processing space 81), and the reaction time (retention time of the fluid in the downstream-side processing space 81) are related to each other. Since the suitable reaction time is set depending on the alcohol or the amine, the carboxylic acid equivalent body, and the substance that facilitates the reaction, generally, the supply speed of the esterification raw material or the amidation raw material is appropriately set from the volume of the apparatus and the reaction time, however, the present invention is not limited to the method like this.

The reaction time of the esterification reaction or the amidation reaction is usually from the lower limit of several minutes to the upper limit of several hours, preferably in the range of 5 minutes or more to 1 hour ore less, and more preferably in the range of 10 minutes or more to 30 minutes or less. The reaction temperature is usually from room temperature to about 95° C. and is preferably determined based on the strength of the substance that facilitates the reaction and reactivity of the alcohol or the amine as the raw materials, with the carboxylic acid equivalent body that are used.

Reaction Example 4 (Dehydration Condensation Reaction)

There are several types in the dehydration condensation reaction, and one of the reactions described below is a reaction for obtaining an alkene by performing condensation of an active methylene compound with an aldehyde or with a ketone (also known as Knoevenagel condensation). When the dehydration condensation reaction is carried out, a substance that facilitates the reaction (reacting agent) may be used as necessary. In the case of typical dehydration condensation, the reaction is carried out by using an active methylene compound, an aldehyde or a ketone, a substance that facilitates the reaction (reacting agent), and a solvent, in a homogeneous system or in an inhomogeneous system. For example, in the case where the dehydration condensation reaction is carried out by using the apparatus shown in FIG. 12(C), the various compounds used as the raw materials of the dehydration condensation are prepared as the first fluid and the second fluid, and each of fluids is introduced into the upstream-side processing part from the first introduction part d1 and the second introduction part d2, a mixing process is carried out as the upstream-side processing in the upstream-side part, then, in the downstream-side processing part, the reaction process is performed to the fluid to be processed by heating and stirring process as the downstream-side processing, whereby an intended alkene is obtained. The mixing and reaction of the first fluid with the second fluid are carried out as the upstream-side processing and the reaction state of the fluid to be processed may be continued in the downstream-side processing by heating and stirring process.

Examples of the first fluid and the second fluid include a fluid containing at least one aldehyde or a ketone and the active methylene compound, and a fluid containing the substance facilitating the reaction of the aldehyde with the active methylene compound or the substance facilitating the reaction of the ketone with the active methylene compound.

The aldehydes and ketones used in this reaction are not particularly restricted, but specific examples of the aldehyde include formaldehyde, acetaldehyde, propionaldehyde, butanal, pentanal, hexanal, heptanal, octanal, nonanal, decanal, glyoxal, benzaldehyde, anisaldehyde, salicylaldehyde, 3-methylbutanal, acrolein, cinnamaldehyde, perillaldehyde, vanillin, and the like. Illustrative examples of the ketone include acetone, 2-butanone, 2-pentanone, 3-pentanone, 2-hexanone, 3-hexanone, 4-methyl-2-pentanone, 2-heptanoe, 3-heptanone, 2-octanone, 3-octanone, cyclohexanone, 2-methy cyclopentanone, acetophenone, benzophenone, benzylidene acetone, 3-butene-2-one, and isophorone, and the like.

On the other hand, the active methylene compound is, among organic compounds, a series of the compound group having a methylene group that is interposed between two electron-withdrawing groups, and the illustrative examples of the electron-withdrawing group include a carbonyl group, an ester group, a cyano group, a nitro group, a sulfonyl group, a sulfinyl group, a phosphono group, and the like. The active methylene compound used in this reaction is not particularly restricted, though the specific examples thereof include: malonic acid diesters such as dimethyl malonate and diethyl malonate; acetoacetate esters such as ethyl acetoacetate and propyl acetoacetate; malononitrile, acetylacetone, Meldrum's acid, and malonic acid.

As the substance facilitating the reaction, acidic substances such as acetic and propionic acid, basic substances such as pyridine, piperidine, and imidazole, as well as a mixture of them may be used.

The solvent used is not particularly restricted, though the illustrative examples thereof include: alcohols such as methanol, ethanol, propanol, and butanol; aliphatic or alicyclic hydrocarbons such as n-hexane, n-pentane, and cyclohexane; aromatic hydrocarbons such as benzene and toluene; aliphatic or aromatic halides such as chloroform, chlorobenzene, and dichlorobenzene; ethers such as tetrahydrofuran, diethyl ether, diphenyl ether, anisole, 1,2-dimethoxyethane, and 1,4-dioxane; sulfoxides such as dimethyl sulfoxide; and sulfolanes such as sulfolane, and the like.

In the present invention, when the dehydration condensation reaction is carried out, the active methylene compound and the aldehydes or the ketones as the raw material, solvent, substance that facilitates the reaction, and other chemical used as necessary (for example, ammonium acetate) may be used in appropriate ratio. The supply speed of the raw materials (flow amount per unit time), the volume of the apparatus (volume of the downstream-side processing space 81), and the reaction time (retention time of the fluid in the downstream-side processing space 81) are related to each other. Since the suitable reaction time is set depending on the combination of the active methylene compound, the aldehydes or the ketones, and the substance facilitating the reaction, generally, the suppl speed of the raw material is appropriately set from the volume of the apparatus and the reaction time, however, the present invention is not limited to the method like this.

The reaction time of the dehydration condensation reaction is usually from the lower limit of several minutes to the upper limit of several hours, preferably in the range of 5 minutes or more to 1 hour or less, and more preferably in the range of 10 or more to 30 minutes or less. The reaction temperature is usually from room temperature to about 95° C. and is preferably determined based on the strength of the substance facilitating the reaction and reactivity of the active methylene compound as the raw material, with the aldehydes or the ketones.

Reaction Example 5 (Acetalization)

Acetalization reaction is a reaction to obtain an acetal by carrying out condensation of an aldehyde or a ketone with an alcohol in the presence of an acid catalyst, or the reaction to obtain an acetal by carrying out condensation of a vinyl ether with an alcohol, and this reaction is used in synthetic intermediate for a resin and an adhesive. Here, when carrying out the reaction, a substance facilitating the reaction (reacting agent) may be used as necessary. In the case of typical acetalization reaction, the reaction is carried out by using an alcohol, and aldehyde or a ketone or a vinyl ether, an acid catalyst, a substance that facilitates the reaction (reacting agent), and a solvent, in a homogeneous system or in an inhomogeneous system. For example, in the case where the acetalization reaction is carried out by using the apparatus shown in FIG. 12(C), the various compounds used as the raw materials of the acetalization are prepared as the first fluid and the second fluid, and each of fluids is introduced from the first introduction part d1 and the second introduction part d2, and in the upstream-side processing part, a mixing process is carried out as the upstream-side processing, then, in the downstream-side processing part, the reaction process is performed to the fluid to be processed by heating and stirring process as the downstream-side processing, whereby an intended acetal is obtained. The mixing and reaction of the first fluid with the second fluid are carried out as the upstream-side processing and the reaction state of the fluid to be processed may be continued in the downstream-side processing by heating and stirring process.

Examples of the first fluid and the second fluid include a fluid containing at least one aldehyde or a ketone and the alcohols and a fluid containing a proton acid catalyst facilitating the reaction of the aldehyde with the alcohols or the reaction of the ketone with the alcohols.

The aldehydes and ketones used in this reaction are not particularly restricted, though specific examples of the aldehyde include formaldehyde, acetaldehyde, propionaldehyde, butanal, pentanal, hexanal, heptanal, octanal, nonanal, decanal, glyoxal, benzaldehyde, anisaldehyde, salicylaldehyde, 3-methylbutanal, acrolein, cinnamaldehyde, perillaldehyde, vanillin, and the like, and the illustrative examples of the ketone include acetone, 2-butanone, 2-pentanone, 3-pentanone, 2-hexanone, 3-hexanone, 4-methyl-2-pentanone, 2-heptanone, 3-heptanone, 2-octanone, 3-octanone, cyclohexanone, 2-methy cyclopentanone, acetophenone, benzophenone, benzylidene acetone, 3-butene-2-one, isophorone, and the like.

As for the alcohol used in the acetalization reaction, the illustrative examples thereof include aliphatic alcohols having 1 to 10 carbon atoms (preferably 1 to 5). Illustrative examples of the aliphatic alcohols having 1 to 10 carbon atoms include: monovalent aliphatic alcohols such as methanol, ethanol, 1-propanol, 2-propanol, 1-butanol, 2-butanol, 2-methylpropanol, 1-pentanol, 1-hexanol, 1-heptanol, 2-ethyl-1-hexanol, 1-octanol, and 1-decanol; and divalent aliphatic alcohols such as ethylene glycol, 1,2-propanediol, 1,3-propanediol, and 1,3-butandiol.

One example of the vinyl ether used in the acetalization reaction is 3,4-dihydro-2H-pyran, from which tetrahydropyranyl ether can be obtained as the product.

The illustrative examples of the acid (proton acid catalyst) as the catalyst used in the acetalization reaction of the present invention include any acids such as sulfuric acid, hydrochloric acid, phosphoric acid, and hydrobromic acid, which usually can be used for the acetalization reaction.

The solvent used is not particularly restricted, though the illustrative examples thereof include: aliphatic or alicyclic hydrocarbons such as n-hexane, n-pentane, and cyclohexane; aromatic hydrocarbons such as benzene and toluene; aliphatic or aromatic halides such as chloroform, chlorobenzene, and dichlorobenzene; ethers such as tetrahydrofuran, diethyl ether, diphenyl ether, anisole, 1,2-dimethoxyethane, and 1,4-dioxane; sulfoxides such as dimethyl sulfoxide; sulfolanes such as sulfolane, and the like. The raw material alcohol may be used as it is as a solvent.

In the present invention, when the acetalization reaction is carried out, the aldehydes, and the ketones or the vinyl ether as the raw materials, alcohol, catalyst, solvent, and other chemical used as necessary (for example, dimehoxypropane) may be used in appropriate ratio. The supply speed of the acetalization raw materials (flow amount per unit time), the volume of the apparatus (volume of the downstream-side processing space 81), and the reaction time (retention time of the fluid in the downstream-side processing space 81) are related to each other. Since the suitable reaction time is set depending on the combination of the aldehydes, the ketones or the vinyl ether, the alcohol, and the catalyst, generally, the suppl speed of the raw material is appropriately set from the volume of the apparatus and the reaction time, however, the present invention is not limited to the method like this.

The reaction time of the acetalization reaction is usually from the lower limit of several minutes to the upper limit of several hours, preferably in the range of 5 minutes or more to 1 hour or less, and more preferably in the range of 10 or more to 30 minutes or less. The reaction temperature is usually from room temperature to about 95° C. and is preferably determined based on the strength of the acid catalyst to be used, and reactivity of the aldehydes, the ketones or the vinyl ether with the alcohol.

EXAMPLES

Hereinafter, the present invention will be explained in more detail with referring to Examples, though the present invention is not limited by these examples. Further, the order of introducing of "the first fluid, the first introduction part d1" and "the second fluid, the second introduction part d2" is not limited, and it does not matter the first fluid and the second fluid are exchanged their orders.

Apparatus Used in the Present Invention

The fluid processing apparatus F shown in FIG. 12(C) was used. Raw material solutions were prepared in advance, and the raw material solutions were introduced into the upstream-side processing space 3 through the first introduction part d1 and the second introduction part d2, respectively, from the containers which store the raw material solutions (not shown) by using the liquid supply pumps P1 and P2 thereby carrying out the organic reaction. For comparison, as the conventional type of apparatus not having the downstream-side processing part, a forced thin film type reactor (ULREA SS-11-75; manufactured by M Technique Co., Ltd.), which is the same apparatus shown in FIG. 1(A) of Japanese Patent Laid-Open Publication No. 2010-189661 filed by the applicant of the present application, was used, similarly the raw material solutions were introduced into between the processing surfaces 1 and 2 by using the liquid supply pumps P1 and P2, and the organic reaction was carried out. The fluid processing apparatus F used for carrying out the method for producing an organic compound according to the present invention is different from the apparatus disclosed in Japanese Patent Laid-Open Publication No. 2010-189661 in the point that the downstream-side processing space 81 is arranged in the fluid processing apparatus F to carry out the downstream-side processing.

Molecular Weight and Molecular Weight Distribution Analysis

The number-average molecular weight (Mn), weight-average molecular weight (Mw), and molecular weight distribution Mw/Mn of the dispersion solution of the polymer fine particles obtained by emulsion polymerization were evaluated by gel permeation chromatography.

Specifically, with respect to Example 1 and Comparative Examples 1 and 2, the dispersion solution of the polymer fine particles obtained after the completion of the polymerization reaction was divided into a certain amount. The divided dispersion solution of the polymer fine particles was performed centrifugal separation by using the centrifuge separator (high-speed cooling centrifuge model 7000, manufactured by Kubota Corp.) with a centrifugal force of 8000 G for 10 minutes, then, the solid content thus obtained was washed twice with pure water to remove the initiator and so forth. The solid content after washing was dried under reduced pressure to obtain dried powder of the polymer fine particles. The dried powder of the polymer fine particles was dissolved in tetrahydrofuran (manufactured by Kanto Chemical Co., Ltd.) at the concentration of 0.3% by mass to obtain a measurement sample for the gel permeation chromatography. As the analysis instrument, two filling columns for organic solvent-based SEC (GPC) (KF-807L, column size: 8.0 mmΦ×300 mm, manufactured by Showa Denko K. K.) were connected in series to the gel permeation chromatography (Prominence; manufactured by Shimadzu Corp.), and the differential refractive index detector (RID-10A, manufactured by Shimadzu Corp.) was used as a detector. Tetrahydrofuran was used as the eluting solution, and the measurement was carried out at the column temperature of 40° C. and the flow rate of 1.0 mL/min. From the measurement result, the number-average molecular weight (Mn), the weight-average molecular weight (Mw), and the molecular weight distribution Mw/Mn were obtained by using the analysis software LC solution GPC Analysis (manufactured by Shimadzu Corp.).

Particle Size Distribution

In Example 1 and Comparative Examples 1-1 and 1-2, the particle size distribution of the dispersion solution of the polymer fine particles obtained after the completion of the polymerization reaction was measured by laser diffraction/scattering-type particle diameter distribution measurement instrument (MT-3300; manufactured by Microtrac BELL Corp.).

Reaction Rate

The reaction rates in Example 2 to Example 12 and Comparative Example 2 to Comparative Example 12 were evaluated by gas chromatography. The reaction rate refers to the ratio of the reaction product that is charged into the reaction and is reacted to the product. As analysis instrument, GC column (DB-WAXetr, length of 30 m, inner diameter of 0.250 mm, film thickness of 0.25 μm; manufactured by Agilent J&W Inc.) was connected to gas chromatography analysis instrument (Agilent 7890 GC system; manufactured by Agilent Technologies Inc.) and was used.

The organic compounds to be the raw material or the product were measured in advance with gas chromatograph analysis, and the retention time at which the raw material or the product appeared was measured on the obtained chromatograph. On the chromatograph of the obtained solution after the completion of the reaction, the peak areas of these products and the raw materials are substituted into the following formula (4), the progress of the reaction was evaluated as the reaction rate of the raw material to the product.

Reaction rate (%)=peak area corresponding to product/(peak area corresponding to the product+ peak area corresponding to raw material)   Formula (4)

The fluid from the outflow part 68 (Examples 2 to 12) and the fluid from between the processing surfaces 1 and 2 (Comparative Examples 2 to 12) were both collected for 1 minute, unless otherwise specifically described in Examples and Comparative Examples.

Example 1: Emulsion Polymerization of Methyl Methacrylate 2000 parts by weight of sodium dodecylsulfate (manufactured by Kanto Chemical Co., Ltd.), 81 parts by weight of potassium peroxodisulfate (potassium persulfate; manufactured by Kanto Chemical Co., Ltd.), and 74 parts by weight of sodium thiosulfate pentahydrate (manufactured by Tokyo Chemical Industry Co., Ltd.) were added to 97845 parts by weight of ion-exchanged water, respectively, and they were stirred with stirrer having stirring blades (Clear-Mix; manufactured by M Technique Co. Ltd.) at the rotation number of 8000 rpm for 10 minutes, and then solution 1 was prepared. The solution 1 just before the use was depressurized to −0.1 MPaG or less to remove bubbles. The solution 1 was introduced from the first introduction part d1 of the fluid processing apparatus F shown in FIG. 12(*c*) and methyl methacrylate (containing 0.005% of hydroquinone stabilizer; manufactured by Wako Pure Chemical Industries, Ltd.) was introduced from the second introduction part d2 of the same apparatus shown in FIG. 12(*c*) into the fluid processing apparatus F, respectively, by using the liquid supply pumps P1 and P2, emulsion polymerization was carried out while circulating hot water at 80° C. through the temperature adjusting jacket installed as the temperature adjusting mechanism T. The liquid feeding speeds (supply speeds) of the solution 1 and methyl methacrylate were set at 14.0/6.0 (each unit of mL/min) so that the ratio of liquid feeding speed became 7:3. The temperatures at which the raw material solutions (solution 1 and methyl methacrylate) were introduced into the introduction parts d1 and d2 of the apparatus were set at 20° C. (hereinafter, these temperatures refer to supply temperatures of the raw material solutions into the introduction parts d1 and d2). The rotation number of the first processing member 10 was set at 3000 rpm. The retention time of the fluid in the downstream-side processing space 81 was 10 minutes. The temperature of the dispersion solution of polymethyl methacrylate fine particles, which is outflow solution when flowing out from the outflow part 68 that is the outlet of the fluid processing apparatus F, was 71° C. The outflow solution was collected for 3 minutes. From the results of the gel permeation chromatography of the outflow solution, the weight-average molecular weight of the polymethyl methacrylate obtained in Example 1 was 6.78×10$^6$, number-average molecular weight thereof was 5.74×10$^5$, and molecular weight distribution Mw/Mn thereof was 11.8. From the result of the particle size distribution measurement, the most frequent value of the diameter of the polymethyl methacrylate fine particles obtained in Example 1 was 0.110 μm.

Comparative Example 1-1: Emulsion Polymerization of Methyl Methacrylate in Beaker 140 mL of the solution 1 was stirred in a 300-mL beaker on a hot stirrer at rotation number of 600 rpm until it reached to 70° C., after that, 60 mL of methyl methacrylate used in Example 1 which was preheated to about 70° C. was added to the solution 1 and was continuously stirred for 15 minutes at the rotation number of 600 rpm. From the result of the gel permeation chromatography, the weight-average molecular weight of the polymethyl methacrylate obtained in Comparative Example 1 was 5.41×10$^6$, the number-average molecular weight was 4.45×10$^4$, and the molecular weight distribution Mw/Mn was 121.3. From the result of the particle size distribution measurement, the most frequent value of the diameter of the polymethyl methacrylate fine particles obtained in Comparative Example 1-1 was 104.8 μm.

Comparative Example 1-2: Emulsion Polymerization of Methyl Methacrylate Using Conventional Apparatus without Downstream-Side Processing Part Emulsion Polymerization was carried out by using the forced thin film type reactor (ULREA SS-11-75; manufactured by M Technique Co., Ltd.), which is the same apparatus shown in FIG. 1(A) of Japanese Patent Laid-Open Publication No. 2010-189661 filed by the applicant of the present application. The solution 1 used in the Example 1 was introduced from the first introduction part d1 and the methyl methacrylate used in Example 1 was introduced from the second introduction part d2, respectively into the fluid processing apparatus, and the rotation number of the first processing member 10 was set at 3000 rpm same as Example 1. The liquid feeding speeds (supplying speeds) of the solution 1 and methyl methacrylate, as well as the supply temperatures of the solution 1 and methyl methacrylate into the introduction parts d1 and d2 were the same as those of Example 1. The outflow solution flew out from between the processing surfaces 1 and 2 was collected in a beaker, 60 mL of the outflow solution collected in the beaker was heated to 70° C. while stirring at the rotation number of 600 rpm. After the temperature of the outflow solution reached 70° C., the fluid was kept at 70° C. for 10 minutes, which is the same as the retention time of the fluid in the downstream-side processing space 81 in Example 1, and then the polymerization reaction was allowed to proceed. When the temperature of the outflow solution reached 70° C., and after a while bubbles were generated, and the temperature increased due to the heat of reaction. The same analyses as Example 1 were carried out on the obtained dispersion solution of the polymethyl methacrylate fine particles. From the result of the gel permeation chromatography, the weight-average molecular weight of the polymethyl methacrylate obtained in Comparative Example 2 was 7.06×10$^6$, the number-average molecular weight was 4.08×10$^5$, and the molecular weight distribution Mw/Mn was 17.3. From the result of the particle size distribution measurement, the most frequent value of the diameter of the polymethyl methacrylate fine particles obtained in Comparative Example 1-2 was 0.120 μm.

Example 2: Hydrolysis of Butyl Acetate 4 parts by weight of butyl acetate (the structural formula (1); manufactured by Kanto Chemical Co., Ltd.) as ester, which was a reactive substrate was added to 396 parts by weight of methanol (manufactured by Godo Co., Ltd.), they were stirred by ClearMix (manufactured by M. Technique Co., Ltd.) at the rotation number of 5000 rpm for 10 minutes to obtain a solution 2. On the other hand, 40 parts by weight of sodium hydroxide (manufactured by Kanto Chemical Co., Ltd.), which was a hydrolysis catalyst, was dissolved into 160 parts by weight of pure water to obtain a solution 3. Then, the hydrolysis reaction of the ester was carried out by using the fluid processing apparatus F shown in FIG. 12(C).

The chemical reaction thereof can be expressed by the reaction formula described below.

[Chem. 1]

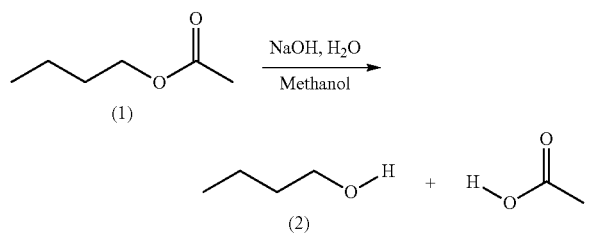

Hereinafter, the substances expressed by chemical formulae or abbreviations described in the reaction formulae are as follows: $H_2O$ for water; MeOH for methanol, NaOH for sodium hydroxide, $CH_2Cl_2$ for dichloromethane, TEA for triethylamine, DMAP for N,N-dimethyl-4-aminopyridine, and THF for tetrahydrofuran.

The substrate solution (solution 2) was introduced into the fluid processing apparatus F from the first processing part d1 of the fluid processing apparatus F by using the liquid feeding pump P1 at the supply speed of 10 mL/min, and the alkaline solution (solution 3) was introduced into the fluid processing apparatus F from the second introduction part d2 of the apparatus by using the liquid feeding pump P2 at the supply speed of 1 mL/min, thereby carrying out the hydrolysis reaction of the ester with setting the rotation number of the first processing member 10 at 500 rpm. Supply temperatures of the raw material solutions (substrate solution (solution 2)) and the alkaline solution (solution 3) to the introduction parts d1 and d2 were set at 20° C. The retention time of the fluid in the downstream-side processing space 81 was 20 minutes. The outflow solution flew out from the outflow part 68 neutralized the outflow solution by adding 5 times the molar amount of ammonium chloride (manufactured by Kanto Chemical Co., Ltd.) respect to sodium hydroxide, which is the hydrolysis catalyst, into recovery container, and then, the outflow solution was recovered with terminating the hydrolysis reaction.

On the obtained chromatogram, a peak of butyl acetate (structural formula (1)) was confirmed at the retention time of about 9.2 minutes and a peak of n-butanol (structural formula (2)) was confirmed at the retention time of 11 minutes. Example 2 showed a high reaction rate of 99%.

Comparative Example 2: Hydrolysis of Butyl Acetate by Using Conventional Apparatus without Downstream-Side Processing Part With use of the raw material solutions (solution 2 and solution 3) as those used in Example 2, the hydrolysis reaction of the ester was carried out under the same supply method (the introduction parts d1 and d2 to supply the solution 2 and the solution 3 into the fluid processing apparatus, the supply speeds thereof, and the supply temperatures of the solution 2 and the solution 3 to the introduction parts d1 and d2) and the operation condition (rotation number of the first processing member 10) as in Example 2 by using ULREA SS-11-75 (manufactured by M Techniques Co., Ltd.) as the conventional apparatus not having the downstream-side processing part. The recovery container having 5 times the molar amount of ammonium chloride (manufactured by Kanto Chemical Co., Ltd.) respect to sodium hydroxide, which is the hydrolysis catalyst, was prepared, and the outflow solution flew out from between the processing surfaces 1 and 2 was recovered into the recovery container, whereby the outflow solution was neutralized with terminating the hydrolysis reaction.

With the same analysis as Example 2, the reaction rate of Comparative Example 2 was 11%.

Example 3: Hydrolysis of n-Propyl Acetate

The same operation as Example 2 was repeated except that in place of butyl acetate, n-propyl acetate (structural formula (3); manufactured by Kanto Chemical Co., Ltd.) was used as the reaction substrate. The chemical reaction thereof can be expressed by the reaction formula described below.

[Chem. 2]

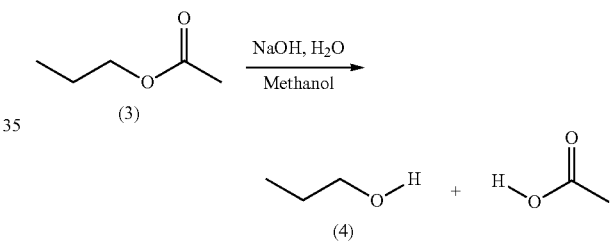

On the obtained chromatogram, a peak of n-propyl acetate (structural formula (3)) was confirmed at the retention time of about 7.1 minutes and a peak of n-propanol (structural formula (4)) was confirmed at the retention time of 8.7 minutes. Example 3 showed a high reaction rate of 99%.

Comparative Example 3: Hydrolysis of n-Propyl Acetate by Using Conventional Apparatus without Downstream-Side Processing Part The same operation as Comparative Example 2 was repeated except that in place of butyl acetate, n-propyl acetate (structural formula (3); manufactured by Kanto Chemical Co., Ltd.) was used as the reaction substrate.

With the same analysis as Example 3, the reaction rate of Comparative Example 3 was 14%.

Example 4: Hydrolysis of 3-Methylbutyl Acetate

The same operation as Example 2 was repeated except that in place of butyl acetate, 3-methylbutyl acetate (structural formula (5); manufactured by Kanto Chemical Co., Ltd.) was used as the reaction substrate. The chemical reaction thereof can be expressed by the reaction formula described below.

[Chem. 3]

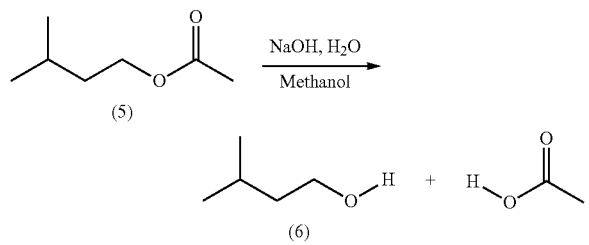

On the obtained chromatogram, a peak of 3-methylbutyl acetate (structural formula (5)) was confirmed at the retention time of about 10.3 minutes and a peak of 3-methyl-1-butanol (structural formula (6)) was confirmed at the retention time of 12.3 minutes. Example 4 showed a high reaction rate of 99%.

Comparative Example 4: Hydrolysis of 3-Methylbutyl Acetate by Using Conventional Apparatus without Downstream-Side Processing Part The same operation as Comparative Example 2 was repeated except that in place of butyl acetate, 3-methylbutyl acetate (structural formula (5); manufactured by Kanto Chemical Co., Ltd.) was used as the reaction substrate.

With the same analysis as Example 4, the reaction rate of Comparative Example 4 was 17%.

Example 5: Esterification Reaction of Acetic Anhydride with n-Butanol

The alcohol solution (solution 4) was prepared by mixing 15 parts by weight of n-butanol (structural formula (2); manufactured by Wako Pure Chemical Industries, Ltd.) with 985 parts by weight of dichloromethane (manufactured by Kanto Chemical Co., Ltd.). The solution 5 was prepared by dissolving 240 parts by weight of acetic anhydride (structural formula (7); manufactured by Sigma Aldrich Corp.), 240 parts by weight of triethylamine (manufactured by Kanto Chemical Co., Ltd.), and 3 parts by weight of N,N-dimethyl-4-aminopyridine (Tokyo Chemical Industry Co., Ltd.) in 9517 parts by weight of dichloromethane. These raw material solutions (solution 4 and solution 5) were subjected to the esterification reaction at supply speed of 5 mL/min using the fluid processing apparatus F shown in FIG. 12(C) with setting the rotation number of the first processing member at 500 rpm.

[Chem. 4]

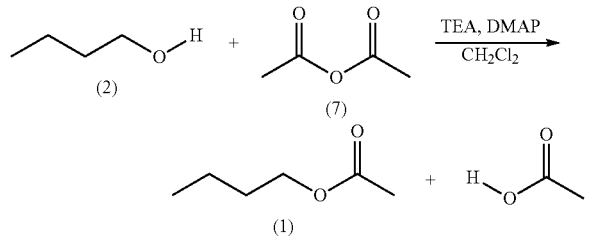

The alcohol solution (solution 4) was introduced into the fluid processing apparatus F from the first introduction part d1 of the fluid processing apparatus F by using the liquid feeding pump P1, and the solution 5 was introduced into the fluid processing apparatus F from the second introduction part d2 of the apparatus by using the liquid feeding pump P2 thereby carrying out the esterification reaction. The retention time of the fluid in the downstream-side processing space 81 was 20 minutes. The hot water heated to 40° C. was circulated through the temperature adjusting jacket provided as the temperature adjusting mechanism T so that the temperature of the outflow solution flew out from the outflow part 68 was to be at 30° C. or higher. The outflow solution flew out from the outflow part 68 was treated with ammonium chloride having a substance amount 10 times respect to the alcohol (n-butanol in Example 5) that was introduced into the fluid processing apparatus F to terminate the reaction.

Quantification of the raw material alcohol (n-butanol, the structural formula (2)) and the product ester (butyl acetate, the structural formula (1)) was performed the gas chromatography analysis in the same manner as in Examples and Comparative Example 2 to 4, and the reaction rate was calculated from each of the ratio of the peak areas thereof. From the peak ratio of the gas chromatogram after the reaction, the reaction rate in Example 5 was 89%.

Comparative Example 5: Esterification Reaction of Acetic Anhydride with n-Butanol by Using Conventional Apparatus without Downstream-Side Processing Part With use of the raw material solutions (alcohol solution (solution 4) and solution 5) as those used in Example 5, the esterification reaction was carried out under the same supply method (the introduction parts d1 and d2 to supply the solution 2 and the solution 3 into the fluid processing apparatus, the supply speeds thereof) and the operation condition (rotation number of the first processing member 10) as in Example 5 by using ULREA SS-11-75 (manufactured by M Techniques Co., Ltd.) as the conventional apparatus not having the downstream-side processing part.

The outflow solution flew out from between the processing surfaces 1 and 2 was treated with ammonium chloride having a substance amount 10 times respect to the alcohol (n-butanol in Comparative Example 6) that was introduced into the fluid processing apparatus F to terminate the reaction.

Quantitative analysis of the solution after the reaction was performed in the same manner as Example 5. The reaction rate of the Comparative Example 5 was 45%.

Example 6: Esterification Reaction of Acetic Anhydride with n-Propanol

The same operation as Example 5 was repeated except that in place of n-butanol, 12 parts by weight of n-propanol (structural formula (4); manufactured by Kanto Chemical Co., Ltd.) was used as the alcohol. The chemical reaction thereof can be expressed by the reaction formula described below.

[Chem. 5]

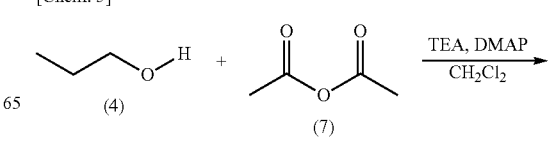

-continued

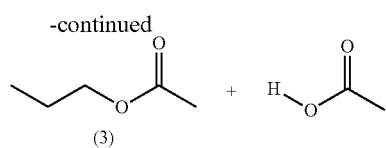

(3)

From the peak ratio of the gas chromatogram after the reaction, the reaction rate in Example 6 was 94%.

Comparative Example 6: Esterification Reaction of Acetic Anhydride with n-Propanol by Using Conventional Apparatus without Downstream-Side Processing Part The same operation as Comparative Example 5 was repeated except that in place of n-butanol, 12 parts by weight of n-propanol (structural formula (4); manufactured by Kanto Chemical Co., Ltd.) was used as the alcohol.

Quantitative analysis of the solution after the reaction was performed in the same manner as Example 6. The reaction rate of the Comparative Example 6 was about 43%.

Example 7: Esterification Reaction of Acetic Anhydride with 3-Methyl-1-butanol The same operation as Example 5 was repeated except that in place of n-butanol, 17 parts by weight of 3-methyl-1-butanol (structural formula (6); manufactured by Kanto Chemical Co., Ltd.) was used as the alcohol. The chemical reaction thereof can be expressed by the reaction formula described below.

[Chem. 6]

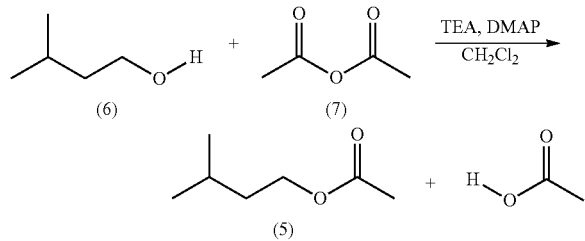

From the peak ratio on the gas chromatogram after the reaction, the reaction rate in Example 7 was 94%.

Comparative Example 7: Esterification Reaction of Acetic Anhydride with 3-Methyl-1-Butanol by Using Conventional Apparatus without Downstream-Side Processing Part The same operation as Comparative Example 5 was repeated except that in place of n-butanol, 17 parts by weight of 3-methyl-1-butanol (structural formula (6); manufactured by Kanto Chemical Co., Ltd.) was used as the alcohol.

Quantitative analysis of the solution after the reaction was performed in the same manner as Example 7. The reaction rate of the Comparative Example 7 was 46%.

Example 8: Dehydration Condensation Reaction of Benzaldehyde with Dimethyl Malonate 106 parts by weight of benzaldehyde (structural formula (8); first grade; manufactured by Kanto Chemical Co., Ltd.) and 134 parts by weight of dimethyl malonate (structural formula (9); special grade; manufactured by Kanto Chemical Co., Ltd.) were added to 1760 parts by weight of methanol (manufactured by Godo Co., Ltd.), they were stirred with ClearMix (manufactured by M. Technique Co., Ltd.) at the rotation number of 5000 rpm for 10 minutes, benzaldehyde and dimethyl malonate were dissolved into methanol to obtain a solution 6. On the other hand, 180 parts by weight of acetic acid (manufactured by Kanto Chemical Co., Ltd.) and 255 parts by weight of piperidine (Wako Pure Chemical Industries, Ltd.) were added to 1065 parts by weight of methanol, and they were stirred with ClearMix (manufactured by M. Technique Co., Ltd.) at the rotation number of 5000 rpm for 10 minutes, the obtained acetic acid and the piperidine were dissolved into methanol to obtain a solution 7. with the liquid feeding pumps P1 and P2, the solution 6 at the supply speed of 5.0 mL/min and the solution 7 at the supply speed of 1.0 mL/min were subjected to the dehydration condensation reaction with setting the rotation number of the first processing member 10 at 500 rpm in the fluid processing apparatus F shown in FIG. 12(C). The chemical reaction thereof can be expressed by the reaction formula described below.

[Chem. 7]

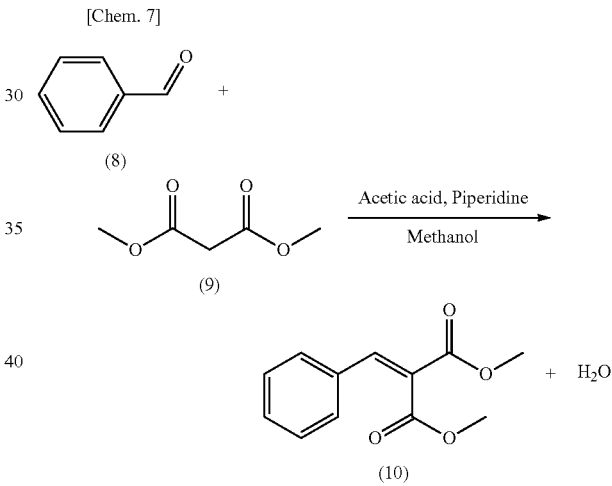

The solution 6 was introduced into the fluid processing apparatus F from the first introduction part d1 of the fluid processing apparatus F by using the liquid feeding pump P1, and the solution 7 was introduced into the fluid processing apparatus F from the second introduction part d2 of the apparatus by using the liquid feeding pump P2 thereby carrying out the dehydration condensation reaction. The hot water heated to 59° C. was circulated through the temperature adjusting jacket provided as the temperature adjusting mechanism T so that the temperature of the outflow solution flew out from the outflow part 68 was to be at 51° C. or higher. At the supply speeds of the solution 6 and the solution 7 as described above, the retention time in the downstream-side processing space 81 was 22 minutes. The outflow solution was collected for 1 minute. The outflow solution collected for 1 minute was immediately taken into the container for GC measurement, and the quantitative analysis thereof was carried out by a gas chromatography measurement instrument. From the ratio of the peak of the raw material appeared at the retention time of 10.4 minutes and the peak of the product (structural formula (10))

appeared at the retention time of 20.9 minutes in the gas chromatogram, the reaction rate was 91%.

Comparative Example 8: Dehydration Condensation Reaction of Benzaldehyde with Dimethyl Malonate by Using Conventional Apparatus without Downstream-Side Processing Part The same raw material solutions as Example 8 (solution 6 and solution 7) were introduced into ULREA SS-11-75 (manufactured by M Techniques Co., Ltd.), which is the conventional apparatus not having the downstream-side processing part, whereby the dehydration condensation reaction was carried out. The supply method of the solutions 6 and 7 into the fluid processing apparatus (the introduction parts d1 and d2 to supply the solution 6 and the solution 7 into the fluid processing apparatus and the supply speeds thereof) and the operation condition of the fluid processing apparatus (rotation number of the first processing member 10) were the same as those in Example 8. The outflow solution flew out from between the processing surfaces 1 and 2 was collected for 1 minute, and the quantitative analysis thereof was carried out by a gas chromatography measurement instrument. With the same analysis as Example 8, the reaction rate of Comparative Example 8 was 22%.

Example 9: Dehydration Condensation Reaction of Benzaldehyde with Acetylacetone 106 parts by weight of benzaldehyde (structural formula (8); manufactured by Kanto Chemical Co., Ltd.) and 106 parts by weight of acetylacetone (structural formula (11); manufactured by Kanto Chemical Co., Ltd.) were added to 1788 parts by weight of methanol (manufactured by Godo Co., Ltd.), they were stirred with ClearMix (manufactured by M. Technique Co., Ltd.) at the rotation number of 5000 rpm for 10 minutes, the obtained benzaldehyde and acetylacetone were dissolved into methanol to obtain a solution 8. With the liquid feeding pumps P1 and P2, the solution 8 at the supply speed of 5.0 mL/min and the solution 7 at the supply speed of 1.0 mL/min were subjected to the dehydration condensation reaction with setting the rotation number of the first processing member 10 at 500 rpm in the fluid processing apparatus F shown in FIG. 12(C). The chemical reaction thereof can be expressed by the reaction formula described below.

[Chem. 8]

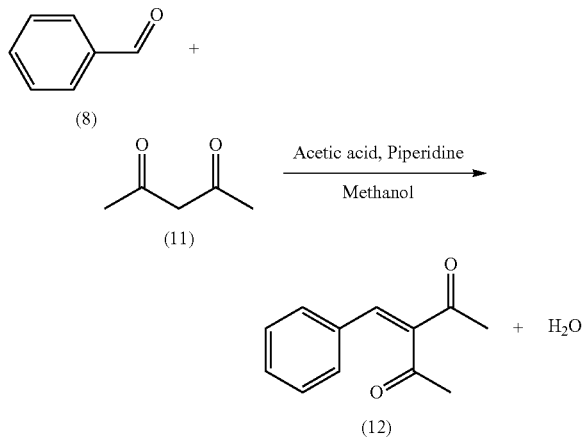

The solution 8 was introduced into the fluid processing apparatus F from the first introduction part d1 of the fluid processing apparatus F by using the liquid feeding pump P1, and the solution 7 used in Example 8 was introduced into the fluid processing apparatus F from the second introduction part d2 of the apparatus by using the liquid feeding pump P2 thereby carrying out the dehydration condensation reaction. The retention time of the fluid in the downstream-side processing space 81 was 40 minutes. The hot water heated to 59° C. was circulated through the temperature adjusting jacket provided as the temperature adjusting mechanism T so that the temperature of the outflow solution flew out from the outflow part 68 was to be at 51° C. or higher. Similarly to Example 8, the outflow solution was collected for 1 minute. The outflow solution collected for 1 minute was immediately taken into the container for GC measurement, and the quantitative analysis thereof was carried out by a gas chromatography measurement instrument. From the ratio of the peak of the raw material appeared at the retention time of 10.5 minutes and the peak of the product (structural formula (12)) appeared at the retention time of 19.7 minutes in the gas chromatogram, the reaction rate in Example 9 was 78%.

Comparative Example 9: Dehydration Condensation Reaction of Benzaldehyde with Acetylacetone by Using Conventional Apparatus without Downstream-Side Processing Part The same raw material solutions as Example 9 (solution 8 and solution 7) were introduced into ULREA SS-11-75 (manufactured by M Techniques Co., Ltd.), which is the conventional apparatus not having the downstream-side processing part, whereby the dehydration condensation reaction was carried out. The supply method of the solutions 8 and 7 into the fluid processing apparatus (the introduction parts d1 and d2 to supply the solution 8 and the solution 7 into the fluid processing apparatus and the supply speeds thereof) and the operation condition of the fluid processing apparatus (rotation number of the first processing member 10) were the same as those in Example 9. The outflow solution flew out from between the processing surfaces 1 and 2 was collected for 1 minute, and the quantitative analysis thereof was carried out by a gas chromatography measurement instrument. With the same analysis as Example 9, the reaction rate of Comparative Example 9 was 14%.

Example 10: Dehydration Condensation Reaction of Anisaldehyde with Acetylacetone 134 parts by weight of anisaldehyde (structural formula (13); manufactured by Kanto Chemical Co., Ltd.) and 106 parts by weight of acetylacetone (structural formula (11); manufactured by Kanto Chemical Co., Ltd.) were added to 1760 parts by weight of methanol (manufactured by Godo Co., Ltd.), they were stirred with ClearMix (manufactured by M. Technique Co., Ltd.) at the rotation number of 5000 rpm for 10 minutes, the obtained anisaldehyde and acetylacetone were dissolved into methanol to obtain a solution 9. With the liquid feeding pumps P1 and P2, the solution 9 at the supply speed of 5.0 mL/min and the solution 7 used in Example 8 at the supply speed of 1.0 mL/min were subjected to the dehydration condensation reaction with setting the rotation number of the first processing member 10 at 500 rpm in the fluid processing apparatus F shown in FIG. 12(C).

The chemical reaction thereof can be expressed by the reaction formula described below.

[Chem. 9]

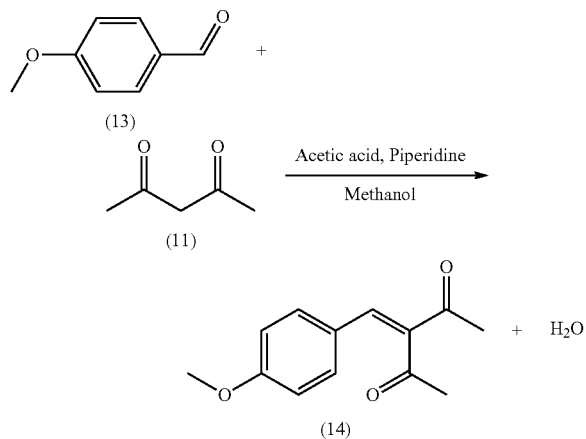

The solution 9 was introduced into the fluid processing apparatus F from the first introduction part d1 of the fluid processing apparatus F by using the liquid feeding pump P1, and the solution 7 used in Example 8 was introduced into the fluid processing apparatus F from the second introduction part d2 of the apparatus by using the liquid feeding pump P2 thereby carrying out the dehydration condensation reaction. The retention time of the fluid in the downstream-side processing space 81 was 40 minutes. The hot water heated to 59° C. was circulated through the temperature adjusting jacket provided as the temperature adjusting mechanism T so that the temperature of the outflow solution flew out from the outflow part 68 was to be at 52° C. or higher. Similarly to Example 8, the outflow solution was collected for 1 minute. The outflow solution collected for 1 minute was immediately taken into the container for GC measurement, and the quantitative analysis thereof was carried out by a gas chromatography measurement instrument. From the ratio of the peak of the raw material appeared at the retention time of 15.9 minutes and the peak of the product (structural formula (14)) appeared at the retention time of 29.4 minutes in the gas chromatogram, the reaction rate in Example 10 was 37%.

Comparative Example 10: Dehydration Condensation Reaction of Anisaldehyde with Acetylacetone by Using Conventional Apparatus without Downstream-Side Processing Part The same raw material solutions as Example 10 (solution 9 and solution 7) were introduced into ULREA SS-11-75 (manufactured by M Techniques Co., Ltd.), which is the conventional apparatus not having the downstream-side processing part, whereby the dehydration condensation reaction was carried out. The supply method of the solutions 9 and 7 into the fluid processing apparatus (the introduction parts d1 and d2 to supply the solution 9 and the solution 7 into the fluid processing apparatus and the supply speeds thereof) and the operation condition of the fluid processing apparatus (rotation number of the first processing member 10) were the same as those in Example 10. The outflow solution flew out from between the processing surfaces 1 and 2 was collected for 1 minute, and the quantitative analysis thereof was carried out by a gas chromatography measurement instrument. On the chromatogram, the peak corresponding to the product (structural formula (14)) was not detected, and the reaction rate in Comparative Example 10 was 0%.

Example 11: Acetalization Reaction of Benzaldehyde with Ethyleneglycol 106 parts by weight of benzaldehyde (structural formula (8); manufactured by Kanto Chemical Co., Ltd.), 186 parts by weight of ethyleneglycol (structural formula (15); manufactured by Mitsubishi Chemical Corp.), and 104 parts by weight of dimethoxypropane (manufactured by Sigma Aldrich Corp.) were dissolved into 1404 parts by weight of tetrahydrofuran (Wako Pure Chemical Industries, Ltd.) as the solvent to obtain a solution 10. A solution 11 was prepared by dissolving 96 parts by weight of methanesulfonic acid (manufactured by Kanto Chemical Co., Ltd.) as a catalyst in 1704 parts by weight of tetrahydrofuran. The solution 10 at a flow rate (supply speeds) of 10.0 mL/min and the solution 11 at flow rate (supply speeds) of 1.0 mL/min or 2.0 mL/min were subjected to the acetalization reaction in the fluid processing apparatus F shown in FIG. 12(C). The chemical reaction thereof can be expressed by the reaction formula described below.

[Chem. 10]

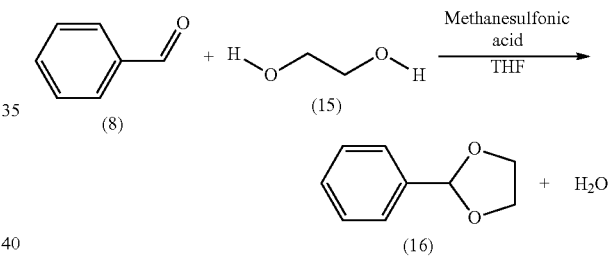

The solution 10 was introduced into the fluid processing apparatus F from the first introduction part d1 of the fluid processing apparatus F by using the liquid feeding pump P1, and the solution 11 was introduced into the fluid processing apparatus F from the second introduction part d2 of the apparatus by using the liquid feeding pump P2 thereby carrying out the acetalization reaction. The rotation number of the first processing member 10 was set to 500 rpm. The retention time of the fluid in the downstream-side processing space 81 was 20 minutes. The outflow solution flew out from the outflow part 68 was collected in a saturated aqueous solution of sodium carbonate (manufactured by Wako Pure Chemical Industries, Ltd.) for 1 minute, the acid contained in the solvent was deactivated to stop the reaction. Then, diethyl ether was contacted with the reaction-terminated outflow solution to extract the solvent thereby recovering the raw material and the product, they were recovered into the container for GC measurement, and then the quantitative analysis thereof was carried out by a gas chromatography measurement instrument. From the ratio of the peak of the raw material appeared at the retention time of 10.2 minutes and the peak of the product of 2-phenyl-1,3-dioxolane (structural formula (16)) appeared at the retention time of 14.2 minutes in the gas chromatogram, the reaction rate in Example 11 was determined. The reaction rate of Example 11 was 64% when the flow rate (supply speed) of the solution 11 was 1.0 mL/min, and 59% when the flow rate thereof was 2.0 mL/min.

Comparative Example 11: Acetalization Reaction of Benzaldehyde with Ethyleneglycol by Using Conventional Apparatus without Downstream-Side Processing Part The same raw material solutions as Example 11 (solution 10 and solution 11) were introduced into ULREA SS-11-75 (manufactured by M Techniques Co., Ltd.), which is the conventional apparatus not having the downstream-side processing part, whereby the acetalization reaction was carried out. The supply method of the solutions 10 and 11 into the fluid processing apparatus (the introduction parts d1 and d2 to supply the solution 10 and the solution 11 into the fluid processing apparatus and the supply speeds thereof) and the operation condition of the fluid processing apparatus (rotation number of the first processing member 10) were the same as those in Example 11. The outflow solution flew out from between the processing surfaces 1 and 2 was collected in a saturated aqueous solution of sodium carbonate (manufactured by Wako Pure Chemical Industries, Ltd.) for 1 minute, and the acid contained in the solvent was deactivated to stop the reaction. Then, diethyl ether was contacted with the reaction-terminated outflow solution to extract the solvent thereby recovering the raw material and the product, they were recovered into the container for GC measurement, and then the quantitative analysis thereof was carried out by a gas chromatography measurement instrument. The reaction rate of Comparative Example 11 was 15% when the flow rate (supply speed) of the solution 11 was 1.0 mL/min, and 25% when the flow rate thereof was 2.0 mL/min.

Example 12: Acetalization Reaction of Cyclohexanone with Ethyleneglycol 98 parts by weight of cyclohexanone (structural formula (17)); manufactured by Kanto Chemical Co., Ltd.), 186 parts by weight of ethyleneglycol (structural formula (15); manufactured by Mitsubishi Chemical Corp.), and 104 parts by weight of dimethoxypropane (manufactured by Sigma Aldrich Corp.) were dissolved into 1412 parts by weight of tetrahydrofuran (Wako Pure Chemical Industries, Ltd.) as the solvent to obtain a solution 12.

The solution 12 at a flow rate (supply speeds) of 10.0 mL/min and the solution 11 used in Example 11 at flow rate (supply speeds) of 1.0 mL/min or 2.0 mL/min were subjected to the acetalization reaction in the fluid processing apparatus F shown in FIG. 12(C). The chemical reaction thereof can be expressed by the reaction formula described below.

[Chem. 11]

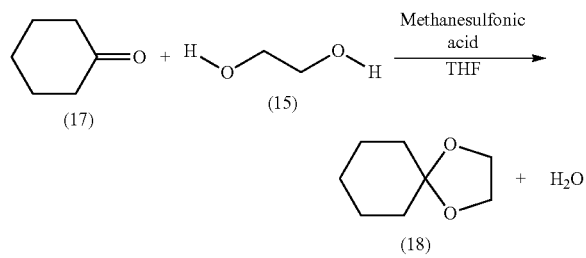

The solution 12 was introduced into the fluid processing apparatus F from the first introduction part d1 of the fluid processing apparatus F by using the liquid feeding pump P1, and the solution 11 was introduced into the fluid processing apparatus F from the second introduction part d2 of the apparatus by using the liquid feeding pump P2 thereby carrying out the acetalization reaction. The retention time of the fluid in the downstream-side processing space 81 was 20 minutes. The outflow solution flew out from the outflow part 68 was collected in a saturated aqueous solution of sodium carbonate for 1 minute, the acid contained in the solvent was deactivated to stop the reaction. With respect to the outflow solution flew out from the outflow part 68, the quantitative analysis was carried out by a gas chromatography measurement instrument as the same operation in Example 11. From the ratio of the peak of the raw material appeared at the retention time of 6.9 minutes and the peak of the product of 1,4-dioxaspiro [4.5]decane (structural formula (18)) appeared at the retention time of 8.5 minutes in the gas chromatogram, the reaction rate in Example 12 was determined. The reaction rate of Example 12 was 95% when the flow rate (supply speed) of the solution 11 was 1.0 mL/min, and 95% when the flow rate thereof was 2.0 mL/min.

Comparative Example 12: Acetalization Reaction of Cyclohexanone with Ethyleneglycol by Using Conventional Apparatus without Downstream-Side Processing Part The same raw material solutions as Example 12 (solution 12 and solution 11) were introduced into ULREA SS-11-75 (manufactured by M Techniques Co., Ltd.), which is the conventional apparatus not having the downstream-side processing part, whereby the acetalization reaction was carried out. The supply method of the solutions 12 and 11 into the fluid processing apparatus (the introduction parts d1 and d2 to supply the solution 12 and the solution 11 into the fluid processing apparatus and the supply speeds thereof) and the operation condition of the fluid processing apparatus (rotation number of the first processing member 10) were the same as those in Example 12. The outflow solution was collected for 1 minute, and the quantitative analysis was carried out by a gas chromatography measurement instrument as the same operation in Example 12. With the same analysis as Example 12, the reaction rate of Comparative Example 12 was 22% when the flow rate (supply speed) of the solution 11 was 1.0 mL/min, and 37% when the flow rate thereof was 2.0 mL/min.

The reaction formulae and reaction rates of Examples 2 to 12 and Comparative Examples 2 to 12 are shown in Table 1 and Table 2. With respect to Example 11 and Comparative Example 11, and Example 12 and Comparative Example 12 in which a plurality of reaction rate were calculated by changing the supply speed of the solution 11, the reaction rate when the flow rate of the solution 11 was 2.0 L/min are shown in Table 2.

TABLE 1

| Example/Comparative Example | Reaction formula | Type of reaction | Reaction rate % (GC) Example | Reaction rate % (GC) Comparative Example |
|---|---|---|---|---|
| Example 2/Comparative Example 2 | (1) + NaOH, H₂O / MeOH → (2) + acetic acid | Ester hydrolysis | 99 | 11 |
| Example 3/Comparative Example 3 | (3) + NaOH, H₂O / MeOH → (4) + acetic acid | Ester hydrolysis | 99 | 14 |
| Example 4/Comparative Example 4 | (5) + NaOH, H₂O / Methanol → (6) + acetic acid | Ester hydrolysis | 99 | 17 |
| Example 5/Comparative Example 5 | (2) + (7) → TEA, DMAP / CH₂Cl₂ → (1) + acetic acid | Esterification | 89 | 45 |
| Example 6/Comparative Example 6 | (4) + (7) → TEA, DMAP / CH₂Cl₂ → (3) + acetic acid | Esterification | 94 | 43 |
| Example 7/Comparative Example 7 | (6) + (7) → TEA, DMAP / CH₂Cl₂ → (5) + acetic acid | Esterification | 94 | 46 |

TABLE 2

| Example/Comparative Example | Reaction formula | Type of reaction | Reaction rate % (GC) Example | Reaction rate % (GC) Comparative Example |
|---|---|---|---|---|
| Example 8/Comparative Example 8 | (8) + (9) → Acetic acid, Piperidine / Methanol | Dehydration condensation | 91 | 22 |

TABLE 2-continued

| Example/ Comparative Example | Reaction formula | | | Type of reaction | Reaction rate % (GC) | |
|---|---|---|---|---|---|---|
| | | | | | Example | Comparative Example |
| | (10) benzylidene dimethyl malonate + H₂O | | | | | |
| Example 9/ Comparative Example 9 | benzaldehyde (8) | + | acetylacetone (11) | Dehydration condensation (Acetic acid, Piperidine / Methanol) | 78 | 14 |
| | (12) 3-benzylidene-2,4-pentanedione + H₂O | | | | | |
| Example 10/ Comparative Example 10 | 4-methoxybenzaldehyde (13) | + | acetylacetone (11) | Dehydration condensation (Acetic acid, Piperidine / Methanol) | 37 | 0 (undetectable) |
| | (14) 3-(4-methoxybenzylidene)-2,4-pentanedione + H₂O | | | | | |
| Example 11/ Comparative Example 11 | benzaldehyde (8) | + | ethylene glycol (15) | Acetalization (Methanesulfonic acid / THF) | 59 | 25 |
| | (16) 2-phenyl-1,3-dioxolane + H₂O | | | | | |
| Example 12/ Comparative Example 12 | benzaldehyde (8) | + | ethylene glycol (15) | Acetalization (Methanesulfonic acid / THF) | 95 | 37 |
| | (16) 2-phenyl-1,3-dioxolane + H₂O | | | | | |

REFERENCE NUMERALS

1 First processing surface
2 Second processing surface
3 Upstream-side processing space
4 Upstream-side outflow port
10 First processing part
20 Second processing part
61 Outer casing
81 Downstream-side processing space
83 Pool part
84 Seal part
91 Bottom member
110 Inner wall
161 Outer wall
181 Processing space
183 Pool part
184 Seal part
F Fluid processing apparatus and continuous stirring apparatus

The invention claimed is:

1. A method for producing an organic compound, wherein
a fluid processing apparatus used in the production method comprises an upstream-side processing part in which a fluid to be processed is processed between at least two processing surfaces that can approach to and separate from each other and at least one of which rotates to the other, and a downstream-side processing part which is arranged in the downstream side of the upstream-side processing part and is provided with a plurality of labyrinth seals having functions of retaining and stirring the fluid to be processed being processed in the upstream-side processing part, wherein
by the fluid to be processed which contains at least one kind of organic compound being passed through the upstream-side processing part, the fluid to be processed is subjected to an upstream-side processing, and
by the fluid to be processed which is subjected to the upstream-side processing being passed through the downstream-side processing part, the fluid to be processed which is subjected to the upstream-side processing is subjected to a downstream-side processing, wherein
the upstream-side processing and the downstream-side processing are carried out continuously, and
the downstream-side processing part comprises a narrow seal space and a retention space.

2. The method for producing an organic compound according to claim 1, wherein
the downstream-side processing part comprises the narrow seal space and the retention space that is arranged in the upstream side of the seal space and is wider than the seal space, and
an upstream-side outflow port of the fluid to be processed from the upstream-side processing part is open to the retention space,
in the downstream-side processing part, a plurality of the pairs of the seal space and the retention space are continuously arranged from an upstream to a downstream of the flow of the fluid to be processed.

3. The method for producing an organic compound according to claim 2, wherein
the downstream-side processing part comprises a cylindrical receiving part and a column part that is received in the cylindrical receiving part, and
by rotating at least any one of the cylindrical receiving part and the column part, the cylindrical receiving part and the column part relatively rotate.

4. The method for producing an organic compound according to claim 2, wherein
a temperature adjusting mechanism to control a temperature of the fluid to be processed that passes through the downstream-side processing part is installed, and
by the temperature adjusting mechanism, the fluid to be processed that passes through the downstream-side processing part is heated or cooled.

5. The method for producing an organic compound according to claim 2, wherein
in the downstream-side processing part, an introduction part to introduce a fluid other than the fluid to be processed from the upstream-side processing part is arranged, and
from this introduction part, the fluid other than the fluid to be processed from the upstream-side processing part is introduced into the fluid to be processed from the upstream-side processing part.

6. The method for producing an organic compound according to claim 2, wherein
in the upstream-side processing part, reactants included in the fluid to be processed are instantly mixed in a molecular level, wherein
a process in which the fluid to be processed is maintained for a long time while maintaining necessary reaction condition in the downstream-side processing part is carried out in one fluid processing apparatus.

7. The method for producing an organic compound according to claim 1, wherein
the downstream-side processing part comprises a cylindrical receiving part and a column part that is received in the cylindrical receiving part, and
by rotating at least any one of the cylindrical receiving part and the column part, the cylindrical receiving part and the column part relatively rotate.

8. The method for producing an organic compound according to claim 7, wherein
by rotation of at least any one of the at least two processing surfaces and/or rotation of at least any one of the cylindrical receiving part and the column part, a shear force is applied to the fluid to be processed passing through the upstream-side processing part and/or the downstream-side processing part.

9. The method for producing an organic compound according to claim 7, wherein
a temperature adjusting mechanism to control a temperature of the fluid to be processed that passes through the downstream-side processing part is installed, and
by the temperature adjusting mechanism, the fluid to be processed that passes through the downstream-side processing part is heated or cooled.

10. The method for producing an organic compound according to claim 7, wherein
in the downstream-side processing part, an introduction part to introduce a fluid other than the fluid to be processed from the upstream-side processing part is arranged, and
from this introduction part, the fluid other than the fluid to be processed from the upstream-side processing part is introduced into the fluid to be processed from the upstream-side processing part.

11. The method for producing an organic compound according to claim 8, wherein a temperature adjusting mechanism to control a temperature of the fluid to be processed that passes through the downstream-side processing part is installed, and by the temperature adjusting mechanism, the fluid to be processed that passes through the downstream-side processing part is heated or cooled.

12. The method for producing an organic compound according to claim 8, wherein in the downstream-side processing part, an introduction part to introduce a fluid other than the fluid to be processed from the upstream-side processing part is arranged, and from this introduction part, the fluid other than the fluid to be processed from the upstream-side processing part is introduced into the fluid to be processed from the upstream-side processing part.

13. The method for producing an organic compound according to claim 1, wherein a temperature adjusting mechanism to control a temperature of the fluid to be processed that passes through the downstream-side processing part is installed, and by the temperature adjusting mechanism, the fluid to be processed that passes through the downstream-side processing part is heated or cooled.

14. The method for producing an organic compound according to claim 13, wherein in the downstream-side processing part, an introduction part to introduce a fluid other than the fluid to be processed from the upstream-side processing part is arranged, and from this introduction part, the fluid other than the fluid to be processed from the upstream-side processing part is introduced into the fluid to be processed from the upstream-side processing part.

15. The method for producing an organic compound according to claim 1, wherein in the downstream-side processing part, an introduction part to introduce a fluid other than the fluid to be processed from the upstream-side processing part is arranged, and from this introduction part, the fluid other than the fluid to be processed from the upstream-side processing part is introduced into the fluid to be processed from the upstream-side processing part.

16. The method for producing an organic compound according to claim 1, wherein in the upstream-side processing part, reactants included in the fluid to be processed are instantly mixed in a molecular level, wherein a process in which the fluid to be processed is maintained for a long time while maintaining necessary reaction condition in the downstream-side processing part is carried out in one fluid processing apparatus.

17. The method for producing an organic compound according to claim 1, wherein the fluid to be processed comprises at least two fluids containing a fluid which contains at least one kind of the organic compound, and a first fluid which contains at least one polymerizable monomer, and a second fluid which contains at least any one of emulsifiers that emulsifies the monomer into a medium that is immiscible with the monomer or a dispersant that disperses the monomer in the medium are used as the fluid to be processed, wherein an emulsifying process or a dispersing process is carried out in the upstream-side processing part as the upstream-side processing, and a polymerization process is carried out in the downstream-side processing part as the downstream-side processing whereby a polymer is obtained.

18. The method for producing an organic compound according to claim 1, wherein the fluid to be processed comprises at least two fluids containing the fluid which contains at least one kind of organic compound, an organic reaction is carried out by the upstream-side processing and the downstream-side processing, wherein a combination of the at least two fluids and the organic reaction is at least one combination selected from the group consisting of the following first to fourth combinations, a first combination:

a combination of the at least two fluids which are a fluid containing at least one ester and a fluid containing at least any one of an acidic substance or a basic substance to promote a hydrolysis of the ester and a reaction which is the organic reaction to obtain an alcohol by the hydrolysis, a second combination:

a combination of the at least two fluids which are a fluid containing at least any one of alcohol or amine and a fluid containing at least any one of carboxylic acid, carboxylic acid anhydride, or carboxylic acid halide and a reaction which is the organic reaction is to obtain an ester or an amide by condensation, a third combination:

a combination of the at least two fluids which are a fluid containing at least any one of aldehyde or ketone, and one active methylene compound and a fluid containing a substance to promote a reaction between the aldehyde and the active methylene compound or a reaction between the ketone and the active methylene compound and a reaction in which the organic reaction is to obtain an alkene by dehydration condensation, and a fourth combination:

a combination of the at least two fluids which are a fluid containing at least any one of aldehyde or ketone, and at least one alcohols, and a fluid containing a proton acid catalyst to promote a reaction between the aldehyde and the alcohols or a reaction between the ketone and the alcohols and the organic reaction is an acetalization reaction.

19. A method for producing an organic compound, wherein a stirring apparatus comprising an outer wall and an inner wall that is arranged inside the outer wall concentrically, at least any one of the outer wall and the inner wall rotate relative to the other, and a substance to be processed is passed through a processing space formed between the outer wall and the inner wall and then stirred, wherein by using the stirring apparatus having a plurality of labyrinth seals laid on the processing space, a substance to be processed containing at least one kind of organic compound is introduced from an upstream side of the labyrinth seal, and retention of the substance to be processed in the upstream side of the labyrinth seal and passing of the substance to be processed the subsequent to the retention through the labyrinth seal are repeatedly performed whereby the substance to be processed is stirred, wherein the processing space comprises a narrow seal space and a retention space that is arranged on an upstream side of the seal space and is wider than the seal space, and the processing space is continuously provided with a plurality of pairs of the seal space and the retention space as a set from the upstream to the downstream of the flow of the substance to be processed, and wherein the outer wall and the inner wall are circular truncated cone shape, and a clearance adjustment mechanism for transferring the at least any one of the outer wall and the inner wall concentrically is installed for the purpose of adjusting the size of the seal space.

* * * * *